United States Patent
Zawadzki et al.

(10) Patent No.: US 7,107,268 B1
(45) Date of Patent: Sep. 12, 2006

(54) CENTRALIZED SYSTEM AND METHOD FOR MANAGING ENTERPRISE OPERATIONS

(75) Inventors: Jan C. Zawadzki, Carslbad, CA (US); Christopher E. Dornsife, Poway, CA (US); Edward F. Ross, Carlsbad, CA (US); Margaret Tan, Oceanside, CA (US); Jason Manosh, San Diego, CA (US); Dennis Bertken, Encinitas, CA (US); Denise Rolen, San Diego, CA (US); Mark Loveland, San Diego, CA (US); Michael Basa, San Diego, CA (US)

(73) Assignee: Printable Technologies, Inc., Solana Beach, CA (US)

( * ) Notice: Subject to any disclaimer, the term of this patent is extended or adjusted under 35 U.S.C. 154(b) by 0 days.

(21) Appl. No.: 09/436,146

(22) Filed: Nov. 9, 1999

Related U.S. Application Data

(60) Provisional application No. 60/108,261, filed on Nov. 12, 1998.

(51) Int. Cl.
G06F 17/30 (2006.01)

(52) U.S. Cl. .............................. 707/9; 707/10; 345/765; 705/9

(58) Field of Classification Search ............... 707/1–10, 707/102, 506–507, 100–104.1, 200–205; 705/1, 20–26, 204, 7.2, 8–11; 709/229, 219; 345/744–745, 741, 804, 765, 761
See application file for complete search history.

(56) References Cited

U.S. PATENT DOCUMENTS 4,839,829 A     6/1989  Freedman ................... 364/519

(Continued)

FOREIGN PATENT DOCUMENTS

| EP | 778 535 A2 | 6/1997 |
| GB | 2 234 896 A | 11/1998 |
| WO | 97/27555 | 7/1997 |

OTHER PUBLICATIONS

Aberdeen Group Review: "NovaSoft," Aberdeen Group Review, 'Online!—Jul. 1, 1997, XP002090204, Retrieved from the Internet: <URL:Available on–line in 1997>.

(Continued)

Primary Examiner—Mohammad Ali
(74) Attorney, Agent, or Firm—Cooley Godward LLP

(57) ABSTRACT

A projected management server coupled with a computer network, such as the Internet. A spec server may also be incorporated into the project management environment for completing specs, generating requests for price quotations, purchase orders and the like. A project tree represents project management objects, which can be of any type. Object types are defined for each particular implementation of the system. Typical examples of project management object types include organizational entities, work-groups, people, projects, budgets, tasks, costs, timesheets, specs, requisitions, purchase orders, and to-do lists. The objects are generally organized in a hierarchical data structure referred to as a project management tree or project tree. Each object in a project tree comprises a number of methods that describe the way the object behaves. Such methods include, for example, methods that describe the way the object is added to the tree, edited, deleted from the tree, and archived.

40 Claims, 32 Drawing Sheets

U.S. PATENT DOCUMENTS

| | | | | |
|---|---|---|---|---|
| 5,694,551 A | * | 12/1997 | Doyle et al. | 705/26 |
| 5,758,126 A | | 5/1998 | Daniels et al. | 395/500 |
| 5,911,143 A | * | 6/1999 | Deinhart et al. | 707/103 R |
| 6,067,548 A | * | 5/2000 | Cheng | 707/101 |
| 6,092,050 A | * | 7/2000 | Lungren et al. | 705/10 |
| 6,161,146 A | * | 12/2000 | Kley et al. | 709/200 |
| 6,226,656 B1 | * | 5/2001 | Zawadzki et al. | 707/10 |
| 6,308,164 B1 | * | 10/2001 | Nummelin et al. | 705/9 |

OTHER PUBLICATIONS

Ciancarini, P. et al, "A multi–agent process centered environment integrated with the WWW," Proceedings—The Workshop on Enabling Technologies: Infrastructure For Collaborative Enterprises, US, IEEE Computer Society Press, Los Alamitos, CA, Jan. 1, 1997, pp. 113–120 XP002090172 ISSN: 1080–1383.

Matrix One, Inc., "Matrix", Online!—1997 XP002111377, retrieved from the Internet, <URL: Available on–line on 1997>.

* cited by examiner

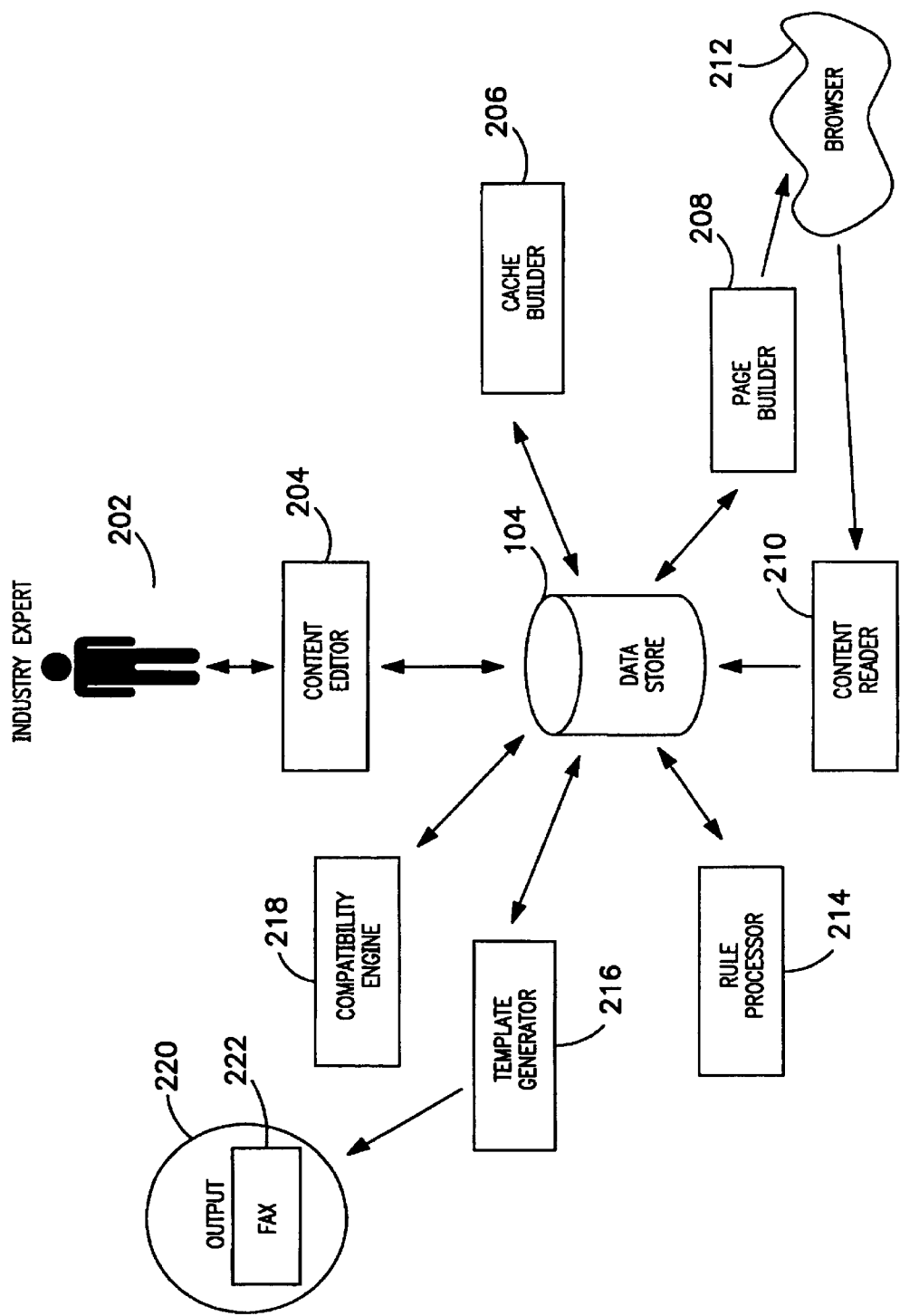

| | |
|---|---|
| Spec Name: | Annual – Report ———437 |
| File Under: | Form Testing – DO NOT SUBMIT RFQs |
| Start Date: |  End Date:  |
| Limit Access: | ☐   Add to My Page: ○ Yes  ⦿ No |

429 {
- \# of Bodies: 3 ——419
- \# of Supplied Inserts: 1 ——421
- \# of Dbl. Panel B/Cards Inserts: 0 ——423
- \# of BRC/BRM Inserts: 1 ——425
- \# of Single Panel B/Cards: 0 ——427

[ OK ]  [ Cancel ]

\* Indicates Required Information

Toll Free 1-888-451-4525 info@sourcefinder.com
Copyright 1998, SourceFinder, Inc. All Rights Reserved.

SmartSpec ID: 3991
Annual Report – Cover — 702
— 704

Sheet Specs — 710
Number of Pages: [2] — 718
Finished Size: [Vert 8.5 x 11 ▼] — 720
Custom Size: [ ]
Printing Method: [Sheetfed Offset ▼]
Pre-press Supplied: [Digital Text Only ▼] — 722

Options — 712
☑ Split Run — 724
☐ Perforating — 726
☐ Scoring
☐ Panels/Folds
☐ Glue
☐ Pocket/Flaps
☐ Foil Stamping
☐ Embossing
☐ Die cutting
☑ Coating
☐ Drilling/Punching — 728

Multiple Covers — 714
Cover 1 Qty: [ ] — 730
Cover 2 Qty: [ ] — 732
Cover 3 Qty: [ ]
Cover 4 Qty: [ ]
Cover 5 Qty: [ ]
Cover 6 Qty: [ ]
Cover Description: [ ] — 734

[Save / Continue] [Save / Go To Project Mgmt]
— 708

Toll Free 1·888·451·4525 info@sourcefinder.com
Copyright 1998, SourceFinder, Inc. All Rights Reserved.

FIG. 7

SmartSpec ID: 4064
Annual Report - Cover - Art } 802

Digital/Text Only ——— 804

Transportation Media: [Select ▼] } 808
     Platform: [Select ▼]

Software Supported ——— 806
       ← 810
  ☐ Quark

Version #: [   ]

☐ PageMaker

Version #: [   ]

☐ FrameMaker

Version #: [   ]

☐ Photoshop

Version #: [   ]

☐ Illustrator

Version #: [   ]

☐ Freehand

Version #: [   ]

☐ Other Application

Name and Version #: [    ]
  Output Size: [Select ▼]
Other Output Size: [  ]
  Proof Type: [Select ▼]
Multiple Proofs Needed: [      ]

812 — [Save / Continue] [Save / Go To Project Mgmt]

Toll Free 1-888-451-4525 info@sourcefinder.com
Copyright 1998, SourceFinder, Inc. All Rights Reserved.

FIG. 8

SmartSpec ID: 4064  
Annual Report – Cover – Paper } 902

Stock Name (Optional): [            ]
Specialty Stock: [            ]
Finish: [Select ▼]
Color: [            ]
Grade: [Select ▼]
Weight/Caliper: [Select ▼]
Type: [Select      ▼]
Coated: [Select ▼]

} 904

906 — [Save / Continue]  [Save / Go To Project Mgmt]

Toll Free 1-888-451-4525 info@sourcefinder.com
Copyright 1998, SourceFinder, Inc. All Rights Reserved.

| SourceFinder | Project Mgmt | Budgeting | Requisitioning | Specing | RFQ Mgmt | Vendor Analysis | P.O. Mgmt | Resources |

2101

| | | Status | Created By | Start | End ▲ | Budget | Alloc | Actual |
|---|---|---|---|---|---|---|---|---|
| Training Manual ▶ | | | | | | | | |
| 📁 Training Manual | | | | | | | *25,000/5000 ↑ | 19,500 |
| ■ Booklet Printing | add | Approved | smith | 10/9/98 | 10/12/99 | | 10,000 | |
| ✈ Hire Tech Writer | add | Open | smith | 10/9/98 | 10/12/99 | | 5,000 ↓ | 4,500 |
| 📁 Manual Spec | add | Open | smith | 10/9/98 | 10/12/99 | | 15,000/0 ↑ | 15,000 |
| | add | Open | smith | 10/9/98 | 10/12/99 | | | |

2102

☐ * Actual Amount Exceeds Allocated
☐ ↓ Amount Under Budget or Allocated
☐ ↑ Amount Over Budget or Allocated Toll Free 1-888-451-4525 info@sourcefinder.com
Copyright 1998, SourceFinder, Inc. All Rights Reserved.

FIG. 21

View Cost Center Amounts
View the Cost Center(s) for Marketing Projects. — 2302

| Cost Center | Budgeted Amt. | Budgeted % | Allocated Amt. | Allocated % | Actual Amt. |
|---|---|---|---|---|---|
| Cost Center A | 50000.00 | 50 | 25000.00 | 50 | 0.00 |
| Cost Center B | 50000.00 | 50 | 25000.00 | 50 | 0.00 |
| Un-Assigned | 0.00 | 0 | 0.00 | 0 | 250.00 |
| Total: | 100000 | 100 | 80000 | 100 | 250 |

*Numbers in red indicate amounts that are allocated over the budgeted amount*

[ OK ]   [ Edit Allocations ]

View Cost Center Amounts
View the Cost Center(s) for New Release. ← 2402

← 2401

| Cost Center | Allocated Amt. | Allocated % | Actual Amt. |
|---|---|---|---|
| Cost Center A | 25000.00 / 24750.00 ↓ | 50 | 0.00 |
| Cost Center B | 25000.00 / 24750.00 ↓ | 50 | 0.00 |
| Un-Assigned | 0.00 | 0 | 250.00 |
| Total: | 80000 / 500 | 100 | 250 |

↓ Amount Under Allocated Amount
↑ Amount Over Allocated Amount

[ OK ]   [ Edit Allocations ]

| Buyer | RFQ | No Bids After | Turnaround | Max Qty |
|---|---|---|---|---|
| 1665 Training Company | Naming Convention | 10/3/98 | 10/18/98 | 750 |

Fields, Strawberry @ Fruit Salad Litho, 10/5/98

RFQ Detail

2601

Send Samples: Yes

Letterhead
Flat Size          8.5 x 11

RapidSpec:

| | | Final Size | 8.5 x 11 |
| Page Count | 750 | Quantity 2 | 1000 |
| Quantity 1 | 50000 | Artwork/Proofs | Mac Illustrator v7.0-you should have file from previous job. No copy changes. 2/2 color process. PMS 145, heavy coverage: 1 bleed on one side, black light coverage. |
| Quantity 3 | | Job Due (mm/dd/yy) | 10/18/98 |

Paper Stock: aristocrat, white. 60lb text Acid Ink/Print Free

Shipping Instructions: Send UPS overnight to Corporate Office. 11440 W. Bernardo Crt San Diego, CA 92127 Attn: Jim Contact: Have Supplier Call Special Instructions: please call for press check, and when job has been shipped. Contact Jim x 23

E-mail: jim@sourcefinder.com

Fax # (Required): 619-876-1050

[ Return To Previous Page ]

Attachments (add attachment)

/ RFQ's / Bids: / Jobs / Maintenance \

Fields, Strawberry @ Fruit Salad Litho, 10/5/98

2701

Open Bids:

| Id | Client | Bid | Last Bid | Turnaround | Amount |
|---|---|---|---|---|---|
| 1385 | The Leland Brothers | RFQ: New Manual (View Spec) | 8/20/98 | 09/12/98 | 659.30 |
| 1399 | The Leland Brothers | RFQ: Annual Report (View Spec) | 8/26/98 | 09/10/98 | 4,589.00 |
| 1358 | The Leland Brothers | RFQ: 1st Magazine - Self Cover (View Spec) | 8/26/98 | 8-18-98 | 15,896.00 |
| 1463 | The Leland Brothers | RFQ: Fallout Test (View Spec) | 9/8/98 | 10/30/98 | 189.32 |
| 1516 | The Leland Brothers | RFQ: Friday Magazine (View Spec) | 9/11/98 | 09/30/98 | 589.56 |
| 1463 | The Leland Brothers | RFQ: Fallout Test#2 (View Spec) | 9/8/98 | 10/30/98 | 189.32 |
| 1654 | Training Company | New Moose Letter (View Spec) | 10/1/98 | 10/16/98 | 300.00 |

Click on the 'Client' or 'Bid' to view the detail of each.

FIG. 27

| RFQ's | Bids | Jobs | Maintenance | | | Top, Turnip @ Vegetable Garden, 10/5/98 |

Open Bids:

Jobs With Job Number ▼ Like  List [ 12 ]  [ Go ] ← 2802

All jobs with Job Number like '1256'

| Id | Client | Job | Job# | Status | Due | Owner |
|----|--------|-----|------|--------|-----|-------|
| 1423 | The Leland Brothers | JOB: RFQ: Match Please (View Spec) | 1235 | | 09/12/98 | HNK |
| 1617 | Training Company | RFQ: Reorder-Letterhead (View Spec) | 125-98 | | 10/18/98 | SS |

CENTRALIZED SYSTEM AND METHOD FOR MANAGING ENTERPRISE OPERATIONS

RELATED APPLICATIONS

This application claims the benefit of U.S. Provisional Application Serial No. 60/108,261, filed on Nov. 12, 1998.

The following application of common assignee contains some common disclosure as the present application and is incorporated herein by reference in its entirety:

U.S. Patent Application entitled "SYSTEM AND METHOD FOR CREATING, GENERATING AND PROCESSING USER-DEFINE GENERIC SPECS", filed Nov. 12, 1998, application Ser. No. 09/191,467.

BACKGROUND OF THE INVENTION

1. Field of the Invention

The present invention relates generally to project management, and more particularly to a centralized system and method for managing, tracking and reporting enterprise operations.

2. Related Art

Managing projects in a modem enterprise consisting of multiple organizational work-groups is a complicated endeavor. Several types of computerized tools have emerged to assist in this process. Such tools include project management, group collaboration, workflow management and organizational charting tools.

Project management tools generally provide tracking and reporting functions related to user-defined projects. In particular, these tools provide a means to define projects, schedule tasks and assign resources for projects. Generally, these tools are not actively used for performing the tasks within the projects but to track the progress of the projects for reporting purposes and the like. As such, conventional project management tools require additional resources beyond those defined for the projects themselves, just to maintain and keep them up-to-date. For example, administrators are typically assigned the task of entering and maintaining data associated with conventional project management software.

Typically, organizations within an enterprise create and maintain separate project management systems. Thus, conventional project management systems typically lack the capability for tracking projects on an inter-organizational basis.

Group collaboration and workflow management tools are actively used by team members for performing specific tasks. These tools generally provide a capability for sharing electronic documents among specified work-group members. Workflow management tools generally manage the electronic flow of documents between group members according to pre-defined workflow definitions. For example, tasks, often in the form of to-do-lists and the like, are sent to in-boxes associated with groups or individuals assigned to the tasks.

Enterprise organizational charts are typically created and maintained with organizational charting tools. These tools are used to keep track of the current organizational structure of the enterprise. These tools are typically stand-alone devices that are maintained by administrators or the like.

The problem with these conventional tools as outlined above, is that none of them, either alone or in combination, provide a complete solution for multiple organizational work-groups within an enterprise. The fact that these tools are segmented creates problems of inefficiency. For example, generally each class of tool requires different types of maintenance and customization techniques.

Additional inefficiencies occur because such tools generally do not share data among them. Thus, redundant and additional time-consuming data-entry is often required. For example, suppose an enterprise organization structure changes. This could effect not only the organizational chart, but also many of the projects that are dependant upon specific organizational groups and the like. Thus, redundant data entry is required.

In another example, suppose one or more project schedules change. This change not only affects the project management tracking system, but could also affect one or more of the pre-defined work flow definitions in the work flow management system.

Further, conventional systems are often inaccessible from remote locations outside the enterprise. It would be desirable access all of the enterprise management tools from remote locations. To further complicate matters, these conventional tools do not generally have a consistent user interface.

It would be desirable to have a project management system that is actively used and accessed by team members during projects, so that the tracking and reporting capabilities are automatically updated as tasks are completed.

In addition, none of the conventional tools described above facilitates the process of purchasing goods or services for an enterprise. The tasks of requesting, sourcing and purchasing goods or services can comprise a significant activity for many projects. Such tasks include: defining requirements by completing specs; generating requests for price quotations (RFQs) from the specs; sending RFQs to suppliers; accepting bids from suppliers; and generating purchase orders (POs) for the goods or services.

Accordingly, it would be desirable to have a project management system that includes a means to facilitate the time-consuming process of purchasing goods or services for an enterprise.

SUMMARY OF THE INVENTION

Accordingly, the present invention is directed toward a centralized, automated, self-maintained, collaborative project management system that can be readily customized for any type of enterprise.

An advantage of the present invention is the project manager is not limited to tasks, resources and files, but can accept infinite classes of user-defined objects.

Another advantage of the present invention is that it is automatically kept up-to-date as users complete tasks.

Yet another advantage of the present invention is that it can be used for an entire enterprise but can be customized for each user. In addition, the project management system can include outside agencies as specified by the enterprise.

Still another advantage of the present invention is that it can be accessed from locations both inside and outside of the enterprise, without requiring additional or customized software.

The project management system of the present invention includes a projected management server coupled with a computer network, such as the Internet. In a preferred embodiment of the present invention, a spec server is incorporated into the project management environment for completing specs, generating requests for price quotations, purchase orders and the like. An example of such a spec server is disclosed in the above referenced related patent application, entitled "SYSTEM AND METHOD FOR CREATING, GENERATING AND PROCESSING USER-DEFINE GENERIC SPECS", which as noted above, has been incorporated herein by reference. In addition to the incorporation by reference, however, portions of the above referenced patent application are explicitly included below for the sake of clarity and completeness.

Specs are commonly used for example, in industry. One such example is the printing industry, where many options are available for each product offered by suppliers. Customers typically complete a spec, in one form or another, to receive a price quotation from a supplier.

A feature of the spec server of the present invention, is that a centralized data structure referred to as a domain tree is used to generate all of the specs for a particular industry or domain. One example of such an industry or domain is the printer industry or domain. In this fashion, when changes are made to the domain tree, all of the specs created therefrom are automatically updated to reflect the changes.

Another feature of the spec server of the present invention is that the specs generated therefrom can be shared among multiple suppliers. Therefore, a customer need only complete a single spec for each requirement requested. The single completed spec is then automatically transformed into requests for price quotations that are formatted and customized, if necessary, to conform to the requirements of each supplier.

An advantage of the spec server of the present invention is that customers can complete specs without assistance from industry experts. In a preferred embodiment, specs are completed on-line, from anywhere around the world; the only requirement being that the customer has access to the Internet through a standard web browser or the like.

Users access the spec server via a computer network, preferably the Internet. The page builder of the present invention dynamically builds custom pages that are presented on a web browser to the user. The content of the pages depends on previous answers and selections from the user. A rule processor is used to interpret rules defined by the industry expert. The rule processor is used to set flags that are used to turn on or turn off certain options displayed to the user while completing the specs.

After a spec is completed by the user, a compatibility engine compares the completed spec with other completed specs, such as specs completed by suppliers. In particular, using this example, suppliers complete specs in much the same manner as described above. The specs completed by suppliers however, describe the capabilities of the suppliers, rather than product requirements.

Thus, the compatibility engine typically compares a group of specs completed by suppliers (i.e. a group of supplier profiles), with a completed user spec and tests for compatibility. Once compatible suppliers are determined, a template generator uses additional rules supplied by the industry expert to generate requests for price quotations (RFQs). The RFQs. are then sent to the compatible suppliers.

A project tree is used to represent project management objects. Such objects can be any type of object defined for a particular implementation of the present invention, and are not limited in any way. Examples of typical project management objects include organizational entities, workgroups, people, projects, budgets, tasks, costs, timesheets, specs, requisitions, purchase orders, to-do lists etc.

The objects are organized in a hierarchical data structure referred to as a project management tree, or more simply, a project tree. Each object in the project tree comprises a number of methods that describe the way the object behaves. For example, each object comprises methods that describe the way the object is added to the tree, edited, deleted from the tree, and archived. The present invention can support an infinite class of objects that are not limited to the examples presented herein. Thus, the present invention can be customized for any type of environment.

In a typical embodiment of the present invention, a key user sets-up the initial environment for the project management system. This includes setting up the structure of the enterprise, defining users, specifying user-groups, user access rights, passwords, etc. One or more key users may exist for any particular enterprise. For example, each division in an enterprise may assign a separate key user. Alternatively, a single key user can be assigned for an entire enterprise.

Once the initial system is set-up, users log-in to the project management system from locations within or outside of the enterprises. When a user logs-in, the system determines the identity of the user, and based on the identity and user access rights, presents the user with a particular view of the project management tree. The user can then navigate through sections of the project tree for which the user is authorized.

In addition, the user can interact with the project management system by performing functions on that portion of the project tree in which they are authorized to perform functions. Such functions include adding, editing deleting and archiving project management objects.

In this fashion, users from multiple organizational workgroups can participate using the project management system that can be customized for each user. For example, users in the one division may only be able to view and interact with projects associated with their division. In another example, a user may only be able to view and interact with particular tasks that are assigned to that user.

In general, the project management system of the present invention is used in the daily operations of an enterprise. In this fashion, the system is self-maintaining in that project schedules can be automatically updated as tasks are completed. Further, tasks that involve financial objects are automatically linked to other objects that are affected by them. For example, if a purchase order object is added to a project tree, the actual and projected budgetary items associated with the current project are automatically updated to reflect the expenditure.

BRIEF DESCRIPTION OF THE FIGURES

The present invention is described with reference to the accompanying drawings, wherein:

FIG. 2A is a block diagram depicting a preferred set of components that can be used to implement the spec server according to a preferred embodiment of the present invention;

FIG. 4B is an example of a spec definition page, according to a preferred embodiment of the present invention;

FIGS. 6–10 are representations of web pages that can be generated from the component tree in FIG. 4A, according to a preferred embodiment of the present invention;

FIGS. 16–28 are examples of web pages that can be used to implement the present invention in accordance with a preferred embodiment;

DETAILED DESCRIPTION OF THE PREFERRED EMBODIMENTS

The present invention is directed toward a centralized, automated, self-maintained, collaborative project management system including an automated spec server for generating specs. The system and method of the present invention that can be readily customized for any type of enterprise.

Figure 1:
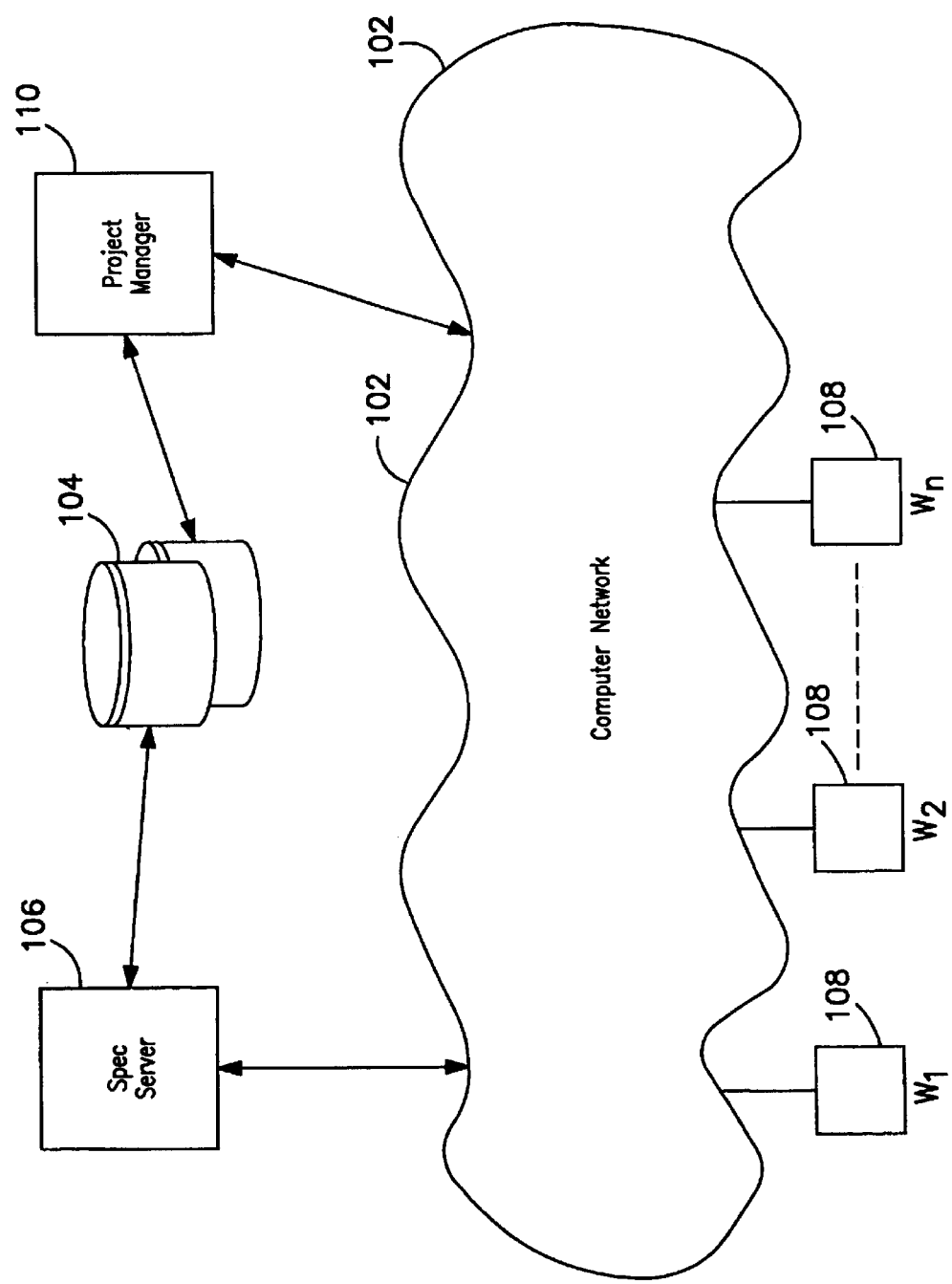
FIG. 1 is a block diagrams depicting an example operational environment according to a preferred embodiment of the present invention.

FIG. 1 is a block diagrams depicting an operational environments according to a preferred embodiment of the present invention. A spec server running software to implement an embodiment of the present invention is depicted as block 106. A project manager running software to implement an embodiment of the present invention is depicted as block 110. An exemplary computer system that can be used to implement the spec server 106 and the project manager 104 is subsequently described below with reference to FIG. 30.

The spec server 106 is coupled with a data store 104. The data store 104 is used to store data associated with the spec server 106 and the project manager 110. In particular, the data store 104 is used to store domain trees, component trees, spec templates and other data related to the spec sever 106. In addition, the data store 104 is used to store one or more project management trees and other data related to the project manager 110. An example of a project management tree is shown below with reference to FIG. 13.

The data store 104 can be implemented with one or more distinct devices. For example, one or more devices can be used to store data associated spec server 106, and one or more devices can be used to store data associated with the project manager 110. However, in another embodiment, the same data store device or devices can be used to share data associated with both the spec server 106 and the project manager 110. Thus, the data store 104 represents one or more of such device(s).

The data store 104 can be any type of data storage device, such as a memory device, a disk, drum or tape storage device and/or a data base management system (DBMS). In fact, any device that stores data, whether presently known or not, can be used as the data store 104.

In the examples presented herein, a DBMS 104, also referred to as "the data base 104", is used to implement the data store 104. In one embodiment, a relational database, such as the Informix® data base system provided by Informix Software Incorporated of Menlo Park California is used. However, in other embodiments, different storage devices can be used, including memory devices, and other types of data base management systems, such as non-relational data base systems, customized data base systems, and other generally available data base systems. Thus, the use of the term data base 104, is for exemplary purposes only, and should not be construed to limit the scope and breadth of the present invention.

The spec server 106 and the project manager 110 are coupled to a computer network 102. The computer network 102 used in this example embodiment is the Internet. The Internet 102 is especially advantageous to be used in conjunction with the present invention because of its wide use and wide availability. However, any type of computer network can be used in alternate embodiments of the present invention.

A plurality of end users gain access to the spec server 106 from the workstations W1, W2, . . . WN 108 (also referred to as the "web interface" 108), via the Internet 102. Any commonly available web browser such as Internet Explorer provided by Microsoft Corporation, or Netscape Navigator provided by Netscape Corporation, can be used to interact with the spec server 106 and the project manager 110 from any of the workstations 108. Another example of a workstation 108 is a non-typical workstation or web access tool, including set-top boxes such as Microsoft's WebTV and the like. These web access tools are specifically designed to interact with the Internet 102 and typically provide services very similar to the services provided by commonly available web browsers as described above.

A distinct advantage of the present invention is that the only requirement by end users is that the workstations 108 provide common web browsing input/output functions. Typically this includes HTML and JavaScript compatibility. In this fashion, anyone using a web-browsing tool can interact with the spec server 106 of the present from anywhere in the world. This is accomplished without having to install additional software and/or hardware to the workstations 108.

It should be noted that the use of the term "web browser" 108 is used for exemplary purposes only to describe the present invention in terms a preferred embodiment. However, as mentioned, any type of computer network 102 can be used to implement the present invention. Consequently, any type of display and/or program to display computer images or text, can be used with the present invention. As such, the term web browser 108 should not be construed to limit the scope and breadth of the present invention.

It should also be noted that spec server 106 and project manager 110 are depicted as single boxes for simplicity. This does not indicate nor suggest that a single computer system should be used to implement the spec server 106 and project manager. Indeed one or more computer systems can be used to implement either the spec server 106 or the project manager 110 according to a preferred embodiment of the present invention. Preferably, when multiple computer systems are used, a high-speed local area network or the like is employed to provide communications between the various components of the spec server 106. The use of such a network would be apparent to persons of ordinary skill in the relevant art(s).

Details of the spec server 106 will now be described with reference to FIGS. 2A–11. An example of a preferred set of components that can be used to implement the spec server 106 according to a preferred embodiment of the present invention is depicted in FIG. 2A. It should be noted that these components are shown for exemplary purposes only to fully describe and clearly point out the features and functions of the present invention. In other embodiments, different components can be used to implement the features and functions of the present invention as described herein. After reading the following detailed description, it will become apparent to persons skilled in the relevant art(s) how to implement the present invention using components other than those that are described herein. Accordingly, the use of these exemplary components should not be construed to limit the scope and breadth of the present invention.

As shown in FIG. 2A, a content editor 204 is coupled to the data base 104. The content editor 204 is used by an industry expert 202 to completely describe and define a particular domain. One output from the content editor is a domain tree (not shown). The domain tree is stored in the data base 104. Details of a domain tree are subsequently described in detail below with reference to FIG. 3.

In order to fully describe the details of the present invention, a particular type of domain tree will be described in the examples presented herein. In particular, the domain tree used in the examples below is one that is associated with the printing industry. Thus, the subject matter of the domain used in the examples presented herein is all products produced by the printing industry. Subsets of the domain tree are used to create specs or spec templates for particular products. These subsets of the domain tree are referred to herein as component trees. The object of a complete domain tree is to include every possible option associated with the domain. In this example, a complete domain tree for the printing industry includes every type of option that can be specified for every type of printing product available in the industry.

It should be noted that this example of a printing industry domain tree is just one example of a domain tree that can be created using the present invention. The present invention is by no means limited to this type of application, or any type of application for that matter. Indeed a major advantage of the present invention is that it can be used to create any type of spec imaginable from any type of domain tree. For example, specs could be used as a learning device to create adaptive tests for students. After reading the examples presented herein pertaining to the printing industry, it will become apparent to persons skilled in the relevant art(s), how to apply the principles of the present invention to any type of user-defined generic spec.

In the printing industry examples below, users at the web interface 108 interact with the spec server 106 for the purpose of creating (i.e. completing) specs related to the printing industry. These specs are typically used to generate requests for price quotations for printing requirements. For example, users at the web interface 108 complete specs to generate RFQs for printing products such as annual reports, posters, labels, advertising brochures, billboards, books, book covers, pamphlets, etc. The object of a completed spec is to locate suitable suppliers and to provide those suppliers with enough information to enable them to bid for the requested products by producing RFQs.

Consequently, the domain tree created by the industry expert 202, preferably contains enough information so that users are provided with an opportunity to select every possible option available for every type of product defined in the printing domain. As stated, individual specs are generated using sub-sets of the domain tree referred to as component trees. Thus, the domain tree should embody every printing option intended to be available to users.

An advantage of the present invention is that once a domain tree is created, it is a trivial matter to produce a plurality of component trees that are then used in individual specs for particular products that fall within the domain. For example, once a domain tree is created for the printing industry, it is a trivial matter to create a series of specs that relate to particular products, such as book covers, annual reports, etc.

Accordingly, referring back to FIG. 2A, the industry expert 202 creates a domain tree, via the content editor 204. In this example, an expert in the printing industry 202 inputs a wealth of information associated with the printing industry. This information is input into the data base 104.

In this example, the information input by the industry expert 202 includes knowledge about every option available in the printing industry. For example, information related to all types of paper, printing presses, ink, colors, artwork, etc., should be included in the domain tree. As described below, the content editor 204 provides tools that assist the industry expert 202 in organizing data to facilitate the process of creating a domain tree.

The page builder component 208 is used to build spec pages that are presented to users at the web interface 108. These spec pages are dynamically constructed and depend upon the component trees used to define the spec, and the path (i.e. previous answers) taken by users. For example, if a user selects certain options on one web page, items on future web pages appear that specifically relates to the previously selected options.

The web pages generated by the page builder 208 preferably contain prompts to the user and typically include common user interface controls such as data entry fields, list boxes, drop-down boxes, check boxes, push buttons, radio buttons and the like. Such prompts and controls are specified by the industry expert 202 via the content editor 204, when the domain tree is created. In a preferred embodiment, HTML and JavaScripts are used by the page builder 208 to display the pages and accept data from users, via the web browser 212 at the web interface 108.

In a preferred embodiment, a cache builder 206 is used to pre-process certain pages and/or portions of pages that lend themselves to pre-processing. That is, pages or portions of pages are can be built in advance of the dynamic spec entry phase are built by the cache builder 206. The cache builder is an optional component that can be used with the present invention to increase the performance of the overall system from a users standpoint.

In particular, the cache builder 206 preferably generates a specific program for each page that is generated in advance of user input. In a preferred embodiment, the cache builder module 206 is implemented using a combination of JavaScripts and Web DataBlade code. Web DataBlade is a programming tool used to build HTML web pages, provided by Informix Corporation.

The specific programs generated by the cache builder 206 preferably contain logic that depends upon the run-time environment. In this fashion, pages are customized for each user, depending on the particular path taken during run-time, even though the program is compiled well in advance of user input.

The content reader 210 receives user information from the web browser 212 and stores it in the data base 104. Preferably, data entered by users is pre-validated by the web browser 212. In an alternate embodiment, the content reader 210 validates data received from the web browser 212. The type of data required by the user is specified by the industry expert 202, via the content editor 204, when the domain tree is created.

The rule processor 214 reads a set of rules defined by the industry expert 202. These rules are stored in the data base 104. In particular, the rule processor 214 reads rules from the data base 104 and builds a set of flags in accordance with those rules and the run-time environment based on user input. These flags are read by the page builder 208 and are used to determine incompatible options and whether to include or omit certain options on web pages. For example, the logic included in the programs generated by the cache builder 204 may depend on the flags set by the rule processor. In this fashion, certain questions may or may not be presented to the user based on previous user input.

The template generator 216 is used to generate an output 220. In this example, the output 220 is used by suppliers to provide-price quotations to users. This output can be in the form of facsimiles 222, emails or other correspondence. The content and format of the output from the template generator 216 is specified by the industry expert 202.

In particular, the industry expert inputs a set of rules used by the template generator to extract and format user data in accordance with pre-defined specifications. In particular, each question, and/or related group of questions is associated with a particular output rule. When the template generator 216 is executed, the data comprising the completed spec is evaluated to determine what questions have been answered. The rules associated with each of the answered questions are then extracted. Each rule is then used to create a sliver of output. The aggregation of slivers of output comprises the completed RFQ, which is then faxed, emailed or otherwise disseminated to suppliers.

The format of the output depends on the needs and requirements of each specific implementation of the present invention. In one embodiment, the output is formatted using postscript commands. In this example, the final RFQs are printed on a postscript printer and faxed to suppliers. In another embodiment, the output is formatted in HTML, so that suppliers can either receive an electronic copy of the RFQs via email, or may log into the spec server 106 and view the RFQs from customers in a real-time fashion. Specific methods that can be used to format the output in accordance with these principals would be apparent to persons skilled in the relevant art(s).

The compatibility engine 218 is used to compare completed specs with other completed specs. For example, the compatibility engine 218 can be used to compare a print request with a supplier profile to determine whether a supplier is capable of providing the subject of the print request to the user. The compatibility engine 218 can be also be used, for example, to compare a print request to another print request to determine whether the jobs can be combined. The compatibility engine 218 can also be used, for example, to compare a print request with a spec from a financial institution to determine whether the print request could be financed by the financial institution.

In another example, the compatibility engine 218 can be used to determine whether a shipping company could handle shipment for the request. In general, the compatibility engine is used to compare any completed spec with any other completed spec to determine if the specs are compatible. Compatibility rules are defined by the industry expert 202 and are stored in the database 104.

A very typical example of a use for the compatibility engine 218 is to find suppliers that are compatible with completed specs. In this example, suppliers complete a spec that profiles their capabilities. Accordingly, a plurality of supplier profiles is stored in the data base 104. The compatibility engine 218 is then used to compare completed user specs with each of the supplier profiles stored in the database 104 to determine which suppliers are compatible with the print requests.

To accomplish this task, compatibility rules are specified by the industry expert 202. For example, if the user spec indicates that a print size of 11×17 is required, then the supplier must have a printing press that can handle sizes of 11×17 or larger to be compatible. Thus, a rule that links these two conditions is specified.

In particular, a set of compatibility rules exists for each type of comparison being made. For example, one set of compatibility rules exists for a comparison between completed user specs and supplier profiles. In this example, the goal of the compatibility engine 218 is to find suitable suppliers for print requests. Typically, each rule can be classified as being either required or optional. In addition, each rule can be weighted in accordance with its relative importance. In this fashion, a confidence level of compatibility is reported to users along with the list of compatible suppliers.

In particular, the industry expert inputs a set of rules used by the compatibility engine 218. The compatibility engine 218 evaluates the source spec to determine which rules are applicable to the particular source spec. In this example, the source spec is the user spec, and the target spec is the supplier profile. The applicable rules depend on which answers have been completed in the source spec. Next, the compatibility engine 218 extracts the applicable rules from the data base 104 and applies them against the source spec.

For example, one rule may state that if a print size of 11×17 is requested, the supplier must have a press that can print pages of at least 11×17. In this example, the source spec indicates that a print size of 11×17 is requested. As such, when this rule is applied against the source spec, the output rules states that the target spec must have a printing press that handles page sizes of 11×17 or greater. This is an example of a required rule. That is, if the target does not meet this requirement, it is immediately eliminated as a compatible spec.

Next, the rules are applied against the target spec. First the required rules are applied so target specs can be immediately eliminated, as described above. Next, the non-required rules are applied. As stated, the non-required rules are generally weighted in terms of their relative importance so that a weighted average of compatibility can be presented to the user.

Figure 2B:
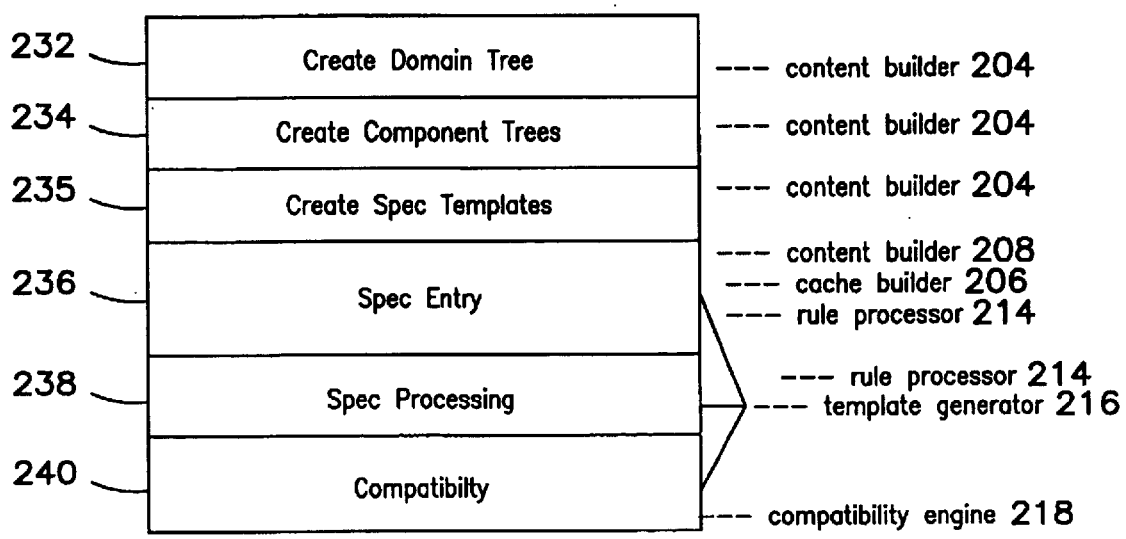
FIG. 2B is a block diagram depicting a five-phase process that can be used to implement a preferred embodiment of the present invention.

FIG. 2B is a block diagram depicting five phases involved in the creation, completion and processing of specs according to a preferred embodiment of the present invention. Also included in FIG. 2B is a listing of the components from FIG. 2A associated with each phase.

The first phase is the creation of a domain tree 232. The content builder 204 is used to perform this phase. As stated, during the domain tree creation phase 232, the industry expert 202 inputs a wealth of knowledge associated with the domain.

After a domain tree is created, the content builder 204 is again used in phase 234 to create one or more components. Components are sub-sets of the domain tree and are referred to herein as component trees.

Next, in phase 235, the industry expert creates spec templates. In one embodiment, the content builder 204 is used to create spec templates. Each spec template is used to define a particular product spec. Typically, the industry expert creates a spec template by defining one or more optional or required components for the spec. Preferably, this is accomplished by specifying a minimum and maximum number for each component. This refers to how many times the component may appear in a spec. For example, a product, such as an annual report, may have one or more bodies. Thus, a component representing a body may appear more than once in a particular spec.

In addition, some components are optional. For example, the inclusion of a user-supplied insert is an optional component for an annual report spec. Accordingly, if the specified minimum is zero, the component is deemed optional and is only included in the user spec if the user selects the component. The optional component may be added one or more times, depending on the specified maximum.

Similarly, if the minimum is non-zero and the maximum is some number other than the minimum, the user has the option to select any number within that range to be included in the spec. The industry expert can also specify the same non-zero number for the minimum and the maximum. In this case the component is automatically included in the spec a number of times equal to the number specified by the industry expert.

Phase 236 represents a process where a user, at the web interface 208, interacts with the spec server 106 to complete one or more specs. Typically users are presented with dynamically generated web pages. The content of these web pages change in accordance with options and answers selected by users. As shown, the page builder 208, the cache builder 206 and the rule processor 214 are involved in the spec entry phase 236.

The next phase is the spec processing phase 238. In phase 238, content reader 210 receives information from the user and stores it in the data base 104. As shown in FIG. 2B, the user can launch the template generator 216, anytime after a first page is completed in the spec entry phase 236.

The final phase depicted in FIG. 2B is the compatibility phase 240. In the compatibility phase 240, the compatibility engine 218 finds a set of completed specs that are compatible with other completed specs. In one example, user specs are compared against specs completed by suppliers. Once a set of compatible suppliers is determined, the outputs from the template generator 216 in phase 238 are typically sent to the compatible suppliers so they can generate price quotations therefrom.

Figure 2C:
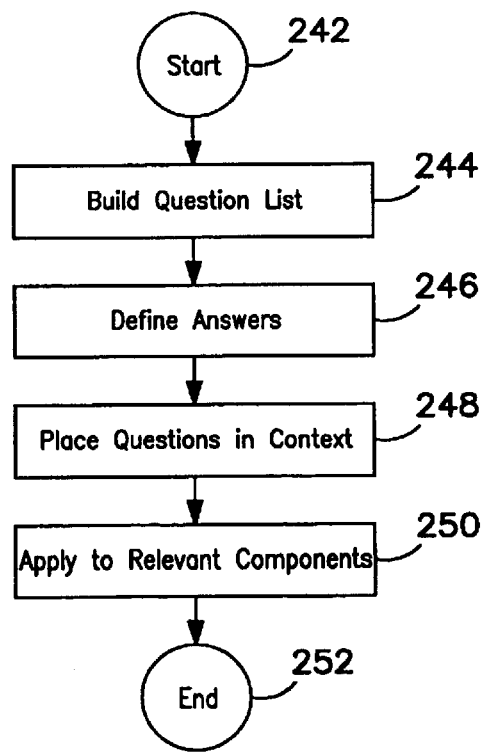
FIG. 2C is a flowchart depicting a method that can be used to create domain and component trees, according to a preferred embodiment of the present invention.

FIG. 2C is a flowchart depicting a process that can be used to create a domain tree and a set of component trees, according to a preferred embodiment of the present invention. An example of a visual representation of a domain tree and a component tree is described below with references to FIGS. 4 and 5, respectively.

The process to create a domain tree and a set of component trees begins with step 242, where control immediately passes to step 244. It is noted that this process is preferably accomplished with the use of the content editor 204. In step 244, the industry expert builds a list of questions. Typically, the industry expert considers and reduces to writing, any and all possible questions that can be asked in a spec context, related to the domain that is the subject of the domain tree. These questions are input into the content editor 204.

For example, using the printing industry example, the industry expert inputs questions used to specify printer products. It is noted that at this time, no particular product is specified by the industry expert, and specific products are not yet associated with each question. However, it helps to think about particular products when compiling the question list in step 244.

In step 244, the industry expert also specifies the language specific label associated with each question. The label is the visual prompt that will later be displayed to the user during the spec entry phase 236. In addition to the label, the industry expert specifies the type of answer required for each question and the type of user interface control associated therewith.

Preferably, the content editor 204 provides the industry expert with a choice of user interface controls that are available. Examples of such user interface controls include, selection check boxes, data entry fields, drop down list boxes, radio buttons, push buttons and the like. The industry expert also typically specifies the form of the data, i.e. numerical, alphanumerical, date format, etc.

Next, in step 246, the industry expert defines the answers for the questions entered in step 244. Thus, for example, the industry expert specifies all of the possible options that are to be displayed in the list box or next to the check box (es) during the spec entry phase 236. Once all answers are defined, control passes to step 248.

In step 248, questions are grouped in a hierarchy. The content editor 204 is used to assist the industry expert in this process. For example, the content editor 204 allows the industry expert to specify group names for lists of questions that are related. In the printing domain for example, groups of questions can relate to categories such as ink, paper, coating, finishing, etc. Thus, in step 248 the industry expert places questions in context, by adding sections or placeholders for the questions. The creation of the domain tree is complete with the completion of step 248. Control next passes to step 250.

Step 250 takes place in phase 234, where one or more component trees are created. A component tree is created by applying (i.e. selecting and marking), relevant portions of the domain tree to specific components. Thus, the industry expert decides which domain nodes are to be included in a particular component.

Each component tree is a subset of the domain tree created in steps 244–248. As stated, once a domain tree has been created, it is a minor task to create multiple component trees therefrom. Each component tree defines a particular component. Particular components are then subsequently used in spec templates to create specs.

The content editor 204 is used to create component trees. This is accomplished by specifying the name of the component, and then selecting portions from the domain tree that apply to the component. This is preferably accomplished by picking and choosing applicable sections from the domain tree. Thus, for example, to create "cover" component, the industry expert simply selects those portions of the domain tree related to a cover.

Figure 3:
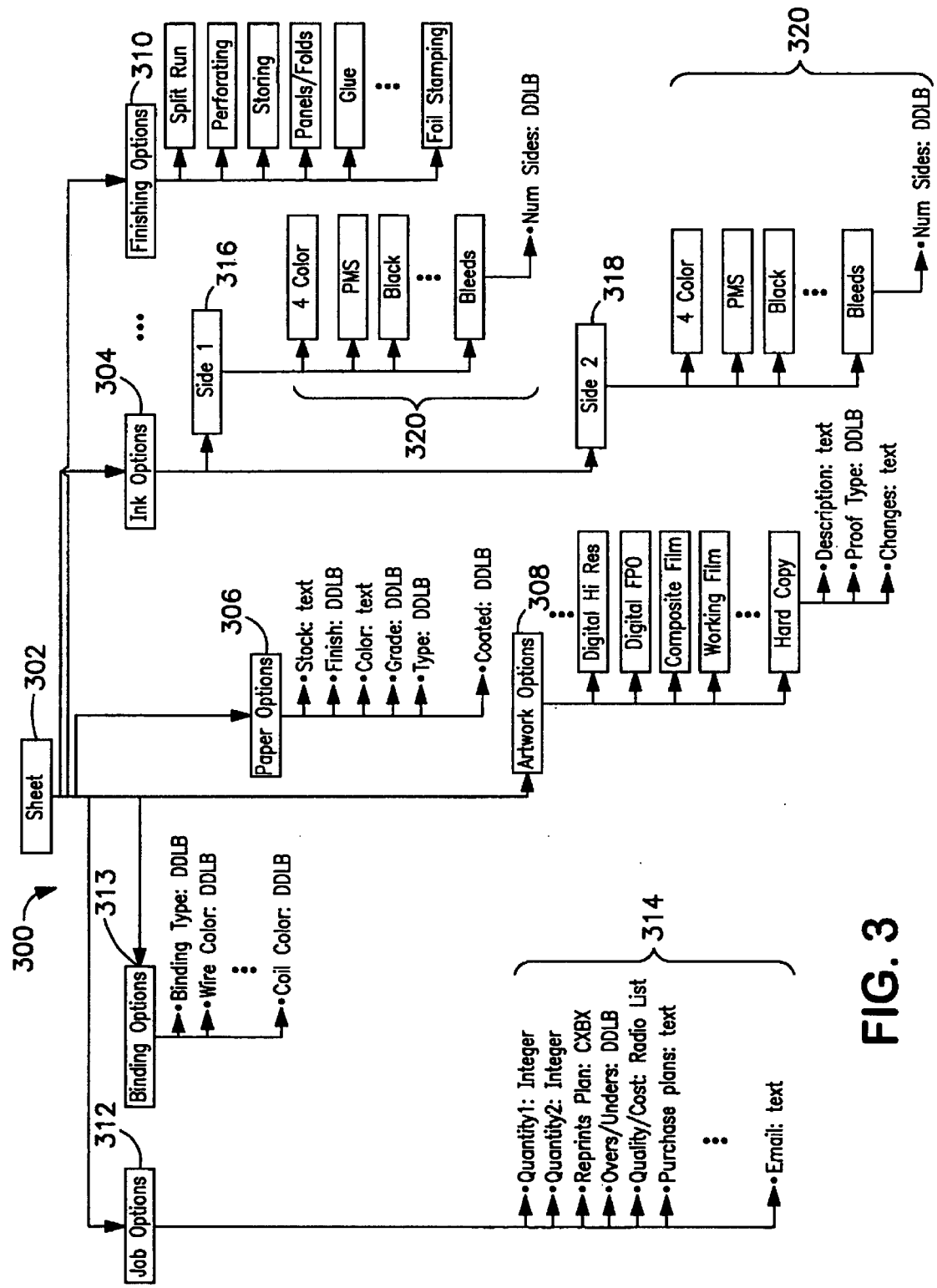
FIG. 3 is a block diagram depicting a visual representation of a domain tree, according to a preferred embodiment of the present invention.

FIG. 3 is a visual depiction of an example of a domain tree 300, according to a preferred embodiment of the present invention. In this example, the domain tree 300 shown is a small portion of a domain tree associated with the printing industry. In particular, the domain tree 300 can be used to generate product components and product specs for the printing industry.

The root node of the domain tree is the Sheet node 302. A Sheet node is used in this example because most print products can be distilled down to the printing a sheet. Recall, that specific products are not specified until component trees are created. An example of a component tree is described immediately below with reference to FIG. 4A.

Descendant Nodes are depicted below the root node. These descendant nodes are referred to herein as domain nodes. Domain nodes can have many types of attributes. In general they are used to organize or group the domain tree into logical sections. The logical sections were created as a result of step 248, where the industry expert places questions in context. As described below, the actual questions are the lowermost child nodes in the domain tree, and are referred to herein as variable nodes.

The Job Options node is an example of a domain node that is a section (also referred to herein as "section nodes)." Directly below the Job Options section node 312 are a series of variable nodes 314. These variable nodes 314 correspond directly to the questions that were created by the industry expert in step 244. In particular, variable nodes specify information related to questions and/or options presented to users during the spec entry phase 236.

For example, as shown in FIG. 3, the text of each question, as well as the type of user interface control used to present the question, is included in each variable node. For example, as can be seen by the first variable in the variable set 314, a text prompt "Quantity 1" is specified. This is used to prompt the user to enter data into a data entry field to indicate a first quantity. In addition, as indicated by the variable node 314, this particular text entry field is only to accept integer data.

The other variable nodes shown in the variable set 314 specify different controls such as drop-down list boxes, radio list buttons and entry fields that accept any type of alphanumeric data. Other information included in variable nodes, such as the variable set 314, includes a list of choices, default answers and/or a subset of the list of choices associated with the question.

It should be noted that domain nodes can provide additional information, such as formatting information and the like. For example, if a group of domain nodes are to appear together on a spec page, a node referred to as a grouping node can be used to specify this option. Similarly, if additional text is to appear with a particular variable node, a text node can be placed next to the associated variable node for this purpose. Such additional nodes that can be defined in the domain tree 300 depend on each specific implementation of the present invention. Any such definitions must be supported by page builder 208 and/or cache builder 206 components. Specific methods that can be used to implement these features would be apparent to persons skilled in the relevant art(s).

The other section nodes that are direct descendants (i.e. children or child nodes), of the root node 302 are the Binding options 313, the Artwork Options 308, the Paper Options 306, the Ink Options 304 and the Finishing Options 310 nodes. Some of these section nodes have other section nodes below them in the hierarchical domain tree data structure 300.

For example, the Artwork Options section node 308 has several child section nodes below it, such as the Digital Hi Res node and the Digital FPO node. As described in detail below, these nodes are used as an organization tool to facilitate the spec entry process in phase 238.

It should be noted that each section node typically ends with one or more variable nodes. Not all of the variable nodes are shown in the example in FIG. 3. Thus, for example, the Digital Hi Res section node under the Artwork Options node 308 typically contains one or more child nodes (not shown) that are variable nodes and comprise actual options or questions to users.

It should also be noted that an object of the present invention is to minimize duplication of data stored in the data base 104. Preferably, data is shared among nodes wherever possible, such that no data is entered more than once in the data base 104.

An example of this can be seen under the Ink Options node 304. It is noted that the Side 1 node 316 and the Side 2 node 318 have identical descendant section and variable nodes 320. Therefore, in order to avoid storing this information twice, pointers are used in the Side 1 316 and Side 2 318 nodes to reference this data. Specific methods to implement this feature of the present invention would be apparent to persons skilled in the relevant art(s).

As stated, a relational database system, such as the Informix® data base system is preferably used to implement the data base 104 of the present invention. Therefore, the domain tree 300 is preferably implemented using a plurality of relational data base tables, such as those provided by Informix and other similar data base management systems. Specific methods that can be used to organize and store the domain tree 300 using data base tables in a relational data base system 104 are too numerous to detail here. However, specific methods to perform this task would be apparent to persons skilled in the relevant art(s).

Figure 4A:
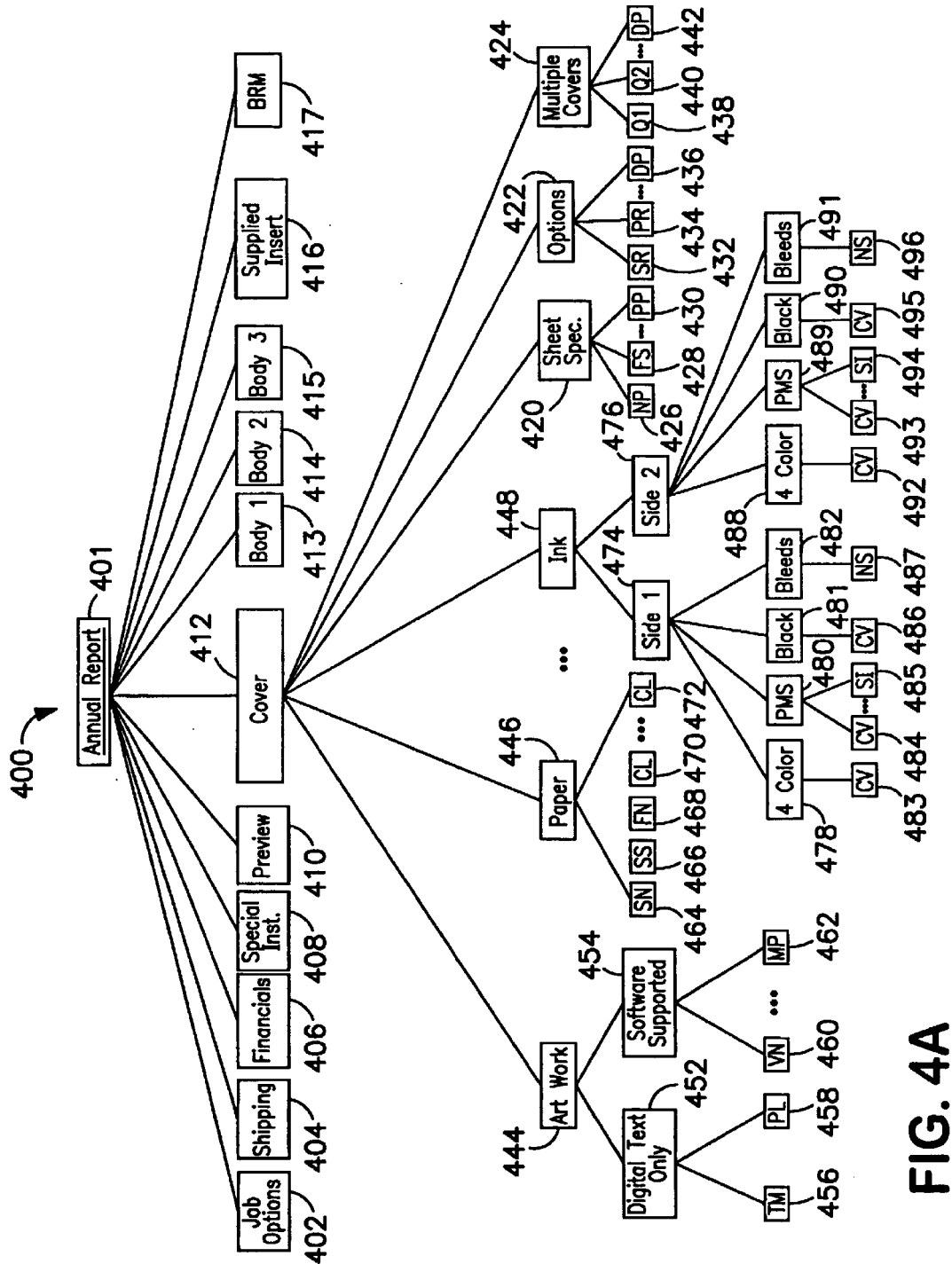
FIG. 4A is a block diagram depicting a visual representation of a component tree, according to a preferred embodiment of the present invention.

FIG. 4A is a block diagram depicting a visual representation of a component tree and a spec template, according to a preferred embodiment of the present invention. In particular, FIG. 4A shows a visual depiction of a dynamically constructed spec, in which a number of components 402–416 have been selected. In addition, FIG. 4A shows one component tree in detail, namely the Cover component tree 412.

The root node 402 represents a particular instance of spec for an Annual Report. In this example, a number of components 402–417 are included in the annual report spec. As stated, the number and frequency of components that comprise a particular instance of a spec, depend upon the spec template and user-selections made during the spec entry phase 236 (see the spec definition page 431, below). In this fashion, each particular instance of a spec is dynamically constructed during run-time.

An example of a spec definition page 431 that can be used to for defining components that are to be included in a particular instance of a spec is shown in FIG. 4B. This spec page 431 is preferably built by the page builder 208 or the cache builder 206, in accordance with the spec template definitions. In particular, as stated above, each template includes a minimum and maximum number for each component that can be included in the spec. The page builder 208 or cache builder 206 uses these component definitions to construct the web page 431.

In FIG. 4B, a list of components 429 is presented to the user. To the right each component is a drop-down list-box, such as the list box 419, that is used to accept a value from the user. This value defines the number of times the associated component is to appear in the spec. Note that in one embodiment, if the range of a particular component is equal to 0–1, then instead of a drop-down list-box, a check box is used to indicate whether to include or omit the associated component.

Accordingly, in this example of an instance of an annual report spec 437, the user selects: 3 body components 419; 1 supplied insert component 421; 0 double panel B/Card insert components 423; 1 BRC/BRM insert component 425; and 0 single panel B/Card components 427.

It should be noted that the values in the drop-down lists, such as the drop-down list 419, correspond to a range of values, from the minimum to the maximum, as defined in the spec template. It should also be noted that components, which are defined as required components having a fixed frequency, are not shown on page 431. This is so because the user has no choice with respect to such components at run-time.

Referring back to FIG. 4A, the component nodes 402–417 represent a set of components that comprise a particular instance of an Annual Report spec. This example spec corresponds to the user-specified components shown in FIG. 4B. In this example, the components 402–412 are required components that are to appear exactly once in each instance of an Annual Report spec. Accordingly, because the user has no choice with respect to these components 402–412, they are not included on the spec definition page 431.

The remaining components 414–417 correspond to the frequency and selection of components as defined by the user on the spec definition page 431. Accordingly, FIG. 4A depicts 3 body components 413, 414, and 415, a Supplied Insert Component 415 and a BRM component 416.

In this example, only the Cover component node 412 is partially expanded to display the details of a component tree. As shown, 6 direct descendants of the Cover node 412 are depicted. These child nodes are the ArtWork node 444; the Paper node 446; the Ink node 448; the Spec Sheet node 420; the Options node 422; and the Multiple Covers node 424.

The Sheet Spec node 420 has three child nodes 426–430 depicted in FIG. 4A. These are referred to herein as variable component nodes. Variable nodes represent actual questions or options that are to be answered and/or selected by users during the spec entry phase 236. In this example, the variable node NP 426 represents a data entry field with a prompt ("number of pages") that is to be displayed to the user during the spec entry phase 236.

It is noted that all of the bottom child nodes that are represented by two capital letters in FIG. 4A are variable component nodes. In particular, the nodes 426–442, 456–462, 464–472, 483–487 and 492–496 are variable component nodes. For simplicity, the questions, and/or options that are presented to users as a result of variable nodes are hereinafter referred to as "questions."

Component section nodes can also posses an additional attribute referred to as an outline node. Any component section node can be designated as an outline. The industry expert 202, via the content editor 204, specifies this designation. As will be described below, outline nodes are used to populate a navigation bar to assist the user during the spec entry phase 236. Examples of navigation bars are shown below in FIGS. 5 and 6.

Nodes that have been designated as outline nodes in this example are depicted with bold and italicized text. Accordingly, the nodes, Job Options 410, Cover 412, Body 414, Shipping 418, Art Work 444, Paper 446 and Ink 448 are outline nodes.

In addition, the industry expert can also designate any domain section node as an exportable node. In this example, the first row of outline nodes, namely the component nodes 402–417 are also exportable nodes. Nodes that are designated as exportable can become the starting point or root nodes of component trees, such as the components represented by the nodes 402–417.

For example, many products in the printing industry use covers. Thus, the Cover sub-tree (that is the Cover node 412 and the descendant nodes beneath it), can be shared among specs or templates by designating the Cover node 412 as an exportable node.

FIGS. 5–10 depict a series of web pages that can be generated from the domain tree 300 and the component tree 400. In this example, only the web pages generated from the expanded portion of the component tree shown in FIG. 4A are discussed. In particular, the web pages associated with a cover for an annual report (nodes 412 and 406) are described below. After reading the description below, it will become apparent to one or ordinary skill in the relevant art(s) how to generate web pages for any portion domain tree or component tree.

Figure 5:
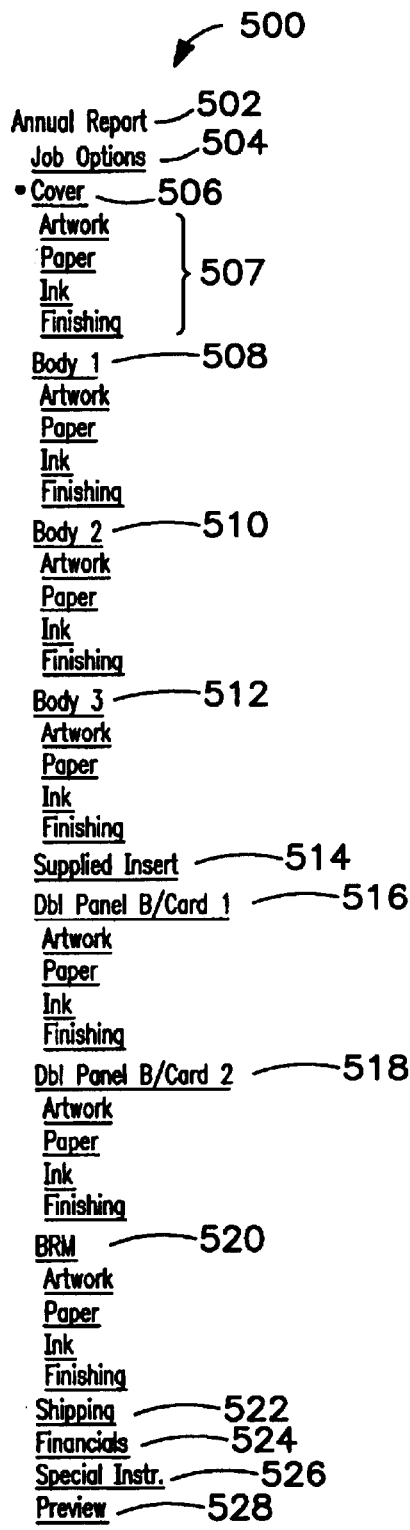
FIG. 5 is an example of a navigation bar generated from the spec defined in FIG. 4B, according to a preferred embodiment of the present invention.

FIG. 5 represents an example of a navigation bar. The navigation bar is constructed to allow a user navigate through a spec. Each navigation bar item represents a separate web page in the spec. The content of the navigation bar depends on the contents of each particular instance of a spec. Therefore the navigation bar is constructed at run-time, after the completion of a spec definition page, such as the spec definition page 431.

In this example, this particular instance of an Annual Report spec 502 comprises the following components: Job Options 504; 3 body components 508, 510 and 512; Supplied Insert 514; 2 Double Panel B/Card components 516 and 518; BRM 520; Shipping 522; Financial 524; Special Instructions 526 and Preview 528. The indented navigation bar items that appear under each component, such as the items 507 that appear under the Cover 506 component, represent outline nodes, as described above.

Figure 6:
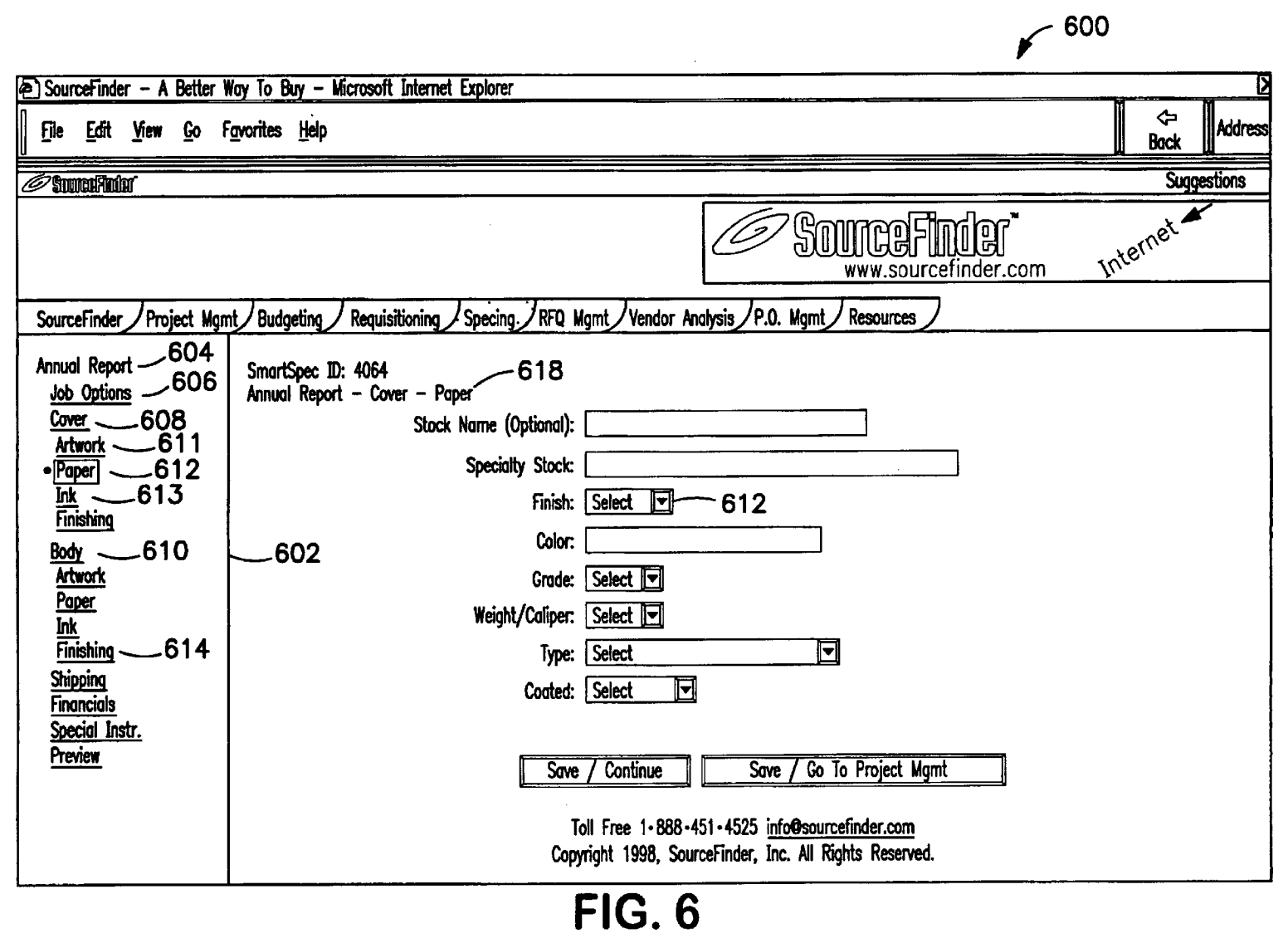

FIG. 6 is an example of web page 600, that includes another navigation bar 602. Note that the navigation bar 602, in this example, also represents separate web pages of an Annual Report spec (as indicated by the title 604). However, in this case, the navigation bar 602 is shorter than the navigation bar 500, because in this example, a less complex spec has been specified on the spec definition page 431.

The navigation bar 602 is used to allow the user to navigate through different pages or sections of the spec. The items in the navigation bar 602 map to the outline nodes in the component tree 400, as described above. For example, the Job Options navigation bar item 604 corresponds to the Job Options outline node 410. Similarly the Cover 608 and the Body 610 navigation bar items correspond to the Cover 412 and Body 414 outline nodes.

It should be recalled that child outline nodes in the component tree 400 represent sub-sections of the parent outline nodes. For example, the Paper outline node 446 is a sub-section of the Cover outline node 412. This relationship is also depicted in the navigation bar 602. In particular, sub-sections appear under their parent sections and are indented from the parent sections.

For example, the child outline node Artwork 444, which is a child of the Cover outline node 412, is displayed in the navigation bar 602 as an indented item 611 under the Cover item 608. Similarly, the Paper navigation bar item 612 and the Ink navigation bar item 613 both appear underneath and indented from the Cover navigation bar item 608. These navigation items correspond to the Paper, Ink and Cover outline nodes 446, 448 and 412, respectively.

Note that in this example, a visual indicator in the form of a dot is displayed next to the Paper navigation bar item 612. This indicates that the currently displayed web page is the Paper web page 600. This information is also displayed on the page header 618.

Each navigation bar item is a hyperlink to the web page represented by that item. Thus, by selecting different navigation bar items, users have the option to complete a spec in any order they wish. However, by completing a spec out of the suggested order indicated by the navigation bar, may result in a less advantageous spec entry phase 236.

This is so because of the dynamically generated web pages as described above with reference to the content reader 210 and the rule processor 214. It should be recalled that an advantage of the present invention is that the content of each dynamically generated web page can change depending on previous answers and selections by the user. This can assist the user in completing a spec by only presenting options that are relevant. However, by not following the order suggested by the navigation bar 602, users may not completely take advantage of this feature.

For example, suppose a user selects a particular finishing option on one web page. (An example of such finishing options 724–726 can be seen on the next web page 700, shown in FIG. 7). In this example, the rule processor 214 may provide that the options displayed on the finishing page web page later in the spec (see navigation bar item 614), depend on the finishing options 724–726 selected on page 700. In this fashion, only those selected options from page 700 would be displayed on the finishing page.

However, if a user jumps to the finishing page (i.e. by selecting item 614 in the navigation bar 602) before completing page 700, the user may be presented, for example, with all default options pertaining to all finishing types.

Accordingly, although the present invention provides tools that allow users to jump around the pages in a spec, it is not always advantageous to do so. Of course this feature is completely dependent upon each specific implementation of the present invention.

Referring now to FIG. 7, the web page 700 represents an example of a first web page under the Cover component. Before describing the details associated with the individual fields comprising the web page 700, it is useful to describe which portions of the web page 700 is preferably constructed with the cache builder 206, and which portions are constructed with the page builder 208.

It should be recalled that the cache builder 206 is an optional component of the present invention that can be used to increase the performance of the spec server 106 by creating programs that represent portions of web pages in advance. This preferred method is suggested because a preferred embodiment of the present invention is implemented over the Internet 102, where performance is currently a major issue. This may not always be the case. Higher bandwidth and faster hardware may render this issue moot in the not to distant future.

If performance were not an issue, all of the web pages could be constructed dynamically, with the page builder module 208. In any case, whether the web pages are built dynamically, or pre-processed with the cache builder, the concepts presented herein remain the same. Thus, the present invention can be implemented with or without the presence of the cache builder component 206. However, as stated, due to current speeds and bandwidths, the cache builder 206 is used in a preferred embodiment.

It should be noted that the web page generation programs created by the cache builder 206, preferably use the run-time environment to determine page contents. For example, certain options are printed only if certain flags are set or contain a certain value. The value of the flag is set at run-time in accordance with the processing rules in the data base 104 and the path taken by the user during the spec entry phase 236. This is how the cache builder 206 dynamically determines which options to present to users, depending on user input, even thought the web page programs are created well in advance of run-time.

In this example, the cache builder 206 pre-processes the portion of the web page 700 depicted inside the dotted lines 704. The page builder 208 provides the header 702 and the destination footer 708. The header 702 and the destination footer 708 both depend on the current spec and therefore must be dynamically constructed during run-time. In particular, both the header 702 and the destination footer depend on a particular spec and are thus preferably generated in real time during the spec entry phase 238.

Conversely, the variables displayed inside the dotted line 704 can actually appear as a page in many of the component specs in the print domain 402. Specifically, any component spec that uses covers may potentially display this portion 704 of the web page 700.

The destination footer in this example is used to determine the next page that is to be displayed to the user after the save/continue button 708 is depressed. In some implementations of the present invention, the push button may indicate the name of the next spec page. Accordingly, the header 702 and destination footer 708 is generated by the page builder 208 at run-time.

The particular fields that comprise the web page 700 and their corresponding objects from the component tree 400, will now be described. The web page 700 is divided into three sections, the Sheet Specs section 710, the Options section 712 and the Multiple Covers section 714. These sections map directly to the Section nodes 420, 422 and 424, respectively.

Note that in the component tree 400, each of the Section nodes 420, 422 and 424 have a number of variable nodes, such as the variable nodes 426, 428 and 430. These variable nodes map to actual questions presented to users.

For example, the variable node NP 426 maps to the data entry field (and prompt) 718. The variable node FS 428 maps to the pull-down list box 720, and the variable node PP 430 maps to the pull-down list box 722.

In a similar fashion, the questions that appear under the Options section 712, map to the variable nodes that are children of the Options Outline node 422. In particular, the check box 724 maps to the variable node 423. The check box 726 maps to the variable node 434, and the check box 728 maps to the variable node 728.

Likewise, the questions that appear under the section Multiple Covers 714 map to the child variable nodes of the Multiple Cover outline node 424. In particular, the data entry field 730 maps to the variable node 458. The data entry field 440, maps to the data entry field 732, and the edit box 734 maps to the variable node 442.

It should be recalled that the industry expert 202 specifies information related to the display of each question in phase 232, via the content editor 204. Such information includes the size of the field necessary for the prompt, the length of data expected, the type of user interface controls, the format of the data entered by users, etc.

When a user at the web interface 108 completes the page 700, the save/continue push button is typically depressed. This action causes the page shown in FIG. 8 to be displayed. FIG. 8 represents a web page generated from the Art Work section node 444 and its descendants. In particular, the header 804 displays the name of each section nodes 444 and 412, as well as the name of the component node 406. The web page is again divided into sections, as shown by the visual cues, 804 and 806, which map to the section nodes 452 and 454, respectively. Under each section, (804 and 806) are questions 810, which correspond to the variable nodes 456–458 and 460–462, respectively. Upon completion of this web page 800, the user typically clicks on the save/continue button 812. When this occurs, the web page depicted in FIG. 9 is presented.

FIG. 9 represents a web page generated from the Paper section node 446 and its descendants. In this example, the only descendants of the Paper section node 446 are variable nodes. Thus, this page is not divided in sub-sections, as were previous pages.

Once again, the header 902 displays the name of the current outline node, in this case Paper 446, and the component node, in this case Annual Report 406, and all intervening outline nodes, in this case, Cover 412. Finally, questions 904 corresponding to the variable nodes 464–472 are presented. Upon completion, the user clicks on the save/continue button 906. This action causes the web page shown in FIG. 10 to be displayed.

Figure 10:
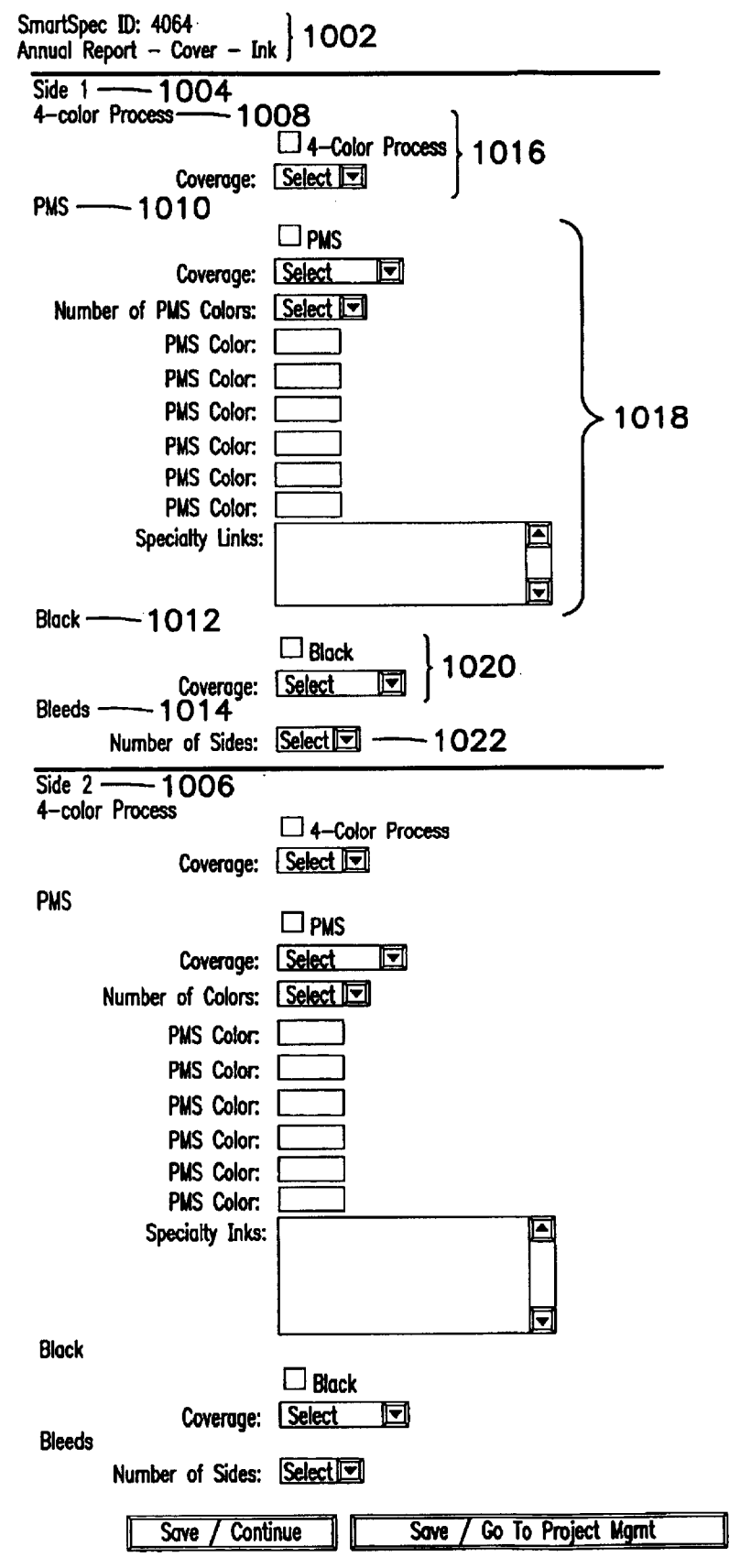

FIG. 10 represents a web page generated from the Ink section node 448 and its descendants. The header 1002 shows the spec section by printing out the Component node 406, and the section nodes 412 and 448, as previously described. Once again the section nodes 474 and 476 are used to visually organize the page by breaking it into sections and sub-sections. The sections 1004 and 1006 map to the section nodes 474 and 476. The subsections 1008, 1010, 1012, and 1014 correspond to the section nodes 478, 480, 481 and 481, respectively. The questions presented to the user under each subsection, map to the child variable nodes of the corresponding subsection node. In particular, the question 1016 maps to the variable node 483. The questions 1018 map to the variable nodes 484–485. The question 1020 maps to the variable node 486 and the question 1022 maps to the variable node 487. The second main section 1006 dealing with Side 2 of the cover is exactly the same as the first section and will therefore not be repeated.

Figure 11:
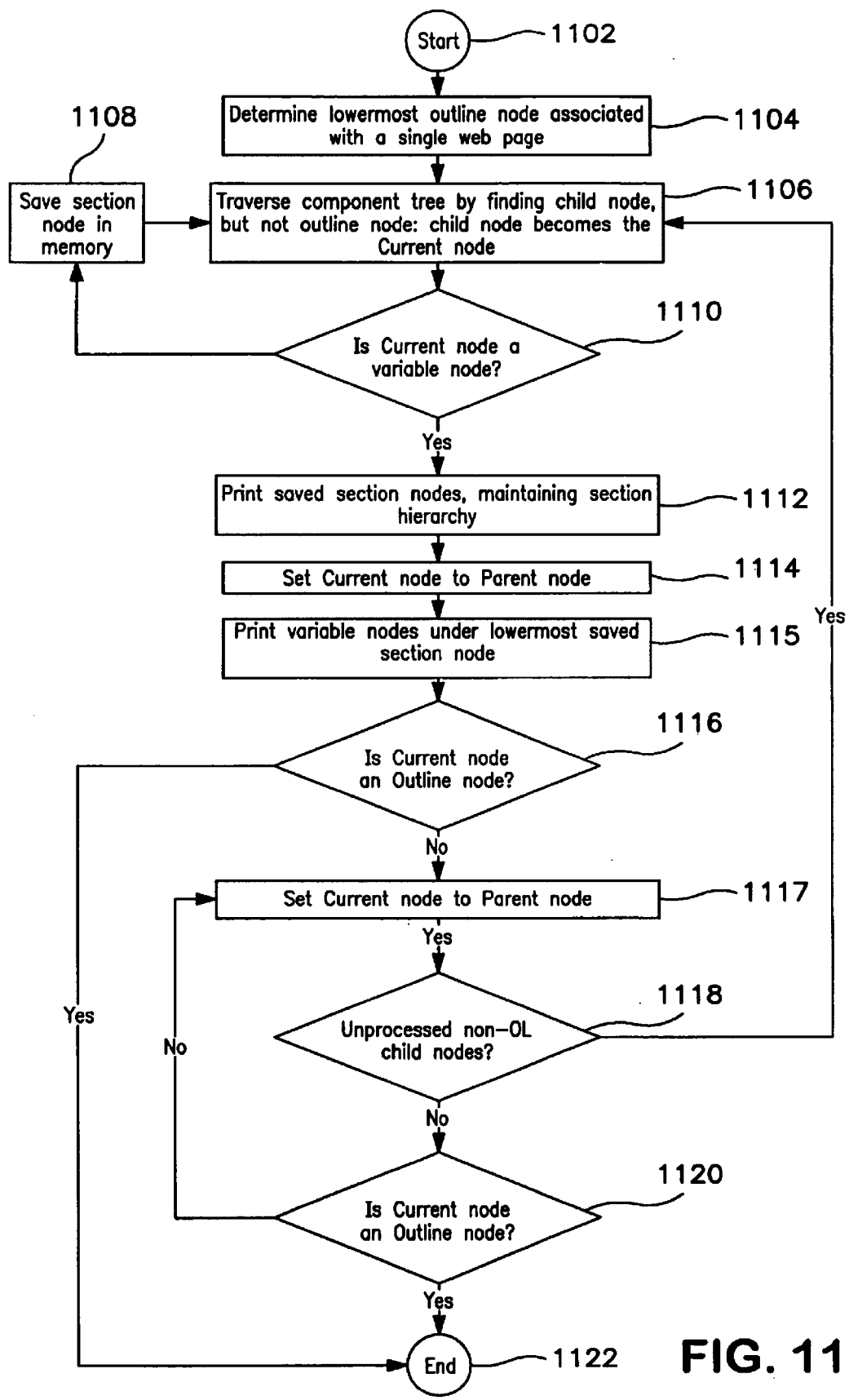
FIG. 11 is a flowchart depicting a process that can be used to generate web pages from a component tree, according to a preferred embodiment of the present invention.

FIG. 11 is a flowchart depicting an algorithm that can be used to generate any web page from any component tree in accordance with the present invention. As an example, portions of the web page 700 as generated from the component tree 400 is described with the flowchart in FIG. 11. However, before describing the details of this process, it is useful to highlight several distinct features of the component tree 400 according to a preferred embodiment of the present invention.

Preferably, a single web page that is ultimately presented to users during the spec entry phase 236, is represented in the component tree 400 as group of variable nodes that share a common parent that is the first parent outline node. For example, referring now to FIG. 4A, a single web page is represented by the Cover outline node 412, the child section nodes 420, 422 and 424 and the associated variable nodes 426–442. Note that the Cover outline node 412 is the first parent node of the variables 426–442 that is also an outline node. This is referred to herein as the "lowermost outline node." An example of a web page generated by this lineage is shown in FIG. 7.

Note that the other child nodes of the Cover outline node 412, namely the Artwork 444, Paper 446 and Ink nodes 448, are not parts of the single web page as described above. This is so because the Cover outline node 412 is not the lowermost outline node for the variable nodes associated with the Artwork 444, Paper 446 and Ink nodes 448.

In fact, in this example, the Artwork 444, Paper 446 and Ink nodes 448 themselves represent lowermost outline nodes for each of their corresponding child variable nodes. As such, the Artwork 444, Paper 446 and Ink nodes 448 each represent a separate web page. That is, the Artwork outline node 444 is the lowermost outline node for the variables 456–462. The Paper outline node 446 is the lowermost outline node for the variables 464–472. The Ink outline node 448 is the lowermost outline node for the variables 483–496. Examples of web pages that can be generated from the Art work 444, Paper 446 and Ink 448 lowermost outline nodes (and their descendants) are depicted in FIGS. 8, 9 and 10, respectively.

In sum, the lowermost outline node is defined as the first parent outline node of any set of variable nodes. This lineage defines a single web page generated by a preferred embodiment of the present invention. Thus, all of the variable nodes that share a lowermost outline node as their first parent outline node, appear on the same physical web page. It should be noted that in a preferred embodiment, web pages are constructed with a vertical scroll bar to allow for pages of arbitrary lengths. This feature greatly simplifies the process of formatting web pages, because the length of the web page is not a formatting issue.

Referring now to the flowchart in FIG. 11, a process that can be used to construct a web page from a component tree will now be described. The component tree 400 and the web page 700 will be used as examples during the description of this process.

The process begins with step 1102, where control immediately passes to step 1104. In step 1104, the process determines a lowermost outline node associated with a particular web page that is to be generated. In this example, it is assumed that the Cover 412 outline node is selected. This can occur, for example, if a user selects the cover navigation bar item 608, as shown in FIG. 6. For example, this would cause the web page associated with the navigation bar item 608 to be displayed.

It should be noted that generally, web pages are presented in any order in accordance with each specific implementation of the present invention. Typically, the industry expert specifies a particular order in which to present web pages and the component tree is built accordingly.

Once a lowermost outline node is identified, control passes to step 1106. In step 1106, the process traverses the component tree 400 by identifying the next child node that is not an outline node. In this example, the next child node that is not an outline node is the Sheet Spec node 420. This node becomes the current node.

Next, control passes to step 1110. In step 1110, the process determines if the current node (i.e. node 420) is a variable node. In this example, the current node is not a variable node, but a section node. Accordingly, control passes to step 1108, where a description of the Sheet Spec section node 420 is saved in memory. As described below, data related to the relative hierarchy of the Sheet Spec section node 420 is also maintained in memory. The hierarchy is used to present visual cues to the user for organizational purposes on the web page.

Next, step 1106 is again executed. This time, the current node becomes the variable node NP 426. Next, control passes to step 1110, where the process again determines if the current node is a variable node. This time, the current node is indeed a variable node, and control passes to step 1112.

In step 1112, the saved section node(s) are printed and displayed in accordance with their hierarchy from the component tree 400. In this example, there is only one saved section node, namely the Sheet Spec section node 420. However, it should be noted that in general, the loop represented by steps 1106–1110 may be executed an arbitrary number of times, yielding an arbitrary number of section nodes between the variable node(s) and the lowermost outline node. These section nodes typically represent sections and sub-sections of the web page. An example of a case having two section nodes between the variable nodes and the lowermost outline node is the Ink outline node 448.

It should also be noted that the current node may be identified as variable node the very first time step 1110 is executed. In this case, step 1108 is never executed. This occurs if there are zero section nodes between a lowermost outline node and the associated variable node(s). An example of a case having this property is the Paper node 446. Note that the paper node 446 is a lowermost outline node and that no other section nodes appear underneath it.

In step 1112, section nodes that are lower in hierarchy are typically printed in an indented fashion from their parent section nodes. In addition, certain formatting options can apply to specific hierarchies to aid in the visual organization of the spec. For example, a line drawn across a web page can be associated with specific hierarchies.

Thus, as a result of step 1112, the Sheet Specs section 710 is printed on the web page 700, as shown in FIG. 7. This includes the line drawn across the web page. Next, control passes to step 1114. In step 1114, the current node is set to the parent node. In this example the current node becomes the Sheet Spec node 420. Next control passes to step 1115.

In step 115, all of the variable nodes (i.e. the children of the current node) are printed. In this example, the questions 718–722 corresponding to the variable nodes 426–430 are printed just under the Sheet Specs section 710.

Next, as indicated by step 1116, the process determines if the current node is an outline node. This can occur, for example, if there are no section nodes between the lowermost outline node and the variable nodes. An example of this condition is the Paper node 446. If in step 1116 the current node is an outline node (i.e. by definition, the lowermost outline node), the process is complete as indicated by step 1122.

However, using the present example, the current node is not an outline node. As such, control passes to step 1117. In step 117 the current node is set to the parent node. In this case, the parent node of the Sheet Spec node 420 is the namely the Cover node 412. Next, control passes to step 1118.

In step 1118, the process determines if there are any non-outline children nodes that have not been processed. If so, control passes to step 1106, where steps 1106–1117 are repeated. Accordingly, in this example, the Options node 422 and its descendants are processed next in the loop 1106–1117, in an identical fashion as described above with respect to the Sheet Spec node 420. This generates the options section header 712 and the associated variables 724–728 on the web page 700.

When the loop 1106–1117 is completed, step 1118 is then executed. This time the process determines that yet another unprocessed non-outline node exists, namely the Multiple Covers node 424. Thus, the loop 1106–1117 is again executed to generate the Multiple covers section header 714 and the associated variables 730–734 on the web page 700.

Finally, step 1118 is again executed. This time, the process determines that there are no additional unprocessed non-outline children of the Cover node 412. Accordingly, control passes to step 1120.

In step 1120, the process determines whether the current node is an outline node. In this example the current node is an outline node (i.e. the Cover outline node 412) and the process ends as indicated by step 1122.

If it is determined that the current node is not an outline node in step 1120, control could pass to step 1117, where the current node is set to the parent node. An example of this condition can be seen for the web page that would be generated from the Ink lowermost outline node 448. For example, in this case control would pass from step 1120 to step 1117 after the Side 1 section 474 node had been processed. Accordingly, the loop represented by steps 1117–1120 is executed when more than one section node lies between the variable nodes and the lowermost outline node of a web page.

After setting the current node to the parent node in step 1117, control passes to step 1118. In step 1118, the process again determines if there are any other unprocessed non-outline nodes. If so, the loop represented by steps 1106–1117 is repeated. If not, the loop represented by steps 1117 to 1120 are repeated, or the process may end, as indicated by step 1120. In any case, the process continues until step 1120 determines that the current node is the outline node, in which case, the process ends with step 1122.

Figure 12:
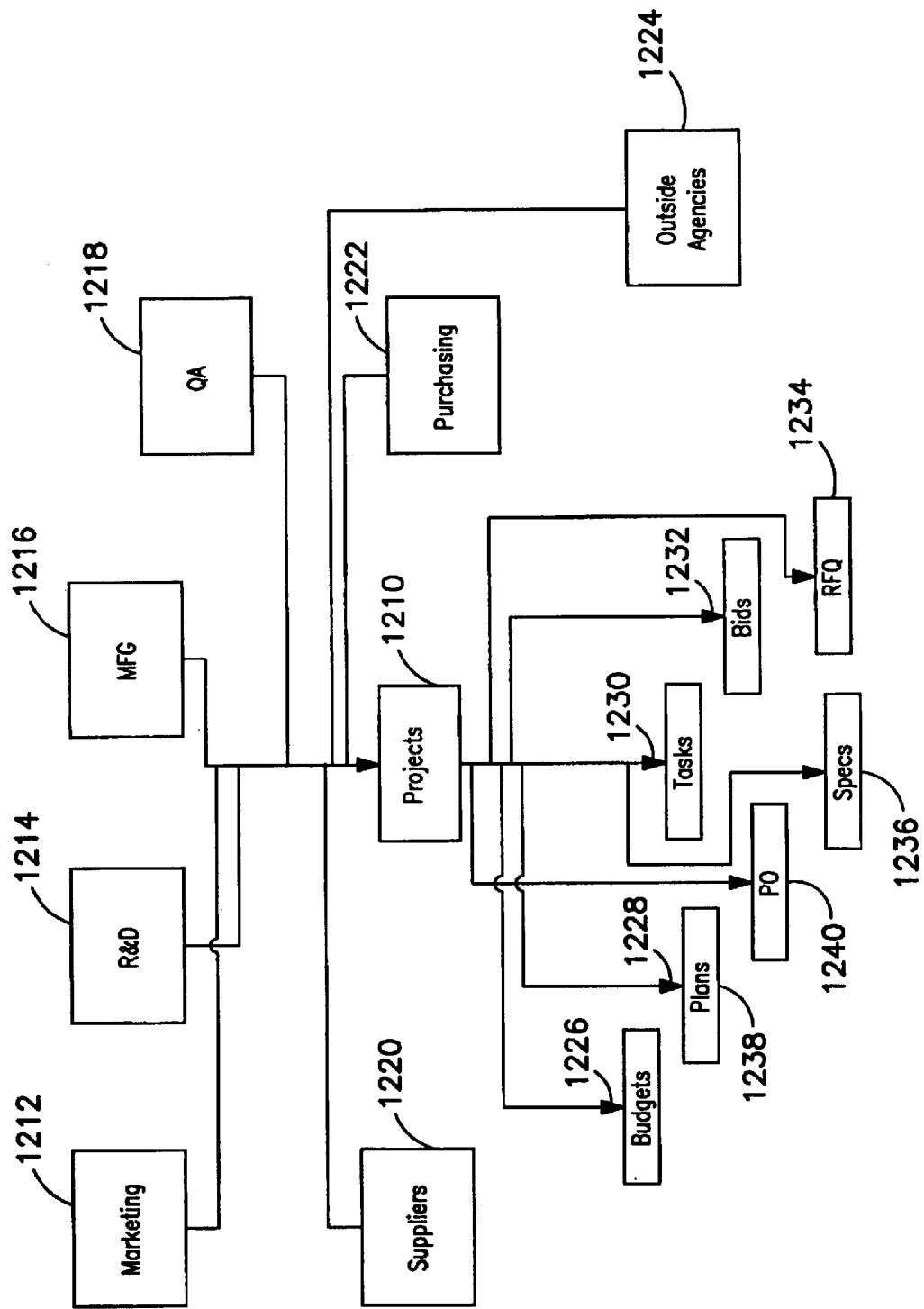
FIG. 12 is a block diagram showing an operational environment of the present invention in terms of user groups both inside and outside an enterprise.

Details of the project manager portion of the present invention will now be described with reference to the FIGS. below. FIG. 12 is a block diagram showing an operational environment of the present invention in terms of user groups both inside and outside an enterprise. The project manager 1210 is depicted as a central server in the center of FIG. 12. Different organizational entities 1212–1224 are coupled with the project manager 1210. Typically, these entities 1212–1224 interact with the project manager 1210, via the web interface 108.

As shown in FIG. 12, the organizational entities 1212–1224 can include organizations within an enterprise and outside agencies. In this example, the organizations within the enterprise include marketing 1212, research and development 1214, manufacturing 1216, quality assurance 1218 and purchasing 1222. Outside agencies are represented by the outside agencies block 1224 and the suppliers block 1220.

The smaller blocks 1226–1234 depicted below the project manager 1210 represent data objects comprising a project management tree according to a preferred embodiment of the present invention. As shown, the data objects comprising the project management tree represent items such as budgets 1226, plans 1228, purchase orders 1240, specs 1236, tasks 1230, bids 1232 and RFQs 1234.

Accordingly, multiple organizational work-groups 1212–1224, including groups both inside and outside of the enterprise, interact in a real-time and active fashion with the project manager 1210 to complete projects. In one example scenario, a group, such as the marketing group 1212, completes a spec 1236 as part of a task 1230 to purchase goods or services. The project manager 1210 creates an RFQ 1234 from the spec 1236 and sends it to suitable suppliers 1220. The suppliers 1220 create bids 1232 for the requested goods or service. The marketing group can then accept a bid and create a purchase order 1240. Upon completion of the purchase order 1240 the task 1230 associated with it, is marked as being complete. In addition, any financial objects affected by the purchase order 1240, such as project budgets 1226 and the like are automatically updated.

Figure 13:
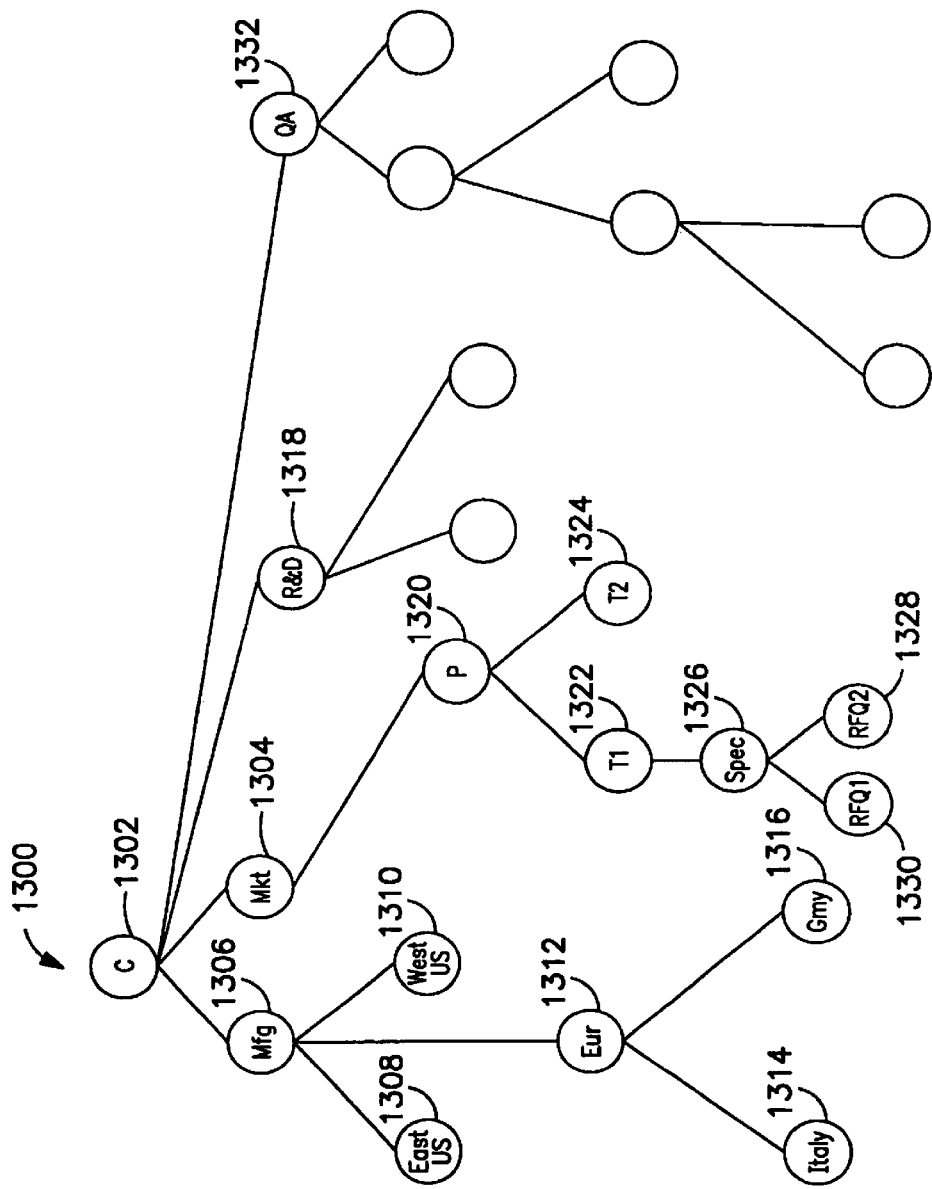
FIG. 13 is a block diagram depicting an example of a project management tree according to a preferred embodiment of the present invention.

FIG. 13 is a block diagram depicting a project management tree 1300 according to a preferred embodiment of the present invention. The circles, such as the circles 1302 and 1306 represent project tree nodes. Unlike conventional project management systems, project tree nodes can comprise classes of objects that are not limited to typical project management types of objects, such as tasks, resources and files.

In fact, an advantage of the present invention is that the project management tree 1300 may comprise infinite classes of objects. Such classes of objects can include for example, tasks, notes, files, purchase orders, requisitions, organizational entities, people, to-do-lists, timesheets, costs, etc. Additional classes can be added as required. These objects are grouped in a hierarchical fashion.

Thus, a significant advantage of the present invention is that it is flexible enough to be adapted to any type of environment. Accordingly, the examples used herein that describe the present invention in terms of enterprise marking operations should not be construed to limit the scope and breadth of the present invention.

Typically, project trees, such as the project tree 1300 start with an organizational structure. However, this is just one implementation of the present invention. In other implementations an organizational structure may not be required, for example, in the case of small entities. In this example, the project tree 1300 may begin with a project, task, work group or individuals.

The point is that the project tree 1300 can comprise objects in whatever order or hierarchy defined for each specific implementation of the present invention. As will be described below, each class of objects that comprises a project tree contains definitions describing its place in the project tree. For example, each project node self-describes certain functions related to adding, deleting, editing and archiving itself from the project tree. For example, each instance of an object defines what types of objects can appear beneath them, what objects are affected when they are deleted, edited, etc.

In the example presented in FIG. 13, the project node 1302 represents an organizational object that represents the company or enterprise. This object may for example, contain the name of the enterprise, or any other information that the project manager sees fit to include in this type of object node.

The project nodes directly beneath the enterprise node 1302 also represent enterprise organizational objects. Specifically, these nodes represent the divisions of manufacturing 1306, marketing 1304, research and development 1304 and quality assurance 1332.

Child nodes (hereinafter referred to as "children") of the manufacturing project node 1306 represent a continued hierarchical organizational structure. Specifically, manufacturing is divided into East U.S. 1308, West U.S. 1310 and Europe 1312. The European manufacturing division 1312 is further divided into two additional divisions, Italy 1314 and Germany 1316.

Under the marketing organizational node 1304, is a project tree node that represents a particular project 1320 under the Marketing division 1304. The project node 1320 is further divided into two tasks, 1322 and 1324. Under the node that represents task 1322 is a node 1326 that represents a spec object. This indicates that as part of the task 1322, a spec is to be completed. In this example, the spec has been completed because two RFQs 1328 and 1330 are shown beneath it. This indicates that two RFQs have been generated from the completed spec 1326.

Figure 14:
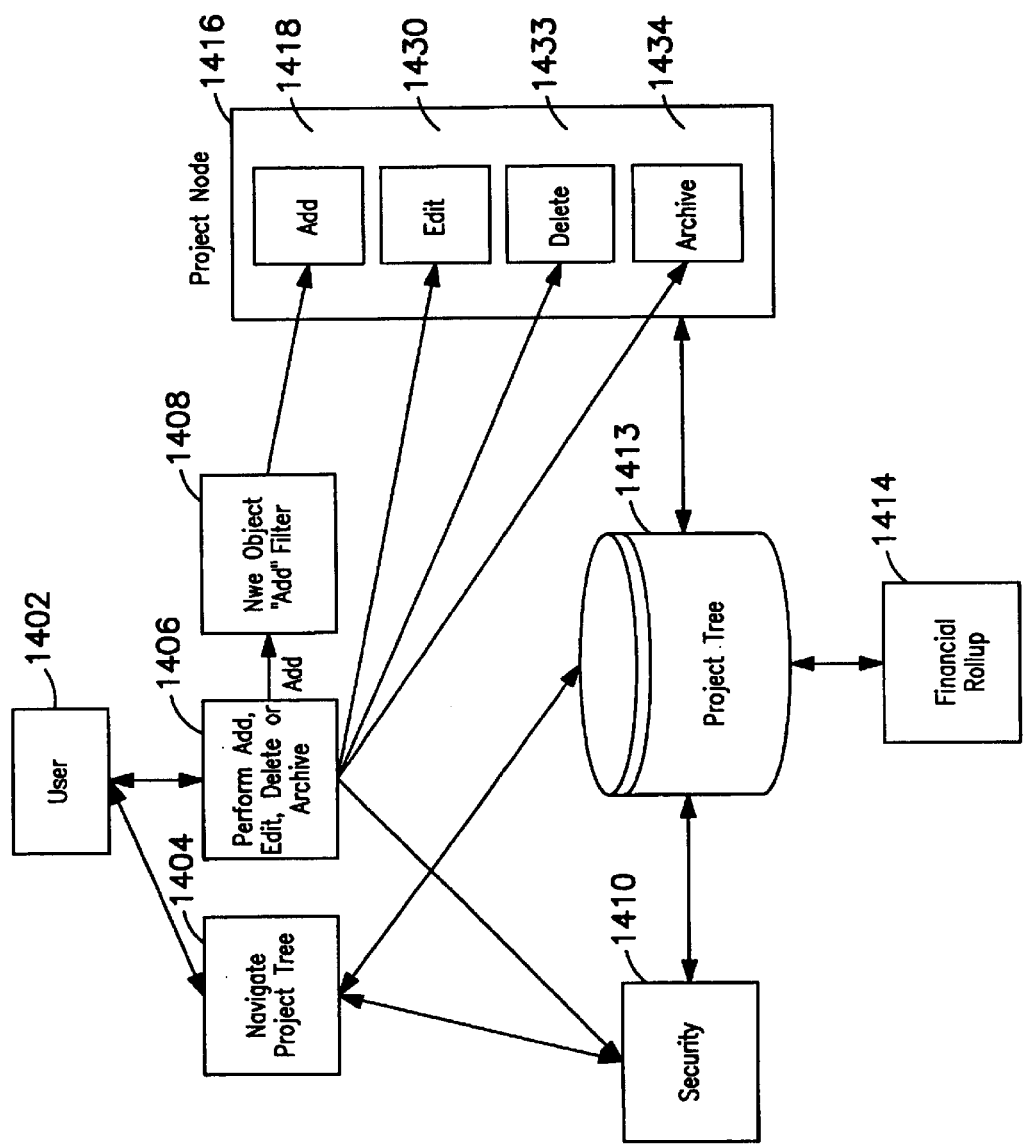
FIG. 14 is a block diagram depicting functional components of the project manager according to a preferred embodiment of the present invention.

FIG. 14 is a block diagram depicting functional components of the project manager 1210 according to a preferred embodiment of the present invention. A user at the web interface 108 is represented by block 1402. The user can navigate the project tree 1404 via the Navigation component 1404. In addition, the user can perform functions on project nodes. As indicated by component 1406, the user 1402 can perform the following operations on project tree nodes: add, edit, delete and archive.

A project tree, such as the project tree shown in FIG. 13, is represented by block 1413. A security module is depicted as block 1410. The security component 1410 is used to restrict access to functions 1406 and views of the project tree 1413 (via the navigation component 1404) in accordance with user and/or group access rights. Typically, an administrator assigns these rights.

For example, the security module 1410 can prevent a user in the manufacturing division 1306 from performing functions related to tasks within the marketing division 1304. In addition, the security module 1410 can prevent a user from being able to view tasks in other divisions, or tasks that are not assigned to the particular user 1402, etc. Many levels of access rights pertaining to viewing and performing functions on project trees 1413 can be assigned. The definition of such rights depends on each specific implementation of the present invention.

The functions of add 1418, edit 1430, delete 1433 and archive 1434, are defined within each project node 1416. In this fashion, each node can behave differently. For example, when a user deletes one type of node, it may make sense to delete all of the children nodes as well. On the other hand, for another node class, it may make sense to just delete the one node and promote the child nodes beneath it.

In another example, different editing techniques are desirable for different classes of nodes. For example, an editing technique for an organizational node may be as simple as editing a text entry field used to provide a description for the node. However, editing a spec node, may comprise for example, interacting with the spec server 106 to present the spec to the user for editing. Editing a file node may involve downloading the file to user and/or launching a word processor or other application associated with the file.

In addition, objects may perform different actions for one or more of the above mentioned functions, depending on what state they are in. For example, when a user requests to "edit" an RFQ object (which represents a request for price quotation), different default actions are performed, depending on whether or not the RFQ has been sent out to suppliers. For example, if the RFQ has not been sent to suppliers, the edit function may present the user with a list of compatible suppliers, so that the user can select which ones are sent the RFQ. On the other hand, if the RFQ has already been sent out, the same edit request (i.e. double click or the like), may cause the system to present the user with a list of which suppliers have received the RFQ and which suppliers have returned bids for the RFQ.

Accordingly, by placing functions, such as add, edit, delete and archive functions, directly within each object node comprising the project tree 1413, provides this level of flexibility.

The new object filter 1408 is used to add a new object to a project tree 1413. Specifically, when a user 1402 selects the add-object function 1406, the new object filter 1408 determines, and presents to the user 1402, a list of allowable objects that can be added to the project tree at that particular point. This determination depends on pre-defined definitions that specify what types of objects that can be added to other types of objects. In addition, the security module is used to determine what type of objects, if any, can be added by this particular user 1402.

The final component depicted in FIG. 14 is the financial rollup component 1414. The financial rollup component is used whenever a monetary figure is added, modified or deleted to the project tree 1414. When any of these events occur, the financial rollup component 1414 updates other financially related nodes that are affected. This is accomplished by traversing the project tree 1413 in the upward direction and updating any nodes that are defined as financial, such as actual and budget dollar amounts associated with a project.

Figure 15:
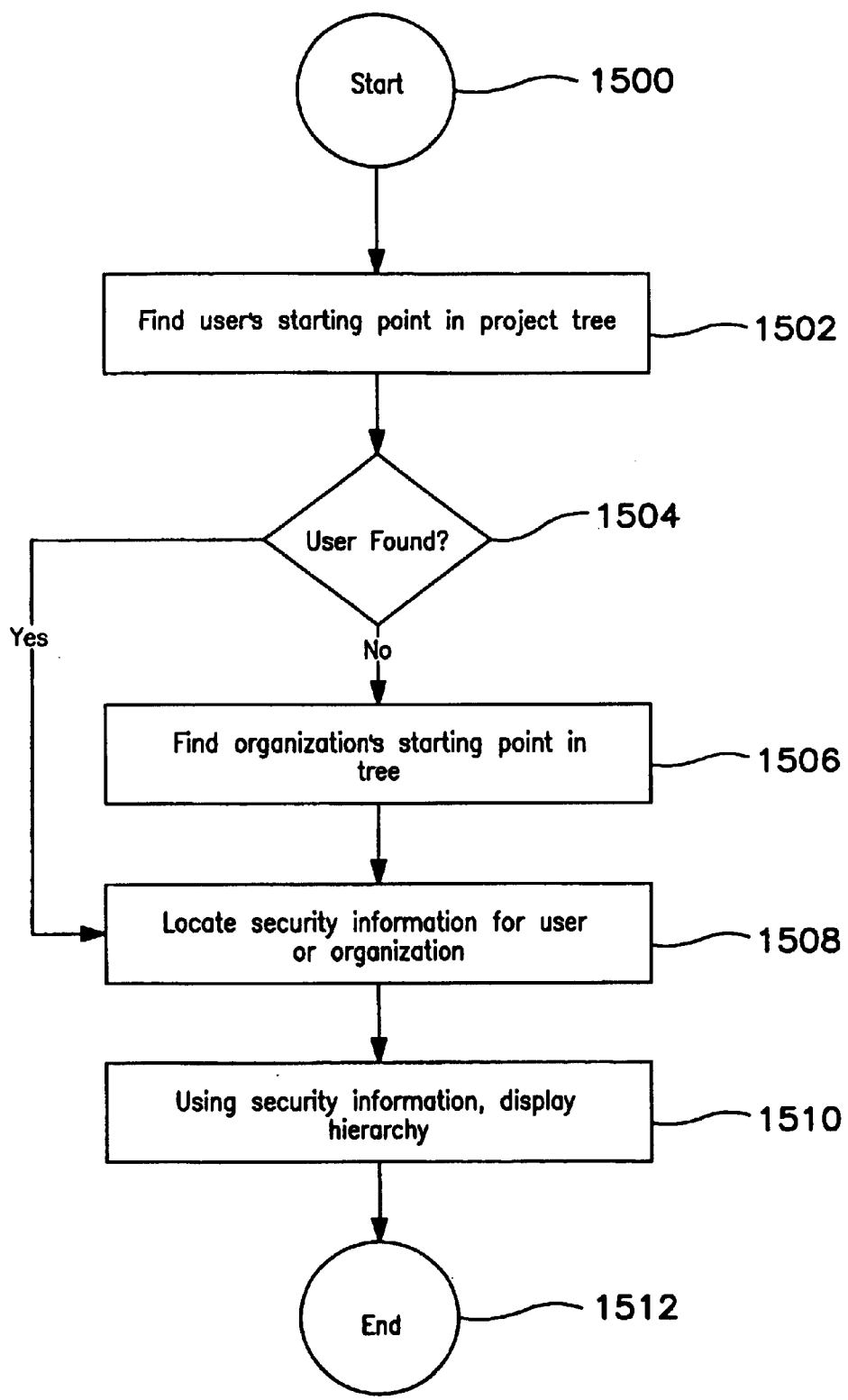
FIG. 15 is a flowchart depicting a process that can be used to present a project tree to a user according to a preferred embodiment of the present invention.

FIG. 15 is a flowchart depicting a process that can be used to present a project tree to a user according to a preferred embodiment of the present invention. The process begins with step 1500, where control immediately passes to step 1502. In step 1502 the process attempts to find the user's starting point in the project tree 1413. This is accomplished by traversing the project tree and searching for a node associated with the particular user 1402. In general, any type of node can comprise a list of one or more users. This information is used for example, to determine a user's starting point in the project tree. Typically, the starting point is used as the root node for that particular user.

Of course, whether or not the user can view other parts of the project tree depends on the node definitions and the user access right definitions. Such definitions vary depending on each specific implementation of the present invention.

In step 1504, the process determines if a node associated with the user is present in the tree 1413. If not, the process determines a starting point for the user's organization and uses that as the user's starting point. Control next passes to step 1508.

In step 1508, the process locates security information to determine access rights associated with the user or organization. Next, as indicated in step 1510, the process displays the project tree hierarchy in accordance with the user access rights from step 1508. The process ends as indicated by step 1512.

Example of a preferred embodiment

The following example represents one embodiment of the present invention. In this example embodiment, the project management system of the present invention is customized for assisting in the management of projects for a marketing organization. Through this example, a through explanation of the features and functions of the present invention is presented.

However, this example represents just one embodiment of the present invention and should not be construed to be limiting. This is especially true as it relates to details describing the example embodiment in terms of user interface controls and specific project management processes related to a marketing organization. It should be recalled that an advantage of the present invention is its flexibility that enables it to be customized for any type multiple organizational work-groups. Accordingly, the use of the example embodiment presented below should not be construed to limit the scope and breadth of the present invention.

Term definitions:

In the examples below, certain terms are used to describe this example embodiment. Below is a list of some of these terms and their definitions.

Spec—The electronic form a buyer member completes to solicit bids from supplier members. There are three kinds of Spec forms:

RapidSpec—SourceFinder's most abbreviated form, asking only the most basic questions and requiring the least time to complete. Ideal for simple jobs with few variables.

WizardSpec—A Spec form customized for a specific buyer organization, for jobs that are issued repeatedly with little change in format.

SmartSpec—The most in-depth form. Best for jobs that require a greater degree of detail.

RFQ—Request for Quote. The request a supplier receives, showing all the information the buyer has entered into the Spec form. As soon as a Spec is sent to selected suppliers, it becomes an RFQ.

Bid—A supplier's response to an RFQ s/he has received, including the dollar amount for which the supplier will complete the job.

Cost Center—A designation for budgeting purposes. Assigning a particular Project's, PO's, or other item's cost to a Cost Center means designating where the funds will come forth in a company's accounting structure.

Job—After an RFQ has been awarded to a supplier, it becomes a Job.

Project—Synonymous with a "folder" in Project Management. Can contain any number of elements associated with that Project: Tasks, Specs, To Do Items, etc. To show all the items within a Project, click on the "plus" sign next to its name to expand it.

To Do Item—A reminder you can create for yourself to complete a given action. Your To Do Items appear in Project Management and on your homepage. Only you can view your To Do Items.

Task—An action you can assign to yourself or someone else to complete. A Task is attached to a Project. When you assign a Task to someone else, it appears on that person's homepage.

Note—An electronic version of the yellow sticky note. You can attach this to any item in a Project folder, and a dialogue box allows you enter any amount of text in the Note.

Save As—Similar to the "Save As" function in word-processing programs, this allows you to save a Spec under another filename so you can reuse the form for another job. The saved-as Spec can be edited to reflect any changes in the new job.

Status—Each item shown in Project Management has a status–for example, "Open," "Closed," "Sent," and so on. Refer to Appendix C for a complete list of status codes.

Requisition—A request for the purchase of goods or services. You can create a new request under the "Requisitioning" tab in Project Management and designate where it will be filed if approved. Only certain users have the authority to approve a Requisition.

Introduction

In this example, upon logging-in to the project manager 110, a user 1402 sees the workspace laid out in a series of tabs. Each tab corresponds to a task function, although they all relate to Project Management. It's here that users do the bulk of their work, track their projects and store electronic data. Also, the tools and data available on the system vary depending upon the user's role in the organization.

Typically, information presented on the screen is different from one user to another. For example, a person in Marketing will have access to different features than, say, someone in Accounting or Purchasing. It is noted that in this example presented herein, items with an asterisk (*) are accessible only to the designated "Key User" or "Super User" or to those with certain levels of system access.

In this example, many features of the project management server 110 can be used or accessed in more than one way. For example, a user can add a new Spec form for a Project by clicking on the "Spec'ing" tab, or by adding a new Spec from the main project management screen. An advantage of the present invention is that many features are interconnected so that redundant data entry is minimized. An advantage of the present invention is that is provides an integrated, comprehensive and effective marketing operations system.

A typical session begins with a user logging-in to the project management server 110 from the web interface 108. This is accomplished by typing in a user name and password. The user name and password are used to define and determine user access rights in the security module 1410.

Home Page

Figure 16:
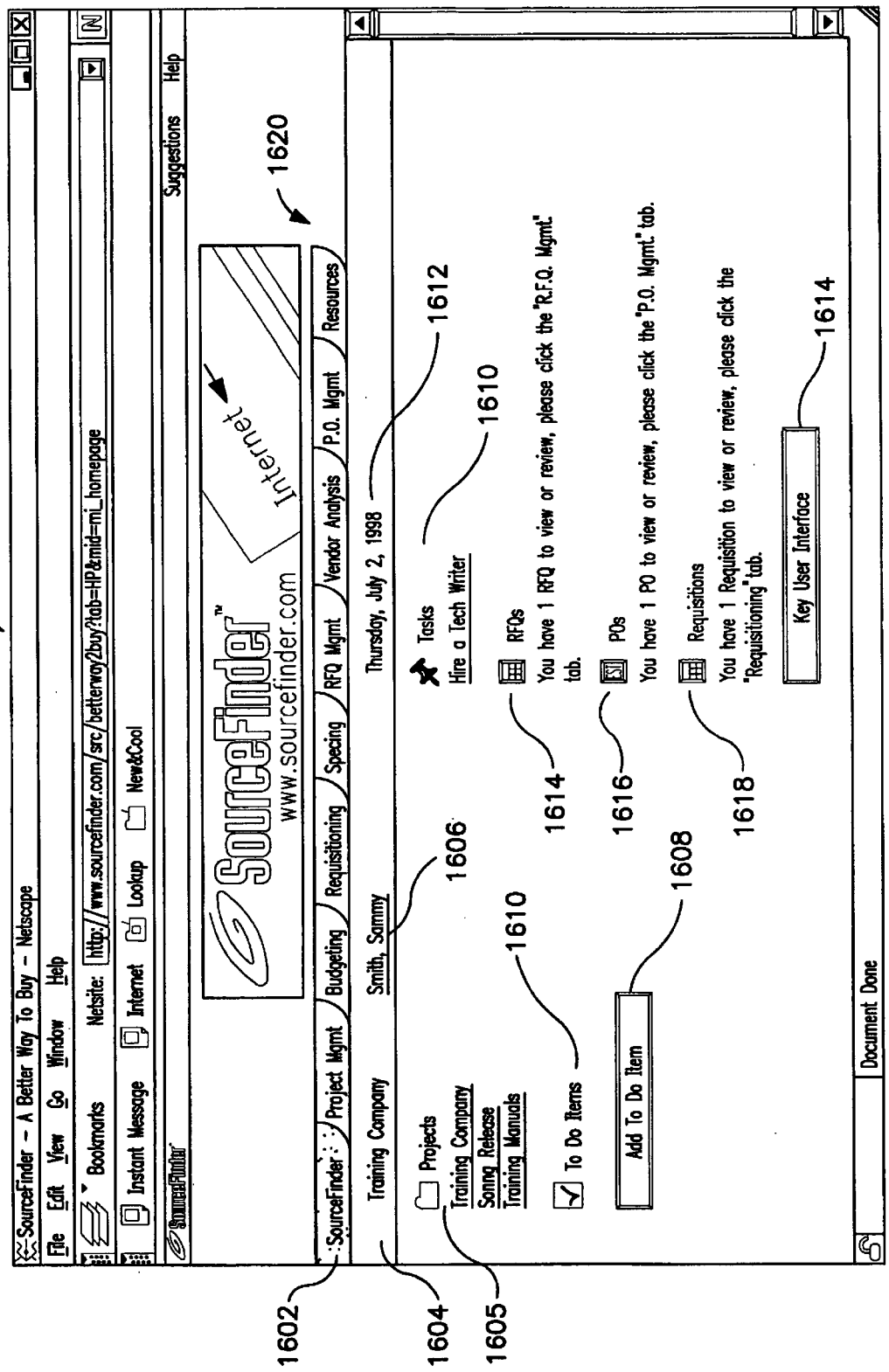

FIG. 16 is an example of a home page 1601 in accordance with this example embodiment of the present invention. Each time a user logs into the project management server 110 with the proper user name and password, the user arrives at their own personal home page (referred to as "My Page"). The user can return to this page 1601 at any time by clicking on the tab labeled "SourceFinder" 1602. The main purpose of this screen 1601 is to provide an overview of the particular user's activity in the system. (Project Management, to be covered in the next section, provides a company-wide overview of public project information.)

The following items appear on the example header of this page:

The name of the user's company 1604
User's name 1606
The current date 1608

The information on this page 1601 is preferably designed to help a user track current tasks 1610 and monitor active items that require the user's involvement. The view on this screen varies depending upon the user's role in the organization. In most cases the user can control which items are displayed on their home page. Preferably, some items will appear by default in accordance with each specific embodiment of the present invention.

Adding Items to Home Page

Generally, users begin using the present invention to organize and track projects 1605, communicate with co-workers and others outside their organization, and send RFQs 1614 for goods and services. Advanced users typically begin to create, or add items to their own Project folders.

For example, a user may add a Note to the Summer Promo Folder, or a Task directing someone else to take action. Each time a user creates an item, they will be given the option to add this item to their home page. If the user responds to this question with a "yes," a line will appear on their home page briefly describing the item. In this fashion, the user is unlikely to forget about the item.

This feature can preferably be activated at any time. For example, if a user chose not to put a To Do Item 1610 on their home page at the time it was created, they can add it later by simply clicking on the To Do Item and selecting the "Yes" option at that time. This also applies to items created by other users. Users can add items created by other users to their home page if they have access rights to the item.

Items can also be removed from a user's home page. All items that have been added to the home page are accompanied by a checkbox. To remove any item, the user can check the box associated with the item and click on "Remove Checked Items" button. This action will of course not remove an item from the project tree, but only from the home page.

To Do Items

To Do Items 1610 are reminders that user's create to remind themselves to take a certain action. To Do Items can exist on their own, outside of the project tree. They can also, of course, be added to Projects. To create a To Do Item for a home page, users click on the "Add To Do Item" button 1608. To list all To Do Items for a user, the user clicks on the appropriate button. Preferably, users are given a list of every To Do Item they have created and where each one is filed, (i.e. on the home page or within the project tree).

Items Other Users Add to Your Home Page

The following is a list of items that may appear on a user's home page because other users in their organization have "sent" them there.

Tasks 1610: Any Tasks assigned by someone else.

Requisitions 1618. If the user is a Requisition administrator, any Requisitions that require approval.

RFQ 1614: If the user is an RFQ administrator, all "Open" and "Sent" RFQs, and RFQs with bids received.

Pos 1616: If the user is the PO administrator, all PO items requiring action, including Open Jobs and PO Requests.

User Interface

The User Interface is where users update and check their personal information. To access the User Interface, the user clicks on their name on the page header 1606. The name is a hyper-link that opens up a dialogue box asking for the user to validate their password. This feature is used to prevent unauthorized users from changing personal information when the authorized user leaves their computer unattended.

When the personal information screen is presented to the user, the user can make any corrections necessary to their name, title, phone number and so on. Users can also change their password by clicking on the "change password" button. In addition, users can enter a "jog phrase," which is something to remind them of their password. For instance, a user's password may be "Betty" and the jog phrase "mother's name."

Key User Interface*

This interface is a management tool for the Key User. It allows the Key User to enable and disable users in the company to manage access rights and privileges for all users. In addition, the Key User Interface is used to keep the company information up-to-date.

To access the Key User Interface, the Key User clicks the "Key User Interface" button 1614 at the bottom of their home page 1601. Note that this option is only available to the Key User and only appears on the Key User's home screen. In one embodiment, five basic functions can be accessed on the next screen. These functions are listed below, followed by a more detailed description of each function.

Users Pending: a function that allows the Key User to enable new users in the organization.

User Roles: a function to assign permissions to various users depending on their functions within the organization.

User Administration: a function to manage all users' log-in information.

Organization Profile. a function to verify that the company information is correct and make changes if necessary.

User Groups: a function to create groups of users and edit existing groups for the company.

Users Pending

This option is used when new users sign up at the company. The Key User can sign up new users, he can assist new users in signing up or the new users may sign up independently. New uses cannot use the system until they are enabled in this fashion. This feature is used to prevent unauthorized access to the company's account. It should be recalled that in a preferred embodiment, the Internet is used to deliver the project management system to users. Thus, security should always be a top priority.

Typically, when a new user signs up under a company, the Key User associated with the company receives a notifying e-mail message. The e-mail message includes a hyper-link to the project manager's log-in page. From there, the Key User logs in and selects the "Users Pending" option.

From there, the Key User is presented with a list of all users who have requested access to the system. To enable them, the Key User clicks on their name and provides personal information about the new user in a data entry screen. Typically, this includes the new user's name and telephone number. Then, the Key User changes the new user's status from pending to enabled by checking the box "enable" and clicking "OK." Once that is done, the Key User is returned to the main Key User Interface, where he assigns user roles to the new user.

User Roles

The example embodiment is designed to reflect normal business responsibilities and chains of command. For example, not everyone in the company has the authority to approve POs or to assign budget dollars. All users should have levels of access consistent with their job duties and responsibilities. Selecting this option causes the presentation of a table of all users. Users can be assigned permissions simply by clicking in the checkboxes as appropriate.

For example, permissions may be broken down as follows:

Requisitions

RFQs

POs

When new users are added, the Key User should assign their permissions at the same time you enable their system access. Not all users need specific user roles; each user automatically has access to standard system features. The Key User should have access to all levels of the system. For a detailed description of each User Role, please refer to the section: Key User Set-up Guide, below User Administration This feature displays a table showing a list of all enabled users associated with the Key User, their user names and other pertinent log-in information. The Key User can view disabled users, by clicking on the "Show Disabled" button. The "Key User Main Interface" button will return the Key User to the main screen to access other options.

To view and/or edit information for an individual user, Key User clicks on that person's name. This will provide a limited view of their personal information. The actions taken on this screen are all related to security. Here, the Key User can disable a user, give the person's account an expiration date, or request that the person update his or her password. The Key user can optionally inform the user of changes made to his or her status, by clicking on the name to open up an e-mail box.

User Groups

In the same way that the company is organized into various departments with teams of people, the users can be organized into user groups. In general, the user groups will reflect the natural groupings that already exist in the company; however, there is no restriction on how to assign users to user groups.

Once in the Key User Interface, the Key User selects the "User Groups" option for a view of all existing groups. This is where one can edit an existing group. A list of all possible users is displayed. In addition, users that belong to a particular group have check marks next to their names. To remove a user from the group, the Key User deselects his or her name. To add a user to the group, the Key User adds a check mark. When finished editing, the Key User clicks "OK" to save the changes.

In addition to editing groups, the Key User can also create new groups. This can be accomplished by selecting the "Add a Group" button in the User Groups option. It is here where the Key User can name the new group, set an expiration date if necessary, and assign users to the group, and input whatever data is necessary for the specific implementation of the present invention.

Organization Profile

The final tool in the Key User Interface in this example pertains to the entire organization, rather than to individual users. This is where the Key User can manage the company information. The information listed here will depend on the structure of the company and can be customized in any way seen fit, by the assigned Key User. For example, for a branch office, it may be appropriate to have the corporate address listed in the organizational object that represents the branch. Alternatively, each branch might be signed up as a separate organization altogether.

To change the company information, the Key User selects the "Organization Profile" option and edits any necessary fields in the detail screen. Typically, the phone number input here, becomes the Key User's designated Company Key, which their co-workers use when they sign up as new users. Therefore, it's advisable to use the main company phone number rather than a personal extension or mailbox.

Terms and Conditions

Clicking on the "Terms and Conditions" link on the Organization Profile page results in the display of a large text entry field. Here the Key User typically enters any terms and conditions that their company would normally attach to a hard-copy RFQ. The Key User can type directly into the text box or copy and paste from an existing document. The Key User will only have to enter this text once, because it will automatically be added to the end of each RFQ that is submitted. When required changes are made the Key User simply clicks "OK" to confirm and save the text.

The following is an example of set-up procedures that can be used by a person designated as the Key User within an organization. By default, this is the person who is typically the first to sign up under a company.

Set-up Procedures

Enabling New Users

This procedure is required in order to grant new users access to the SourceFinder system. Initially, the users you have identified within your company may be preloaded for you; therefore, you may not have any "Users Pending."

Additional users in your company can sign up at any time by going to the SourceFinder web site, selecting "Sign Up," entering the Company Key (see below), and completing the form. The system will automatically generate an e-mail to you, as the Key User, each time a new user completes the sign-up process.

At this point, the new user will not be able to access the system until the Key User enables his or her account by doing the following:

Log in to the home page of the provider of the present invention (SourceFinder in the example screen shots provided herein).

Select Key User Interface button

Select "Users Pending" from this page (contains a list of new users who are waiting to be enabled)

Enable each user

Define User Roles

Once a user is enabled, the Key User may need to assign the users' administrative privileges for different areas of the system. The User Roles are primarily management level roles that involve approving the spending of money or the actual spending of money. Not every user in your company will have this authority. It's not necessary to assign a User Role to give users standard access to the system. Once you've enabled them, they automatically have standard access.

User Roles are Assigned as Follows

Log in to the home page of the provider of the present invention (SourceFinder in the example screen shots provided herein).

Select Key User Interface button

Select "User Roles" from the menu

Locate the user's name in the left-hand column and indicate which functions each user will be given access to by checking the appropriate boxes by that person's name.

There are three designated "roles" that follow the basic life cycle of a marketing project in terms of function and responsibilities. Below, the general tasks of each "role" and its associated functions in accordance with this example embodiment. A user will need to assign User Roles based on the functions of each person within your organization. There is typically no restriction on how many roles any user can have; it's completely at the discretion of the Key User. Don't forget that, as the Key User, you should grant yourself access to all the User Roles.

Requisitions

Any user who has authority to approve requisitions in the company should have this access.

Sees all open Requisitions on his or her home page

The Requisition Tab opens the "Administration" screen

Has the ability to approve and deny Requisitions

Has the ability to override cost center selection and project paths when s/he approves Requisitions Has the ability to go to "Administration" from his or her "My Requisitions" screen RFQs This area of the site deals with vendor relations and job management. It can be either a marketing-related or purchasing-related function. Depending on your company's structure, you may find that users with this level of access will also require PO-level access.

All open RFQs appear on home page

Has the ability to access all the RFQ.tools on the "RFQ Management" screen

Has the ability to create and send RFQs

Has the ability to award Jobs

Can see and access all RFQs and Jobs in Project Management

POs

This section will mostly be used by the purchasing department. Users with this level of access are allowed to open and close POs. In addition, purchasing management-level users may need this level of access.

Can create a PO and approve PO requests

All open Jobs and PO requests will be listed on homepage

Can close PO (sip off for goods received)

Can administer open POs and PO history

User Groups

This feature enables one to create User Groups for the company. A User Group, as the name implies, is a group of users that are associated in some way. For instance, you may create a User Group for Marketing and one for Purchasing. Users can assign users to more than one group at a time. The User Groups will be used in the Permissions feature.

To Enter User Groups

Log in to the home page of the provider of the present invention (SourceFinder in the example screen shots provided herein).

Select Key User Interface button

Click on User Groups link

Once here, one an create new User Groups or edit existing ones.

Systems Maintenance

In addition to enabling new users and monitoring user roles, two additional areas should be kept up-to-date by the Key User:

User Administration

This interface allows one to manage all of the user log-in information within your organization. You can display all users whose status is "Enabled" or all users whose status is "Disabled." The display shows the user's full name, user name, status and expiration date, as well as a log-in count and the date of the user's first and last log-in.

To Enter User Administration

Log in to the home page of the provider of the present invention (SourceFinder in the example screen shots provided herein).Select Key User Interface button Click on "User Administration" link Once in User Administration, clicking on the user's name will take one to an interface that allows the following:

Modify the user's account expiration date

Enable or disable the user account

Force the user to change his or her password at the next log-in

Organization Profile

This interface allows one to change the company information, such as address and phone number. Most importantly, however, you can change your "Company Key" from this location. The Company Key is required to sign up new users from your organization. Either a new user or the Key User may enter the Company Key on the sign-up page and proceed directly to the "Add Users".

To Enter Organization Profile

Log in to the home page of the provider of the present invention (SourceFinder in the example screen shots provided herein).

Select Key User Interface button

Click on the "Organization Profile" link

Once in this screen, one can verify the organization information and make any corrections and additions necessary.

Project Manager Functions

Figure 17:
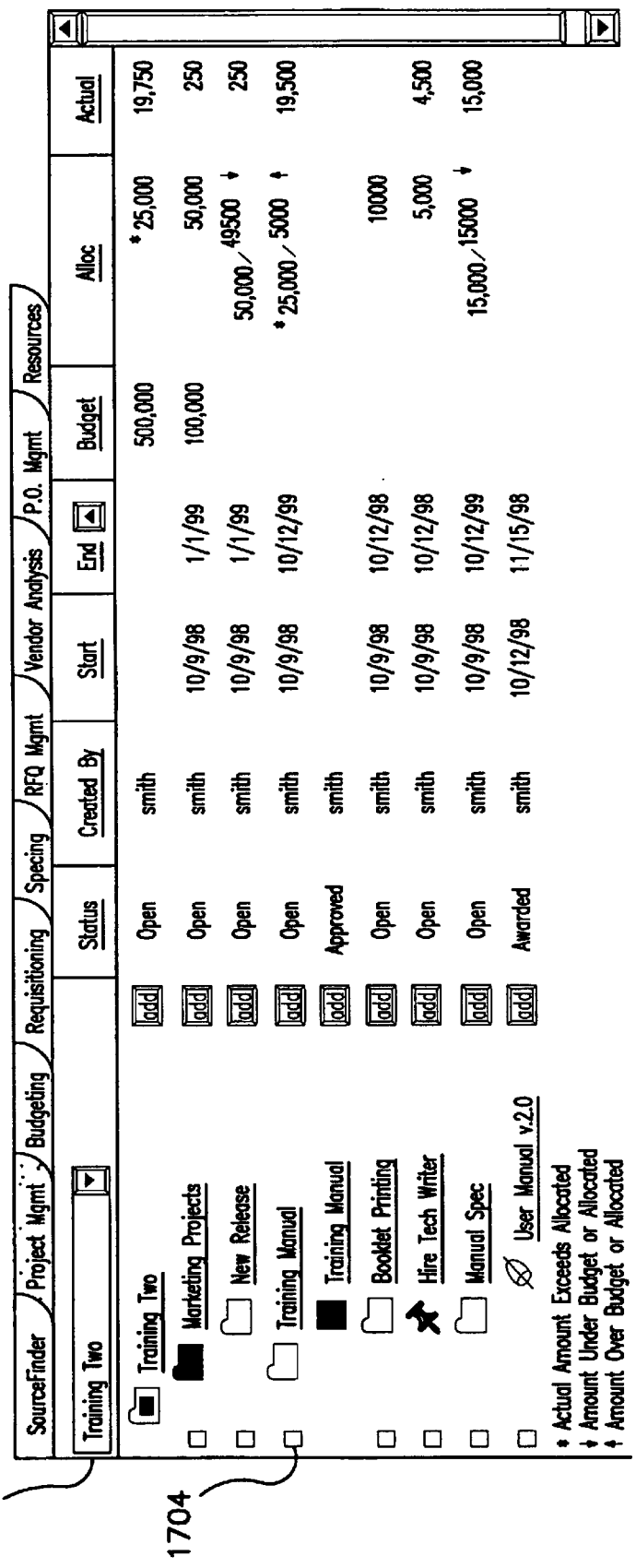

Clicking on the second tab of the tab bar 1620 results in the presentation of the main Project Management screen (PM). FIG. 17 depicts an example of one view of a main PM screen. In general, PM is the jumping-off point for a variety of tasks, but its main purpose is the organization of Projects and Project folders. PM screens use icons to represent the different types of items in the folders. The icons also direct users to the various tasks they can perform within these screens. The table below lists some of the items that can appear on a PM screen in accordance with this example embodiment.

| Item | Status | Definition |
| --- | --- | --- |
| Task | Open | Task has been created |
| Task | Viewed | Assignee has opened Task and looked at it |
| Task | Complete | Person assigned to Task has completed it |
| To Do Item | Open | To Do Item has been created |
| Note | Open | Note has been created |
| Note | Viewed | Note has been viewed by someone since it was created |
| Upload a File | Open | File has been created or added to a Project |
| Requisition | Approved | Requisition has been approved and its Project has been created |
| Spec | Open | Spec has been created, and can still be edited |
| Spec | Complete | An RFQ exists and has been sent out for this Spec. Spec can no longer be edited |
| RFQ | Open | An RFQ exists but has not been submitted to any suppliers |
| RFQ | Sent | RFQ has been sent out to suppliers |
| RFQ | Bidding | At least one bid has been received on this RFQ |
| RFQ | Awarded | This RFQ has awarded a Job to a supplier |
| Job | Open | Job has been created |
| Job | [varies] | Status of Job in progress, to be entered by supplier |
| Job | Issued PO | Job has been issued a PO |
| Job | Closed | Goods have been received |
| PO | Incomplete | PO has been requested but not approved by authorized person |
| PO | Created | PO has been created/assigned |
| PO | P-Rcvd | Good have been partially received |
| PO | Closed/Rcvd | Goods have been received on PO, and job is now closed |

Project Management's Structure

Project Management is built using a tree system—or to use another image, the items within PM have "parent/child" relationships. The concept is similar to the structure of directory trees commonly seen in current software programs. If a user creates a Project XYZ, underneath it items can be added, such as Spec form X, Note Y, or Task Z. These items are the "children" of "parent" Project XYZ and appear beneath that Project in the PM tree or (also referred to as project tree).

This structure applies not only to items, but also to their corresponding budgets and allocated monies. The PM screen shows a snapshot of where money is being allocated and spent within various Projects. In order to understand the breakdown of the figures, it is useful to apply the parent/child analogy to budget analysis.

Folders/Projects

The primary element in the tree structure is the folder, or Project (these terms are used interchangeably). A folder can contain sub-folders and other items associated with that Project, such as Specs, To Do Items, and so on.

If a Project contains other items, a small minimize/maximize icon is displayed next to its name (i.e. a plus or minus sign), as shown in FIG. 17. To expand the folder, for example, users simply click on a (+) icon (not shown) and the page will open up to show the folder's contents. Users can close the folder by clicking again on the icon (−).

Another way to navigate around this screen 1701, particularly if the company has a large tree with many folders, is to use the pull-down menu 1702 in the top-left corner of the directory. In the pull-down menu 1702, the user selects the folder they wish to see. This causes a next screen to be presented that shows a limited view of the user's directory tree. Specifically, the user sees only the selected folder and any items contained within it (i.e. child objects). The user can return to the main screen or view a different folder, by using the same pull-down menu and making a different selection. In the example presented in FIG. 17, the selected view is a view of the folder "Training two" 1702.

Figure 18:
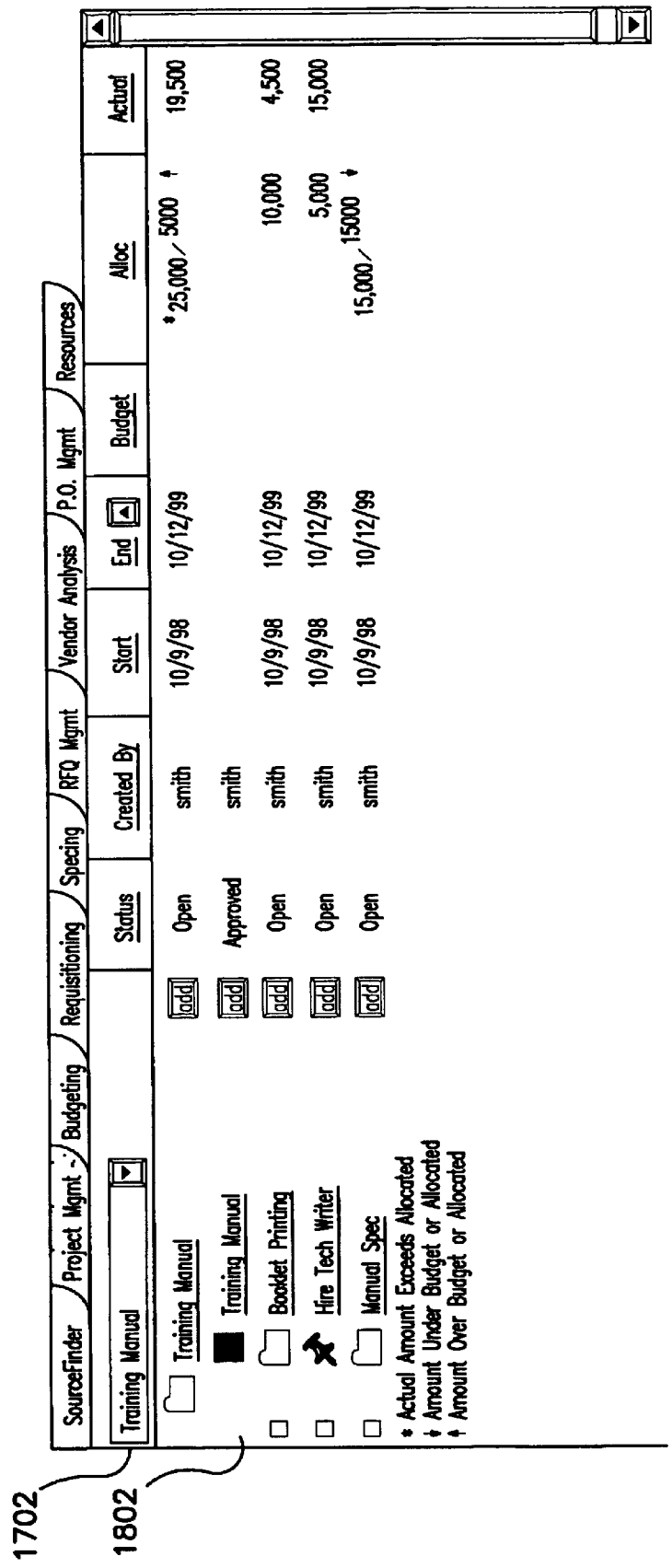

If for example, a user selects "training manual" from the pull-down menu 1702, the view presented in FIG. 18 is displayed. Note that "Training manual" 1802 is now the first or top level parent in this view 1801.

Adding Items to the Tree

The following sections depict examples of items (or objects) that can be added to a project tree according to one embodiment of the present invention. It is noted that in general, objects can be of any type that makes sense for a specific implementation of the present invention. In this example embodiment, the items that can be added are projects, specs, RFQs, tasks, notes, files, to do items and program cost items. It is noted that these objects are just some examples of types of items that can be defined for an embodiment of the present invention. As such, the use of these examples should not be construed to limit the scope and breadth of the present invention.

In this example, next to every folder, and every item within each folder, is an "Add" button. This is used to add an object to the project tree at a particular point. Thus, a user selects the folder or item under which they want to add something, and clicks the "Add" button next to it. Note that the folder that is selected determines where in the tree the new item is placed.

It is noted that when a user clicks on the "Add" button to add an item to the main company folder (i.e. the one at the top of the PM table), the system will preferably default to add a "Project" object. This is so because at that level in the tree, a Project object is the only item that can be added, in accordance with this example embodiment.

When a user selects "Add" on other Projects, the user sees a selection of options available to be added at that point in the tree. (see the flowchart entitled Project Management: Add a New Item to a Project)

At the top of this secondary screen is a header displaying information about the current folder including its name, start and end date, and budget information.

It is noted that if a user adds an item to a Project, for example, the user will be presented with a different set of options than if they added, for example, an RFQ object. This is so because not all objects can have other objects or items "beneath" them on the tree. For example, in one embodiment, you cannot add a Spec under an RFQ, because a Spec is created before an RFQ and not vice-versa.

Sorting rows

In the header on the PM screen, a small arrow is displayed in one of the columns. This is a "sorter" indicator and can be used in any column. To sort by another column, the user clicks the header of the column and the arrow will jump to that column. The user then clicks on the arrow and the contents of that column is sorted numerically or alphabetically, and corresponding data in each row adjusts accordingly.

Add a Project

This option enables a user to add a sub-folder to an existing folder. Clicking on this link brings the user to a dialogue box, into which the user can input the details of a new Project, including start date, funds allocated and so on.

Project choices

When a user adds a Project, the user will see a drop-down menu giving the user choice between a Division, Department, Group, Project or Folder. In terms of how these operate within PM, there is no functional difference. The only real difference is that each choice is a different color, which gives the user the ability to organize their directory tree based on a color scheme, if they so choose. Throughout this example, references to projects or folders encompass the following set of items: Division, Department, Group, Project and Folder.

Add a Spec

This tool allows a user to add a Spec to a Project. A Spec is an electronic form user's complete to "spec" out a job to different suppliers. In one embodiment of the present invention, there are three kinds of Spec forms: RapidSpec, WizardSpec and SmartSpec. Please see "Spec'ing Tab" section for details about these forms.

Once a user selects the domain in which to create a Spec (i.e. Printing, Folding Cartons, Point of Purchase, etc.), there are three different ways the user can locate the Spec form.

Categories allows the user to browse through different types of forms available in that domain.

Forms A–Z is an alphabetical listing of forms in each domain.

History is a listing of the last ten Spec forms the user created in a given domain.

Once the user selects a Spec, the user can complete the process of filling it out and sending it to suppliers for bidding. Alternatively, the use can save it in a folder for completion at a later date, and go on to another task.

Add an RFQ

In this example, an RFQ does not exist in isolation but s always associated with a particular Spec. Uses can "Add an RFQ" when they are ready to submit specs to suppliers for bidding. When the user selects this option, the user is brought to a screen that lists the Specs associated with the current Projects. Here the user selects the Spec for creating an RFQ, and clicks on "Create RFQ." This brings the user a set of options for creating a supplier list for the RFQ. (See "RFQ Management Tab" for details on this task.)

When a user selects "Add an RFQ," the name of the new RFQ is by default, the name of the Spec it was created from. The user has the option to keep this default name, or to rename it to whatever name they wish.

Add a Task

When an action needs to be taken, the user can assign and document it as a Task. This is 10 accomplished by clicking on "Add a Task," which causes a dialogue box to appear. The user typically types in the details of the task in the dialog box. Generally, a Task is assigned to someone else, but users can create tasks for themselves as well. If the task is assigned to someone else, it will appear on that person's home page when they log in. Also, in Project Management users can check the status of the Task to see if the person assigned to the task has viewed it yet.

This option also gives users the ability to add attachments their Tasks. It should be noted that these attachments are not necessarily file attachments, but are other items within the Project folder. Further, users can assign tasks to users in other department, even if the Project has been made accessible only to members of the user's department. This is accomplished by attaching specific items from the Project to the Task. The person from the other department will then only have access to those specified items within the Project.

Add a Note

A Note is simply a neater, electronic version of a handwritten note. Selecting this option will bring up a dialogue box enabling the user to input the text of the Note.

Requesting purchase orders

In many cases Tasks, Notes and To Do Items may require that money be spent. When a user is ready to complete such an item, an option is presented to either issue or request a PO (See the "PO Management" section for more information). User access levels on the system will determine which option appears on the screen. If a PO administrator selects "Issue a PO," the PO creation screen appears. If the user can only request a PO, then the user would choose the same option but the item will appear on an "Open" list in PO Management. It will then be the responsibility of the PO administrator to issue the PO.

Upload a File

This feature enables users to upload files from their PCs into their Projects. Selecting this option causes a dialogue box to open wherein the user can specify the details of the file that is to be uploaded. The Browse button enables users to search their PC's drives and network. Once the user has selected a filename and path, the user can give the document a name that's appropriate to the Project. Finally, the user clicks on the "Upload" button and that file will be added to the Project. It is noted that, at this point, the file is not yet "active" in Project Management; it is something like an unopened e-mail.

To open the file in the Project, users go to Project Management and click on the file's name. This will open a box presenting details on the file, including the identity of the user that uploaded it. Clicking on the filename causes the file to be uploaded to from the Project manager's data store, to the user's local PC system. The user's local system then prompts for a file name to save the File. At this point the user can open the file whenever they choose If the user changes the document, the file is then uploaded to the project manager server by selecting the "Upload New Version" button. The system will always present the most current version of the file in Project Management. However, users can view previous versions by selecting the "View Revisions" option. In addition, uses can the file history from that screen.

Downloading Files to Vendors

The present invention provides a means to send a copy of a file to someone outside his or her organization, a consultant or vendor, for example. This can be accomplished by uploading the file into the "parent" Project that the Job or Spec belongs to. In one embodiment, users send attachments to vendors by sending attachments from the same Project that is the Job's parent. In addition, in one embodiment, the user must add the file to the Project itself, and not to an item within the Project.

Next, the user follows the normal steps for awarding a Job (as described below). When the user completes the award details, the user then clicks the "Add Attachments" checkbox. The next screen gives the user a list of all available attachments for that Project, where the user selects the checkbox next to the attachment being sent. When the vendor receives notification of the Job award, they will also receive the file attachment and be able to upload it onto their own PC.

In addition to uploaded files, users can also attach Tasks and Notes to Jobs they're awarding. This feature is applicable when vendors use the on-line feature of the present invention, as described herein.

Add a To Do Item

This option is a little more sophisticated than a Note and has different options than a Task. A Task is generally assigned to others, but a To Do Item is for its creator. Users create a To Do Items from their home pages, or in Project Management.

On your home page, To Do Items appear in a list. At the bottom of the page is a gray "Add a To Do Item" button. When a users create a To Do Item, they can enter a start date and how many days, weeks or months prior to the start date, they would like to be reminded. When that date arrives, the item is visible on the user's home page.

Again, the To Do Items that show up on home pages are those whose start and/or reminder dates have arrived. To view the complete list of To Do Items, users click the button on their home page. Once an item has been completed, users can delete it by checking the box next to it and then clicking Remove Checked Items.

Add a Program Cost

This option is an alternative to issuing a PO for a project-related expense. This is used in case money is assigned or spent without a PO, or a user simply wishes to register a known expense in a Project. In either case, users can use the Program Cost feature by clicking on "Add a Program Cost." Users can name the cost and assign an account number, description, amount, and so on. Users can also access a pull-down menu to define the type of cost being added. The options in the menu are pre-determined for each company and are customizable. Typically, the Key User dictates the menu choices.

Once the users has completed the screen and clicked "OK," the Program Cost will appear in PM underneath the associated Project. The amount designated for the cost will appear in the "Actual" and "Allocated" columns, because the cost is considered an actual expenditure of money.

Additional Project Management Features

Permissions

This feature deals with issues of security and levels of access to items within the system. Access to an item is determined by its creator. In one example embodiment, three levels of system permissions are defined with decreasing levels of access. These levels are:

Full control means that a user can both see and edit the item. The creator of an item automatically has full control of it.

Read-only, as its name implies, is a "view" permission. The user can see the item but is unable to make changes to it.

No access prevents other users from even seeing the item.

To illustrate, suppose a company comprises four users: Bill, Joe, Jane and Mary. Bill creates a Project. In this case, by default, Bill automatically has full control of the Project. IN this example, Bill assigns full control to Jane, read-only access to Joe, and no access to Mary. From then on, any items Bill creates within that Project will be visible only to Bill, Joe and Jane. Mary has no access to the Project or to any items within the Project.

It's still possible to change permissions within the Project. Suppose Bill creates a Task under it and selects the option to limit access. The system gives Bill the option to adjust the access on himself, Joe and Jane, (having already eliminated Mary as a viewer for that Project). Bill could then, for example, change Jane's access to Read-only for that particular Task.

If a user does not assign permissions to an item, the system can automatically default to that item's "parent" for its permissions. If a user creates a Project under a company folder and does not assign permissions, all users can automatically have access to that Project.

In addition to assigning permissions to individual users, one can also do so for User Groups. For instance, one may have User Groups called Marketing and Purchasing. If a user assigns full access to an item to the Marketing User Group, any user in that group has full access to that item.

Individual vs. Group Permissions

Because users exist as individuals as well as groups, one can override the other where permissions are concerned. If, for example, Jane has a higher permission for an item than the group she belongs to, she will still have access to that item. Here, the individual overrides the group. However, if a group that includes Jane has full access to an item, but Jane as an individual does not, then Jane will still have full access to that item because she belongs to the group. In this case, the group overrides the individual. To restrict Jane's access to that item, it would be necessary to remove her from that group. In one embodiment, the system will always default to give permission, or access, wherever it's allowed.

To change permissions on an already existing item, users open that item while in PM and select the "permissions" button. This will give users a list of the groups and individual users that are allowed to access that item. Users can use the pull-down menus to edit the access levels on each user or user group.

Budget Management & Tracking

The main Project Management screen in this example, users to track budgets for Projects and the items within them. There are three columns that pertain to budget tracking: "Budget," "Allocated" and "Actual." The Budget column shows the total amount of money budgeted for each Project. Users can designate a budget amount for a Project when they create it. The allocated column shows the amount of money allocated to sub-projects and items within projects. The actual column shows the actual amount of money spent on an item. In one embodiment, an "actual" figure does not appear in the column until a PO has been issued for that item, or a program cost has been added.

Monitoring Bids

Although RFQ-related issues are managed under the RFQ Management tab described below, information on suppliers' bids can also be accessed via Project Management in the following ways:

Incoming Bids

This feature is associated with RFQs that have been sent to suppliers. Once an RFQ is sent, its status changes to "Sent" on the Project Management screen. If the user clicks on the link for that RFQ, a page opens showing the list of suppliers the RFQ was sent to, along with a status report of bids on that RFQ. The report indicates whether a bid has come in (if so, a summary of figures is shown), if the supplier declined to bid, or if a response was not yet received. When an RFQ has received a bid, an icon appears next to the supplier's name. Users click on the icon to view the Bid Detail screen.

In addition to reviewing bids received, the RFQ summary page allows users to review information on their suppliers.

The name of each supplier is a live link that will take users to a profile of that company. Users can add a comment to each supplier profile. Any comments added to this field are visible to the entire company. This field can be used to make recommendations or remarks regarding the quality and service of work received from the particular supplier. All comments made by other users will be visible to all other users. Users can also check the Vendor Analysis tab to see what other interactions the company has had with a particular vendor.

Bid Detail

This page displays the details of bids received from individual suppliers. All pricing information and additional comments from the supplier are available for review. In addition to displaying the details of the bid, this screen allows for other options and tasks, such as:

Review supplier's profile information;

View the Spec that belongs to the associated RFQ. Typically, this is a view-only feature, where the viewer cannot change the Spec;

Award the Job to the supplier whose bid is being viewed; and

Return to the main RFQ list. This will take uses back to the summary list of bids received.

Users can also click on the vendor's name for access to the vendor's profile to provide contact information for the vendor.

Award Job

Once users have received all the bids and reviewed them, they can award the Job to one of the suppliers. From the bid summary screen, users select the supplier they wish to award the Job to and click on the icon next to its name. The user will see a bid detail screen, which shows quotes for each quantity requested. Typically the user selects the quantity desired and clicks OK. In one embodiment, the system pre-completes some of the fields for the user. For example, the price and quantity are automatically defaulted from the previous screen. However, users can override these defaults if desired. In the case of an online vendor, comments made are visible to the vendor, as is the job-awarded information.

Figure 19:
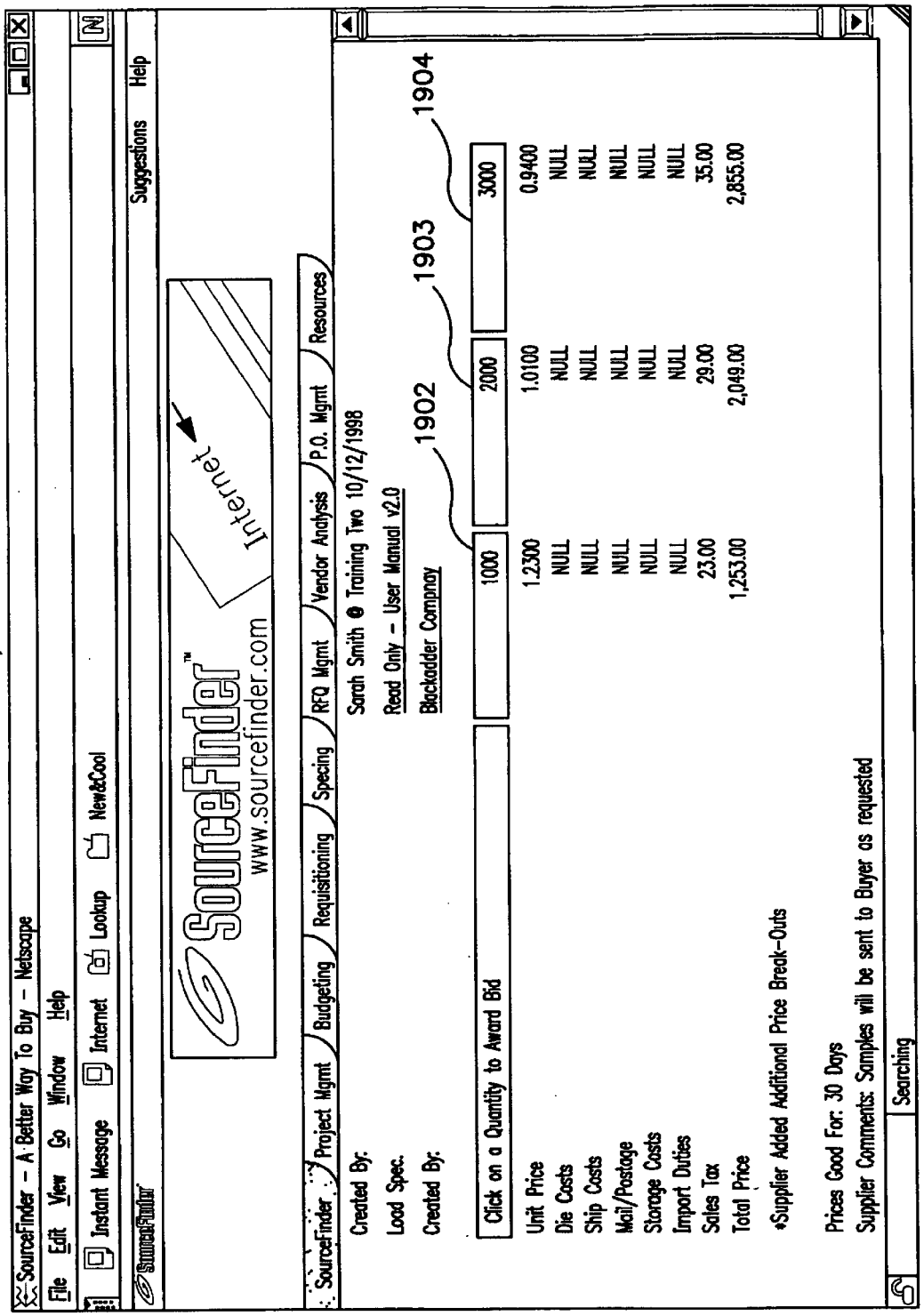

FIG. 19 is an example of a bid detail screen. The bid detail screen 1901 shows the user the dollar amounts of a particular vendor's bid on the job. To award the job to this vendor, for example, the user will click the quantity they wish to order (1902, 1903, or 1904 in this example). When awarding an RFQ, users can also send file attachments to the online vendor.

Once an RFQ is awarded to a supplier, the project management system will automatically create a Job. A Job is stored in the users Project folder under the RFQ that it was created from, and it becomes the uses point of reference for communication with the supplier. The user also has the option to create a PO when the Job is created.

When the Job is awarded, the user selects the checkbox labeled "Issue a PO." When the user is finished creating the form and clicks "OK," the next screen is the PO creation screen (see PO Management section for feature details).

After a user has awarded a Job, its status in PM will be "Open." In most cases, status updates are done automatically by the system, and in some cases they can be done manually by users (closing an item, for example). A Job is a little different. Once it's created, the vendor controls the status field. The vendor makes status updates, which are visible to you on your end. From the Project Management screen, you can see at a glance what stage of the production cycle your Job is in. This feature only applies to vendors using the online interface.

Budgeting Functions

The budgeting feature of the present invention can be used to track the budgeting, allocating, and spending of money through the hierarchy of Projects and sub-Projects. These functions are available from the Budgeting Tab on the tab bar 1620. For example, a user can view figures on his or her Project Management screen (such as 1701) to keep tabs on where dollars are going and how far under or over you are in a given area. In this case, users can review and enter all data from Project Management.

In addition, users can optionally delve into additional budgeting features that are found under the Budgeting tab. Typically, to make proper use of these features requires some initial planning and set-up. Although you can back-track and edit that data later, it saves time to do it up-front.

Budgeting Views in Project Management

When users open their Project Management screen, they will see three columns on the right side labeled "Budget," "Allocated," and "Actual" (see FIG. 17) It's in these columns that most costs associated with their Projects will appear. Typically, users input a dollar amount upon the creation of a Project, (or any item within a Project), and its place in your budgeting tree will be visible in Project Management. For most items, users are given the choice to budget or allocate the cost. POs and Program Costs are exceptions, as described below.

The following is a definition of terms used in this example:

Budget—Organizations have an overall budget for a given fiscal year. (This is established simply by clicking on the top-level folder and entering the figure.) As users create folders for different parts of the organization, any Projects or other items that users choose to budget—instead of allocate—will be drawing on this overall budget. Users cannot budget an item for more than the amount of its "parent."

Allocated—Within a budget, whether at the project or organizational level, users may wish to allocate monies instead. This is essentially putting funds on reserve for a Project or other item. Unlike budgeting, users may over-allocate; that is, users can allocate more money than exists in a parent Project's budget. In the allocated column, a Project's allocated amount is shown in black. If the items within that Project add up to be less than that amount, the amount that's left over will appear in green, with a "down" arrow. If the Project is over-allocated, the amount by which it's over will appear in red with an "up" arrow.

Actual—Only POs and Program Costs will generate an Actual expense in this example embodiment. These are monetary commitments to parties outside of your organization, but they are not necessarily expenditures.

Budgeting Example

Figure 20:
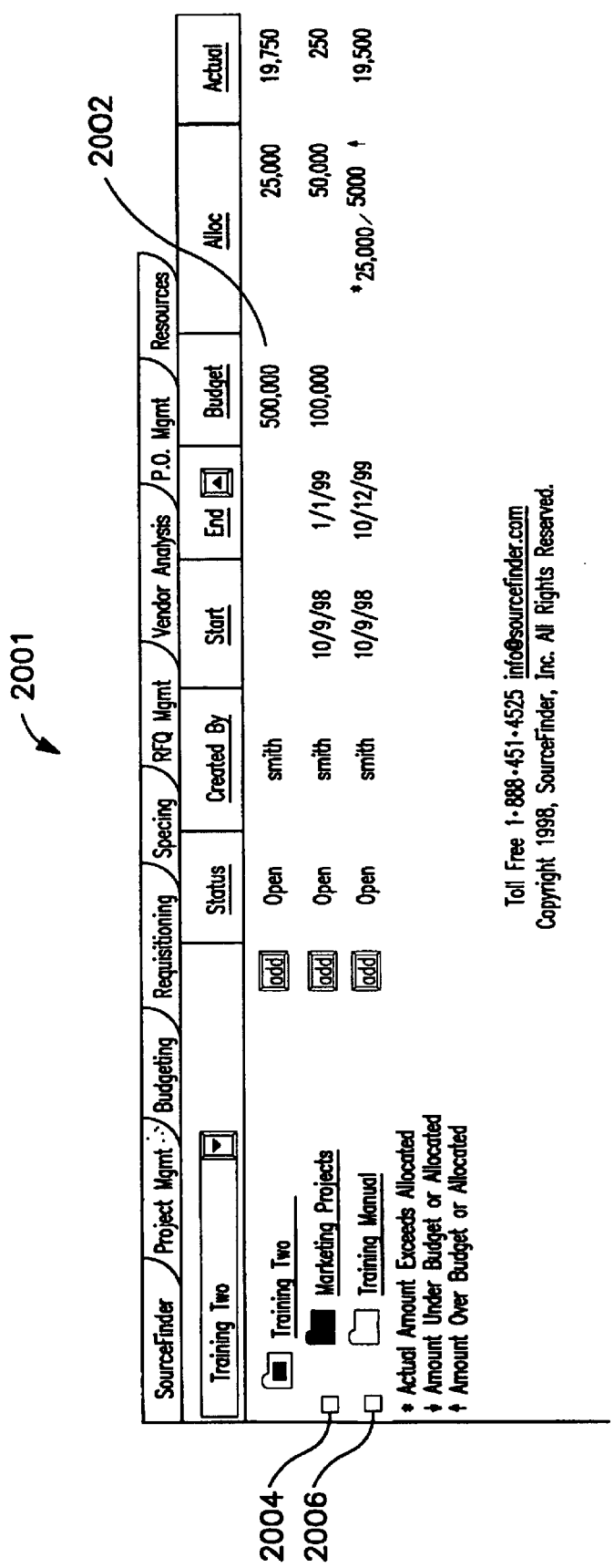

FIG. 20, depicts an example of what a sample company's Project tree might look like from a budgeting perspective, to illustrate the above concepts. Following the example are some rules of thumb to keep in mind.

Referring now to FIG. 20, suppose a sample company, "Training Two," has a budget of $500,000 (see 2002). The first top-level folder, "Marketing Projects" 2004 has a budget of $100,000, and the second folder, "Training Manual" 2006, has $25,000 allocated to it, not budgeted.

Now let's look at the contents of the Training Manual folder. (To see what is beneath any item in Project Management, users click on the "+" sign to the left of its name. If there is no "+" sign, there is nothing there to view.) This is shown in FIG. 21. The first item underneath it is a Requisition named Training Manual. A Requisition is a request for the approval of funds, and once approved, becomes a Project. So this Requisition was the originating point of the Training Manual Project.

The next item a user sees is a sub-Project called Booklet Printing. This project was allocated $10,000. A Task called "Hire Tech Writer" was allocated $5,000, but shows an actual cost of $4,500. Apparently Training Two got a better deal on freelancing than they had planned. The last item is a sub-Project called Manual Spec. This item was allocated $15,000, and shows an actual cost of $15,000.

Before we go further down the "tree," notice how the figures in the Allocated column 2102 roll upwards. The three allocated amounts, $10,000, $5,000, and $15,000, add up to $30,000—which is $5,000 above $25,000, the amount their parent Project, Training Manual, was allocated. That's why a red "5,000" is displayed with an up-arrow next to Training Manual's allocated amount. The Project has been over-allocated by $5,000. Likewise, if there were still money left over in the Allocated column, you'd see a green figure with a down-arrow indicating an under-allocation.

Figure 22:
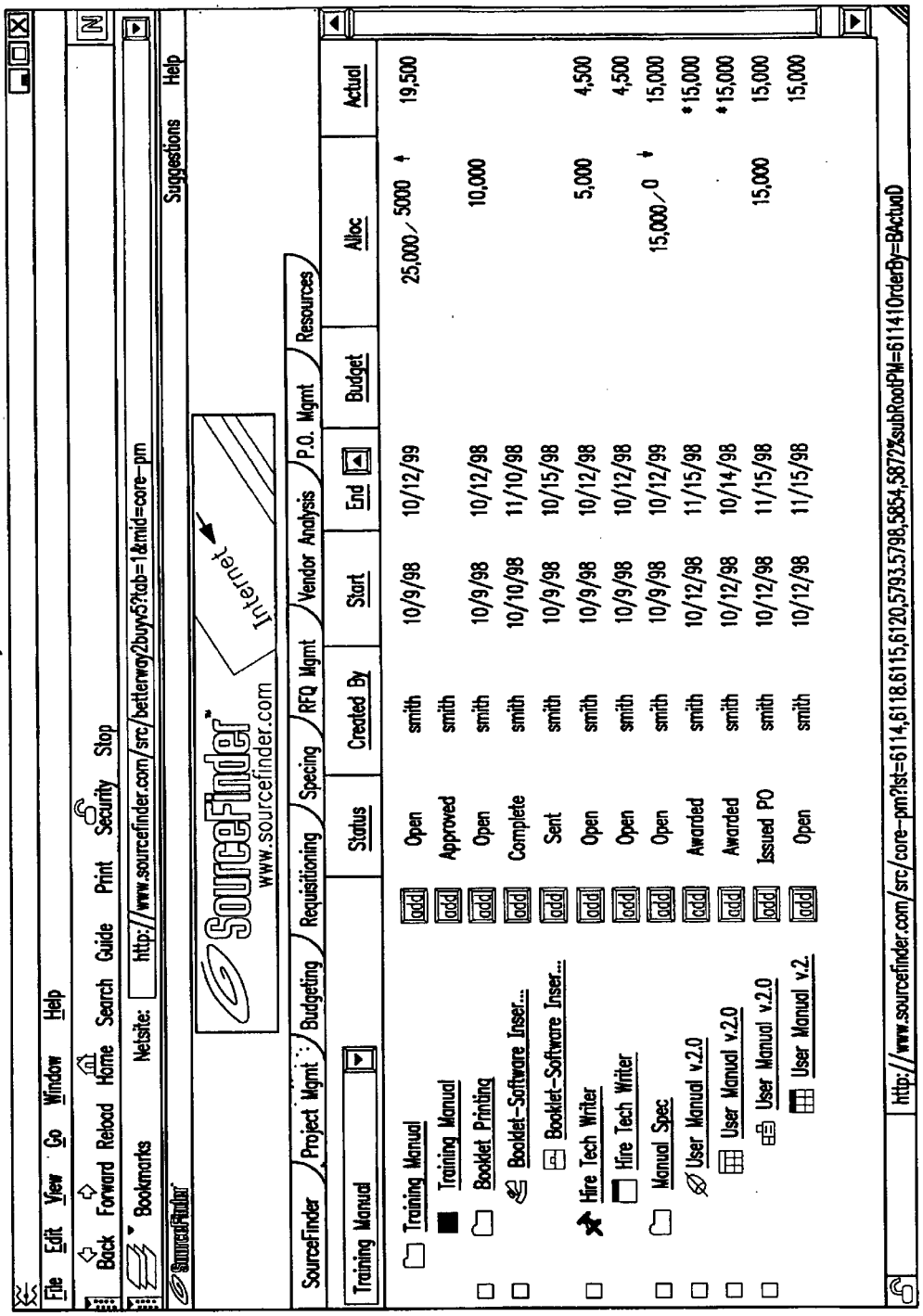

FIG. 22 shows an expanded view expanded view of these sub-Projects. This screen 2201 shows all items under the "Training Manual" Project fully expanded, with all contents visible. Notice that each "child" is indented beneath its "parent." For example, beneath Booklet Printing is a RapidSpec called Software Insert, and beneath it, an RFQ for the same. No Job has been created yet, nor a PO issued, so no actual costs have been incurred. Under the Task "Hire Tech Writer," a PO was issued for $4,500. This is shown as an actual cost, and all actual costs are "rolled up" the tree to the Project level.

Rules that Affect the Budget Feature

When reviewing the numbers on the Project Management screen, users should keep the following points in mind:

Budgets roll down the tree structure. The main budget figure is represented in the parent Project.

Allocations within a Project roll up to the parent. For instance, if a user allocates $5,000 to a project and then allocate $2,000 to an item within that Project, the user will see the roll-up of $2,000 on that Project's line, with a green "down" arrow and an indication that you have $3,000 left.

In this example, users cannot budget beneath an item you have allocated. Once you stop budgeting and start allocating, you cannot then budget at lower levels within the tree. For instance, if one budgets $10,000 to Project A, then creates a sub-Project B and allocates it $5,000, he must continue to allocate money from that point forward. If a user creates a Project C under Project B, the user has the option to budget this project—the only option will be to allocate from the money available in the parent, in this case Project B.

Users are prevented from over-budgeting in a preferred embodiment of the present invention. For instance, if a users main Project has a budget of $10,000 and the user creates three sub-Projects underneath, the sum of the budgets for the sub-Projects must be less than or equal to $10,000. If a user tries to assign more money than is available, the system will not allow the user to complete that step. The user can however, go back and edit the main Project budget if necessary.

It is possible, however, to over-allocate money in your Projects—that is, to allocate more to the sub-items than have been allocated to the main Project. In this case the figure will be displayed in red, along with an "up" arrow.

The Actual column operates independently of the other columns—it reflects monetary commitments and does not affect the figures in the allocated or budgeted columns.

Fiscal Years

The purpose of this feature is to track budget figures based on a particular organization's internal fiscal year. This can be particularly helpful if a fiscal year does not match the calendar year. It is also helpful for Projects that belong in the next fiscal year but are started in the current fiscal year, and vice versa.

Clicking on the "Fiscal Year" link will bring users to a view of the fiscal year(s) that have been established for their organization. When users initially sign up their company with the project manager server, the system automatically creates a current fiscal year for the company. It defaults to the date the user signed up. This view shows the start date of the fiscal year, the date it was created, who created it and the name (usually a date range, such as 1998–1999).

Users may need to use more than one fiscal year in their budget planning if, for example, they are working on projects that draw funds from both the current year and the next year. The current fiscal year is indicated by an asterisk and referred to as the "Active Org. Fiscal Year." The "Active Session Fiscal Year," however, is the one users are "in" during a given log-in period for budgeting purposes, and it's designated on the screen by a yellow highlighting.

Users click on the "Fiscal Year" date link to edit their first, and most likely the current, year. In this fashion, users set the start date to correspond to the date the organization's fiscal year begins. If this is also the fiscal year in which the user intends to begin working with, the user should make certain that the "Active Org. Fiscal Year" and the "Active Session Fiscal Year" checkboxes are both selected.

To add additional fiscal years, users simply click "Add a Fiscal Year," enter the name and start date, and click "OK."

Using Multiple Fiscal Years

In this example the users screen now shows two fiscal years, the current year and the next year. There are two reasons why users would change a fiscal year. First, the current fiscal year has ended and the user needs to switch to the new one. Second, as mentioned above, users may have projects that overlap fiscal years.

To move permanently into the new fiscal year, a user can select the link for that year and then check the "Active Org Fiscal Year" box. The user must also check the "Active Session Fiscal Year" button. After these steps are performed, the organization is now running on the new fiscal year. Thus, if the user goes to Project Management from there, the user will see that the project structure still exists, but the budgeting figures from the previous year have disappeared. This is so because the data for the previous year has not been deleted, but instead the user is looking at the view for the new year.

To move temporarily into a different fiscal year, the user selects the fiscal year they want to work with and checks the "Active Session Fiscal Year" box. This will mean that any work the user performs during the current log-in session will take place in the selected fiscal year, rather than the current one. It is important to make the distinction between switching current fiscal years, and switching to active session. Once a user has completed working in the selected fiscal year, the user should log out of the system. When the user logs back in, the system will automatically switch back to your current fiscal year, i.e., the organization's "Active Org. Fiscal Year."

Currencies

This feature is used to translate monetary values from between currencies in accordance with current rates.

Cost Centers

Cost Centers and Cost Center groups provide the next level of budgeting management. A Cost Center is defined as a subdivision of an organization with its own, predetermined amount of funds to draw from.

Users may want their Cost Centers to reflect their company's current accounting structure. When a new organization signs up, the system automatically creates a Cost Center group with the same name as the company. Users can add individual Cost Centers under this group or create additional groups. The depth of your Cost Center structure will depend largely on the size and complexity of the organization.

Adding Cost Center Groups

Users click on the "Add a Cost Center Group" button to add a cost center group. On the next page the user types in the appropriate data, then clicks OK. The next step is to add Cost Centers to your existing groups.

Add a Cost Center

Once in the Cost Center tool, users are presented with a list of all Cost Center groups. To add a Cost Center to any group, the user clicks selects (via the magnifying glass icon) the group in which a cost center is being added. If Cost Centers are already attached to the group, they will be listed here. To add new ones, users simply click the "Add Cost Center" button, assign a name and dates to Cost Center, and clicks OK.

Using Cost Centers

Once created all Cost Centers have been created, the user can start applying them to Projects, Jobs, and so on. "Applying" Cost Centers means designating what proportion or amount of a given Project's cost should come out of which Cost Center(s). This is analogous to paying for one purchase using an assortment of checking accounts. Users can apply Projects or other items to several Cost Centers, to only one, or to none at all (see "Unassigned" below).

To assign Cost Centers to a new Project, users return to the PM screen and select the "Add" icon next to that Project. User then complete the add Project information including the budgeted or allocated amounts, and select the Cost Center group from the pull-down list (if there are more than one group). Finally, the user selects the Allocate Cost Centers option and clicks "OK."

The next screen gives the user a list of all Cost Centers associated with the Cost Center group selected. Users simply check the box beside the centers they wish to assign to this Project, then click "OK." The next screen is a calculation screen. Here users can break down the dollar amounts between the various Cost Centers.

For example, suppose you selected two Cost Centers, A and B, to apply to this Project, with a total allocation of $50,000. You may decide to assign $25,000 to Cost Center A and $25,000 to Cost Center B. Type in the breakdowns you want and click "Calculate." When the numbers are to your satisfaction, click "OK." The calculator screen allows you to break down your assignments by dollar amount or by percentage. You will also see a field here called "Unassigned." Any dollars you don't assign to a specific Cost Center will by default go into this "generic" Cost Center. Remember that you can edit your assignments at any time.

Reviewing Cost Center Status

To see how money is being divided up between Cost Centers, users can use the "View Cost Center Amounts" feature. To accomplish this task, users click on an item in PM. On the next screen users click the "Cost Centers" link. The next window displayed will show how the item's cost has been allocated between Cost Centers. Keep in mind that the data displayed here will apply only to the level of the tree the user has accessed, and below it. It will not necessarily apply to the item's "parents."

FIG. 23 shows a view of Marketing Projects' 2302 Cost Centers. For any item for which money can be budgeted or allocated (for example, Project, PO or Task), users can view its detail page, by clicking the red "Cost Centers" link to see the view 2301.

As shown, this example Project has a total budget of $100,000, which is divided equally between two Cost Centers, A 2304 and B 2306. Of that $100,000 budget, $50,000 has been allocated to the sub-Project "New Release." This $50,000 has also been divided equally between A and B Cost Centers.

The result is that Cost Center A has a budget of $50,000 and an allocation of $25,000, and Cost Center B likewise has a budget of $50,000 and an allocation of $25,000.

Additionally, the Task "Hire Photographer," which is a "child" of New Release Project is assigned half-and-half to Cost Centers A and B. The Program Cost "New Release," for $250, has not been assigned to any Cost Center, so it appears by default in under "Unassigned."

Referring now FIG. 24, an example of the Cost Center view for New Release Project 2402 is shown. It is noted that the view no longer includes "Budgeted" columns. This is because "New Release" had money allocated to it, but not budgeted.

Under "Allocated Amount," the $25,000 next to Cost Center A and B represent the amounts allocated from the Project; the subtraction of $24,750 indicates how much is left out of the $25,000 to be allocated within the Project. Recall that the Task of $500 was split 50/50 between the two cost centers. This accounts for the subtraction of $250 from each sub-total of $25,000. The "Unassigned" line has nothing allocated to it, but does show an actual cost of $250 in red. This is the Program Cost.

Editing Existing Cost Center Assignments

To edit the assignments already made to an item's cost centers, the same steps as outlined above are repeated. First, a user opens the "View" window. Once the view window is open, users make changes by selecting the "Edit Allocations" button. This will bring the user to the calculation screen again, where the user can make adjustments to the cost centers using either the dollar figure or percentage calculator. Users can also add new cost centers to their assignments by clicking the "Add a Cost Center" button.

Cost Center Rules of Thumb

The Unassigned cost center is a default cost center. It doesn't really exist in the accounting system. Users can think of it as a holding place. If users do not use the Cost Center feature, any money you budget or allocate will sit in the Un-assigned center.

If users do not allocate 100% of your money to their existing Cost Centers, the Unassigned center will come into play again. For example, say you have a budget of $100 for a Project and you assign $50 to Cost Center A and $25 to Cost Center B. The remaining $25 will be automatically stored in "Unassigned." You can go in at any time and re-allocate that money.

Cost Center assignments apply to one line at a time. While a users view of a Cost Center does relate to the hierarchy of the PM structure, the users assignment of individual projects and items does not. To use the Cost Center feature correctly, users must assign Cost Centers to each item that uses money. If a user assigns Cost Center A to his new Project and then creates three items beneath that Project, they will not be automatically assigned to that Cost Center. Those dollar amounts will remain in "Unassigned" until the user specifically assigns them.

Remember that although users are dealing with the same figures, the view from PM does not represent the same thing as the view from Cost Centers. Referring to the PM example shown above, it is noted that in PM, the $250 is a legitimate expense of the Project "New Release." The Cost Center view shows the $250 in red as if it were an error or an over-expenditure. Again, it is not an over-expenditure of the Project, only of the Cost Center. It's important to keep the distinction in mind when viewing the figures.

It is noted that Cost centers are a complex feature of the system. and they will not give effective reporting of numbers if used incorrectly. In one embodiment, they are an all-or-nothing feature. If used, they need to be used universally throughout the system or they will be inaccurate and ineffective as a cost tracking device.

Requisitioning Functions

The following functions are available from the Requisitioning Tab, according to this example embodiment of the present invention. A Requisition is a request for the purchase of goods or services. Anyone can create a Requisition, but only certain users have the authority to approve one. Once a Requisition has been created and approved is then converted into its own Project.

My Requisitions

By clicking on this button a screen is presented that lists all Requisitions created by the user, including such information as the date it was created and the Requisition's status. In this example, there are four actions that can be taken from this screen:

1. Click on any Requisition to see a detail page.
2. Delete a Requisition by checking the box next to it and then selecting "Delete."
3. Go back to the administration page to approve or deny open Requisitions, (if the user is the Requisition administrator).
4. Create a new Requisition.

Requisition Detail Page

To view the details about a Requisition, users click on its name. A screen appears shows its status, dollar amount, and a description of the Requisition. If the Requisition has been approved or denied, users are able to see who took that action and why.

Create New Requisition

Selecting this button will bring up a dialogue box enabling the user to input the details of the new Requisition, including where the user would like it to be filed in their PM folders. Once a Requisition is approved, it becomes a Project. Note that when a users Requisition is approved, the person who approves it can change its Project path.

Approve/Deny Requisitions*

This feature (also called "Administration") enables the user to approve or deny open Requisitions. To approve a Requisition, users simply click on its name. The user is then presented with a dialogue box, where the user can approve or deny and make comments on the decision.

Once a user has approved a Requisition, the user will be presented with another screen to complete the Project details. Notice that the Project's start date defaults to the current date, and its end date defaults to the initial Requisition's due date. Users change these dates if necessary. Here the user can also select whether dollars for this Project should be budgeted or allocated. Once a user has completed this screen the user clicks "OK" to finish. The Requisition is now listed under "My Requisitions" with a status of "Approved."

If the user goes to Project Management, the user will see the new Project in the tree where it was placed. The first item underneath the Project is the Requisition. If the user clicks on this link, it will take the user back to the Requisitioning tab, where details can be viewed.

Spec'ing Functions

These functions are available from the Spec'ing Tab, according to this example embodiment of the present invention. Spec'ing is where the details of Projects come into play. This is where users put together the specifications for an actual job, whether it's a company brochure, folding cartons, or a T-shirt for your promotional campaign.

In this example embodiment, three different types of Spec forms have been designed as follows:

RapidSpec—This is the most abbreviated form, asking only basic questions and requiring the least time to complete. It's designed for simple jobs with few variables.

WizardSpec—A "Wizard" is a customized form designed for a type of item or service ordered on a repeated basis. The company may keep Wizard forms stored for its use.

SmartSpec—SmartSpec forms are the most detailed and are ideal for jobs that are more complicated. It will not only provide suppliers with more detail, but it will prompt users (i.e. buyers), with all the necessary questions.

This example embodiment of the present invention allows users to spec jobs in seven different categories of goods and services (referred to as "domains"): Print, Corrugated Packaging, Folding Cartons, Promotional Products and Services, Point-of-Purchase displays (POP), Creative Services, and Media Buying. These domains are listed on the main Spec'ing Tab. Once users have selected the domain that meets their needs, they will be given three options for accessing the Spec forms: "Categories," "Forms A–Z," and "History."

Categories

This option will give users a list of categories of items within the domain. When users click on a category, they get a further breakdown. For instance, in the printing domain one might select "Books," which takes the user to a list of all the available types of book Spec forms. Users can then read the description of each book type to determine which best suits their needs. If users need to search for a different category, they can select the pull-down menu of categories, choose the next category they wish to review and hit the "Go" button. Once users have determined which Spec form to use, they simply click on RS for RapidSpec, WS for WizardSpec or SS for SmartSpec, and the spec'ing form for that item will open.

Forms A–Z

This is an alphabetical listing of the individual forms themselves. All the Spec forms within a domain are listed here. Selecting this option will bring the user directly to the links for each form. Users choose the form they are seeking, and then simply click the RS, WS or SS link to open the appropriate type of Spec form.

History

This is a history of Spec forms that you have recently created. The last ten Specs the particular user completed in a given domain are listed here. Users select the form they wish to use. The users then have two options:

Edit the form. This option allows a user to work on a previously created form.

Save As. This feature allows a user to save an exact copy of a Spec under a different name. Once a user saves a copy, the user can modify the Spec as needed for the new Project.

The "Save As" option is designed to save users time on repetitive or similar jobs. It can be especially useful if a user is completing a complex job that requires a lot of data entry into the Spec form.

Spec forms contain distinct sections, with a set of questions in each section. For instance, a printing Spec form contains a section on ink, a section on artwork, and so on.

If the old Spec contained several sections (for example, two extra "insert" sections for a brochure with multiple inserts), users have the option to delete these components from the new Spec. The "Save-As" feature will not only recreate the form's sections; it will also retain whatever data was entered in that form. Users select "Continue" at the bottom of the page. The next screen allows the user to add new sections, if necessary. Then the user selects any additional sections needed and clicks on "Create Spec" to open the new-Spec.

Completing a Spec

Every Spec form is slightly different, although they share some common features. The questions on the form depend on the type of job being created and the product or service being spec'd. The questions are designed to help buyers provide potential suppliers with a complete and accurate set of requirements so that they, in turn, can give you an accurate and realistic quote the first time around.

Users simply go through each page and answer the questions and hit the save button. If users wish to go back and correct an entry on a previous page, they use the Navigation bar on the left side of the screen.

Once users complete a Spec form they have the option to "Save and Return to Project Management" or "Save and Create an RFQ" (see RFQ Management Tab for details on this feature).

If users select the option "Save and Return to Project Management" a question box will appear with the following text: "Click OK if Spec is complete. Click Cancel to maintain Spec's status as Open and return to Project Management." This box relates to a Spec's status in the system. An Open status for a Spec means that it is still being worked on. In this case, the user should select "Cancel" from the question box. This would save the user's work and take the user you to Project Management. If the user finished working on the Spec and does not intend to make any more changes, the user should click "OK." This will change the status of the Spec to "Complete." Once a spec is complete, it is ready for RFQ creation.

A "Complete" status code for a Spec can mean one of two things. The Spec form has been edited and reviewed and is ready for RFQ creation. A "Complete" status can also mean that an RFQ has been sent based on that Spec. Users can determine which stage the Spec is in by looking at the RFQ underneath it. If a Spec has a status of "Complete" and the RFQ has a status of "Open," the first meaning applies. Once the RFQ status changes to "Sent," the second meaning applies.

RFQ Management Functions

These functions are available from the RFQ Tab, according to this example embodiment of the present invention. An RFQ, or Request for Quote, is the second stage of the job specification process, the first being the Spec. An RFQ cannot be created and sent to a supplier without a Spec being created first, and each RFQ "belongs to" a specific Spec. This feature enables users to do two basic tasks: create new and edit existing RFQs for Specs, and manage your RFQs throughout the bidding process.

The main RFQ screen provides users with four options for working with RFQs:

b 1.Unmatched Specs shows a list of Specs for which an RFQ has not yet been created and takes the user to screens that allow the creation of RFQs.

2. Open RFQs is a list of RFQs that have been created but not yet submitted to suppliers.

3. Sent RFQs is a list of RFQs that have been submitted, or sent, but that have had no further activity.

4. RFQs with Bids is a list of RFQs for which bids have been received.

Unmatched Specs

Here users are given a list of open Spec. Open Specs are Specs in which RFQs have not yet been created. Once an RFQ has been created for a Spec, the Spec will disappear off this list; however, its status will still be "Open" on the users Project Management screen. This status will change to "Complete" once the RFQ has actually been submitted to a supplier group.

General Information About RFQs

Before describing Open RFQs, Sent RFQs, and RFQs with Bids, some features associated with creating RFQs in accordance with this example embodiment of the present invention are described.

RFQ Bidding

This example of a preferred embodiment of the present invention supports two types of bidding, namely open and closed bidding. Users select which form of bidding they want to use for a given job at the time the RFQ is created. This option can also be manipulated on the bid summary page. Users check the box labeled "Request Best and Final Offer" to create a closed bidding scenario.

Open Bidding

In this scenario, suppliers can re-submit bids through the system--that is, issue more than one bid for the same job. The buyer determines parameters for this process. The system will allow multiple bids from the same supplier for as long as the bidding date remains open.

Closed Bidding

Closed bidding is also referred to as "Best and Final Offer." This scenario allows only one bid into the system from any one vendor for any one job. If the supplier tries to re-submit a bid, the system will prevent him or her from doing so.

Receiving Bids after the Closed Date

In some circumstances, organizations may still want the capacity to receive bids even though the bid's end date has passed. The project manager of the present invention provides this feature. Under the RFQ Management tab, users click on either "Sent RFQs" or "RFQs with Bids" and they will be presented with a screen listing those RFQs. The user then clicks on any RFQ. The next detail screen includes a checkbox labeled "Enable Bidding." As long as this box is checked, the system will still allow bids to be entered on a job, even if the bid's end date has expired. In order to prevent further bids from being received past the end date, users should disable bidding by un-checking the box.

RFQ Creation

To create an RFQ, users click on the "Add RFQ" button next to the Spec they want to use. This will bring a first RFQ screen, where users name the RFQ. By default, the RFQ's name will be the same as that of the Spec, but the user can change the default name.

The other important fields to note here are the start and end bidding dates, and "Best and Final Offer" checkbox. The bid dates entered here are seen by all suppliers on the RFQ once it's submitted. The "Best and Final Offer" button, as mentioned above, determines whether the bidding scenario will be open or closed. Checking this box will allow suppliers to submit only one bid to the system for the job. If the box is not checked, vendors will be able to re-submit bids until he bidding process is closed, or until the end-bidding date is reached. When this screen is completed the user can start selecting vendors.

The next screen is presented to the user with four buttons on top as follows:

Criteria. The system selects a list of matched suppliers based upon specs in the RFQ. The criteria screen enables users to select additional matching criteria to further individualize the search for suppliers, such as the vendor's geographic location and years in business. Users simply select the criteria and hit "Search."

Matched. When this button is selected, the user is presented with a list of suppliers that qualify for the job and meet the criteria entered above, if any. At this point users can select which suppliers you want to receive the RFQ by clicking on the check box by each one's name. Users can also request that the RFQ is sent to themselves. If so, the user receives a faxed copy of the RFQ when sent.

If users have preferred suppliers that are online members, they will appear in yellow on this screen. On the matching screen, users can also click on a supplier's name for more information about that company, including references. Once the user has checked all the suppliers in which to send the RFQ to, the user clicks on "Add Suppliers to Selected List" at the bottom of the page.

Directory. The Directory is a list of suppliers for which no profiles exist. Users can still send an RFQ to these suppliers, but the project management server does not maintain background information on these companies. Moreover, because there is no profile on these suppliers, the system does not match them to your specific job requirements.

Users may send an RFQ to a non-member supplier designated as a "Guest" when they create an RFQ. These guests will appear in the Directory. The guest suppliers will be identified by a yellow highlight on the screen. To include any suppliers from the directory, users simply select the checkbox next to their name, and click on "Add Suppliers to Selected List."

Selected. This option enables users to review all the suppliers selected prior to sending out the RFQ. If a user makes a mistake or changed his mind, he can simply "deselect" or uncheck the box by that supplier's name, and the RFQ will not be submitted to that supplier. Once users verify that the list is correct, they click "Submit RFQ" and it will be automatically sent out to every supplier in the list.

However, if the user is ready to submit the RFQ, he can return to Project Management or any of the other screens to work on other projects. The RFQ will automatically be saved for the user in Project Management, underneath its respective Spec.

Open RFQs

The open RFQ screen lists all RFQs that have been created but not yet sent out. Here users can review and edit existing RFQs. To access an RFQ, users simply click on its link, such as link 2502. Uses can then update the RFQ using any of the options described above: Criteria, Matching, Directory and Selected. Until the RFQ has been sent, users can go in as many times as they like and edit or revise the list of suppliers. There is no limit to how many searches can be made within the parameters of the search criteria. However, in this example embodiment, an RFQ can only be sent once, and only one RFQ can exist for any Spec.

Sent RFQs

The sent RFQ display helps users track RFQs that have had no activity since they were sent out. Once an RFQ has been submitted, the system automatically tracks any bids or responses. Rather than individually opening each RFQ from PM to see if bids have been received, users can quickly get an overview by using this feature. Users can review the details of a particular RFQ, by simply clicking on its link.

The "Sent RFQs" screen displays a table showing the suppliers to which the RFQ was submitted, and the status of any bids. The status on this screen should always read "Bid Not Received." Users can also view the Spec that belongs to a particular RFQ, and can view a supplier's profile by clicking its name.

RFQs With Bids

Figure 25:
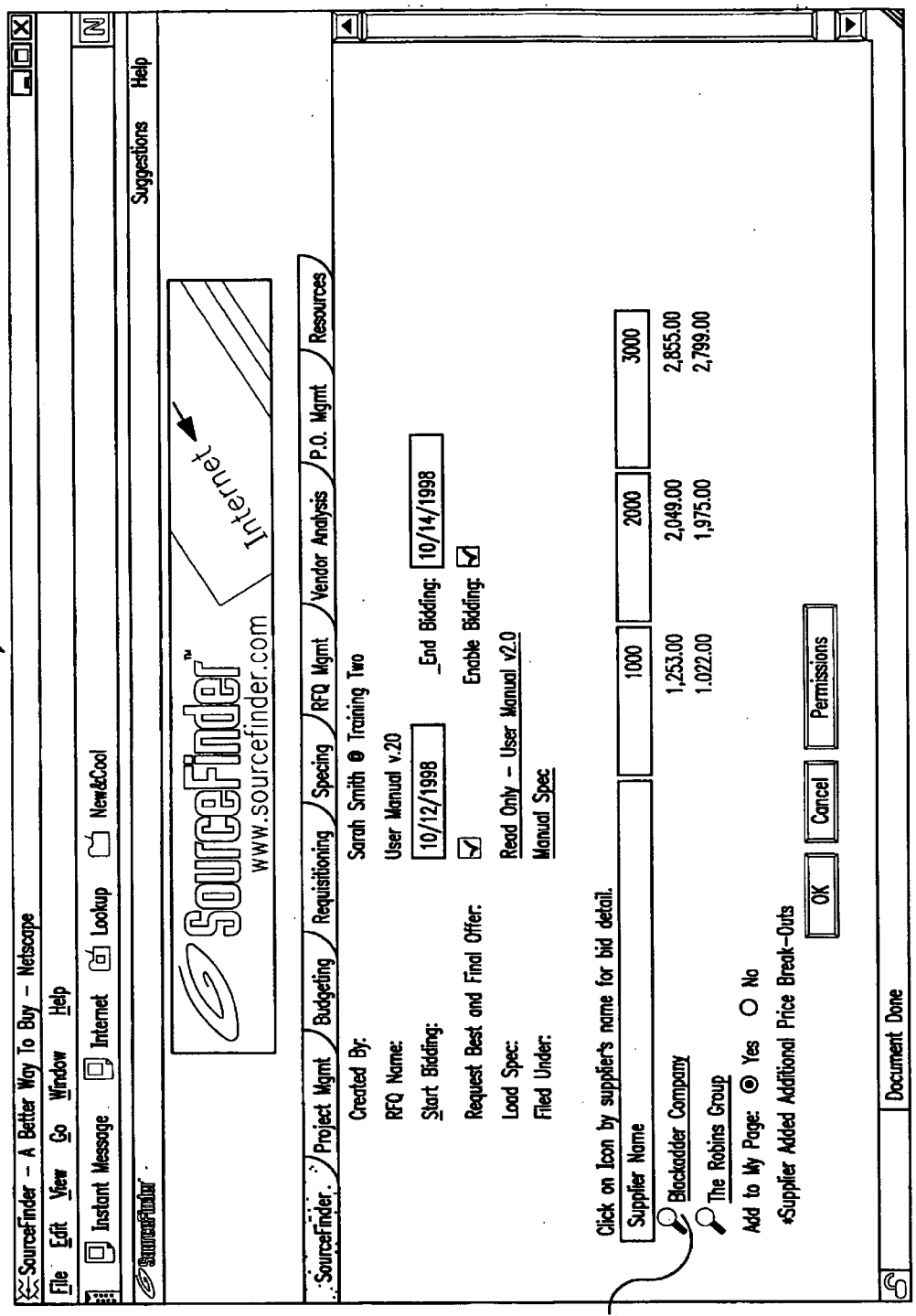

FIG. 25 is an example of a screen that presents users with a list of RFQs that have received bids from vendors. To view the bid details of a particular RFQ, users click on its link, such as link 2502. This view shows a list of all vendors that the RFQ was submitted to and a summary of the bid information. To see the bid details, users click on the magnifying glass icon next to the vendor's name. If a bid has not yet been received or was declined, this status will be noted on the summary. (For more details on this feature see "Incoming Bids" and "Bid Details" under Additional Project Management Features.)

The "Add RFQ" feature found on the bid summary page can be used to add a particular vendor to the RFQ. In the header of that page is a button labeled "Add RFQ." This feature allows users to send the RFQ to one more vendor. To use this function the user types in the phone number of the supplier and clicks "Search." The database is searched for a vendor matching that phone number. If a match exists, it will be displayed. If the result of the search is the desired vendor, the user can submit the RFQ. This vendor will be added to the list on the current RFQ.

Vendor Analysis Functions

These functions are available from the Vendor Analysis Tab, according to this example embodiment of the present invention. This feature tracks the company's interaction with vendors (suppliers). This feature allows users to see a history of vendor's dealings with the company and review any comments made by other users regarding the vendor's service or goods.

Main Vendor Analysis Screen

Listed on the main screen are all the vendors to whom Jobs have been awarded by the user's company. The other information provided here includes the last interaction date and a dollar total. The total represents the total dollar amount of Jobs awarded to a particular vendor. For more details on a vendor, click on its name to open a secondary screen.

Vendor Analysis Detail

Users are presented with a listing of all Jobs that have been awarded to an individual vendor. The table provides a brief description of the Job, including the total dollar amount of the final bid price accepted. Underneath is a history of comments made by people in the user's organization about the particular vendor. Users can add their own comments here, but generally are prevented from deleting comments that they did not create. The system provides for automatically sending an email to another user by clicking on that person's name to inquire additional information about the comment.

Typically, users can add comments about a vendor anytime they access that company's profile. That is, the user does not have to be in Vendor Analysis function. RFQ Management and Creation, for example, are two other places that could be used for accessing supplier profiles.

To view company information on the vendor itself, users click on the link by its name on the Vendor Analysis screen. Users will then be presented with contact and other relevant information about the vendor. In addition, any standard terms and conditions that the company uses for such things as bidding releases, billing, or disclaimers can also be selectively displayed.

PO Management Functions

These functions are available from the PO Management Tab. Analysis Tab, according to this example embodiment of the present invention. Once a buyer has awarded a job to a supplier, they are now ready to create a purchase order (PO). Under the PO Management tab, users can create POs as well as monitor and track existing ones. Depending on the user access rights, users may not see all the features of PO Management if they don't have access to this area of responsibility. Typically, a user with full access will see the following features:

Open Jobs. This is a listing of all Jobs and items that have not yet been issued a PO.

Open POs shows all existing POs for which goods have not yet been received.

PO History is a list of closed POs.

Requested POs is a list of all requests for PO issuance.

Open Jobs

Clicking on this option will take users to a list of existing Jobs. A Job is created when the user awards a bid to a vendor.

It should be recalled that objects do not exist in isolation. Thus, every item created belongs to" something else and has its place in the Project/folder tree. In this example, the following hierarchy applies to every "spec'd" Job:

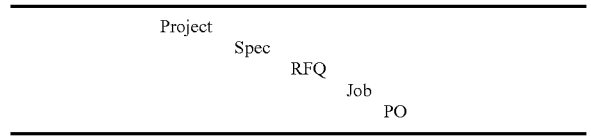

Thus, a Job cannot. exist without all the items above it being created first. A user's Job will therefore be located underneath the RFQ it was created from.

From the Open Jobs screens, if a user clicks on the name of the Job, it will display the Job's location in PM. Clicking on the link from PM, opens up a detail page of that Job. To create a PO, users simply click the "Add PO" button next to the Job they are working on. The PO form will automatically fill in default information from the Job, such as dollar amount and dates. Users then enter additional information, including the PO number and name. When the information is completed, users click "OK" to confirm. Once the PO is issued, that Job will disappear off the "Open Jobs" list, and the new PO will appear on the "Open POs" list.

In addition to using the PO Management screen for creating POs, users can also issue a PO immediately upon awarding the Job. When users complete the award details, they can select the option to issue a PO. This will bring up the PO screen when users approve the job.

Requested POs

This feature is used for users that lack authority to issue a PO but need one for certain items such as a Task or To Do Item. For items that allow PO creation, users can check the box for requesting a PO. This will open up a screen allowing them to complete the basic details of the request. The PO Administrator will be able to view the list of Requested POs, go in and edit where necessary, and then issue POs as needed.

Open POs

This option displays a list of all open POs. That is, jobs on which goods have not yet been received. The details of a particular PO can be displayed by clicking on its link to view the details here and also update the status if necessary. If the goods have arrived or the service has been rendered, users check the box and click "OK." This action removes the PO from the "Open" list. It will appear on the History list. Users can also update open POs if only part of a job order was received; selecting the "partial" option will not change the PO status. It will remain open until all the goods are received.

PO History

This option shows a list of all closed POs for the company. Closed POs are Jobs for which goods or services have been received. Once again, to view an individual PO on this list, users click on its name link, which brings up a detail screen of that PO. If the status on a PO was changed by mistake, users can deselect the "Goods Received" check box, and the PO will be listed as "Open" once again.

Resource Functions

These functions are available from the Resource Tab according to this example embodiment of the present invention. The purpose of these functions is to provide users with easy access to relevant industry information. In this fashion, users can make the most informed decisions possible when you're filling out spec forms or planning projects.

For example, a spec form might ask what kind of artwork is being submitted with the order for customized baseball caps (i.e. Digital hi-res or Digital FPO?) If users are unfamiliar with these terms they can look them tip in the Glossary. In addition, a frequently asked questions section (FAQs section) can be used to assist users.

In addition, the system of the present invention provides on-line courses related to specific projects and/or specs. For example, users can read "Printing 101" to learn about different types and finishes of paper, pros and cons of digital technology as it relates to printing, and even get you up-to-speed on ink terminology. These customized sections contain invaluable information about standard business practices that can prevent costly and time-consuming misunderstandings.

Another part of Resources is a Help feature that users can access from any page from the header bar. This is a quick way to get answers to some frequently asked questions about terminology and features.

Example embodiment of on-line supper feature

The following example represents one embodiment of the present invention as it relates to on-line suppliers. In this example embodiment, suppliers of marketing goods or services can efficiently and effectively interact with buyers in the project management system in an on-line fashion. The Supplier Interface connects suppliers directly to customers via a computer network, 104, such as the Internet.

This example embodiment includes key features such as the ability to do the following in an on-line environment: review and bid on RFQs, track bids and award jobs, communicate with buyers electronically, and upload files from buyers.

This example represents just one embodiment of the present invention and should not be construed to be limiting. This is especially true as it relates to details describing the example embodiment in terms of specific user interface controls and specific project management processes, such as those related to a marketing organization. It should be recalled that an advantage of the present invention is its flexibility that enables it to be customized for any type multiple organizational work-groups. Accordingly, the use of the example embodiment presented below should not be construed to limit the scope and breadth of the present invention.

Introduction

This feature of the present invention allows suppliers to interact with buyers using the project management system. In this example, the suppliers are suppliers of marketing goods or services. However, this is just one example of a type of supplier that can use the present invention.

Upon logging in to the project management system, users are presented with a workspace organized in a series of tabs.

The tabs in this example, are ordered in roughly chronological fashion, based on the logical progression of tasks, from receiving a buyer's Request for Quote to communicating about a job in progress. This example provides an explanation of each tab and what features and functions are associated therewith.

RFQs

The RFQ screen is the first screen a supplier sees when they log-in to the system. This screen can be accessed at any time by clicking on the "RFQ" tab. Presented here is a current list of RFQs the supplier has been invited to bid on. If the user is the Key User, every RFQ that is sent to the supplier by a client or potential client is displayed. Other users will only see RFQs from clients whose accounts have been assigned to them specifically.

For instance, let's say Henry and Linda are salespeople at a printing house. If ABC Company is one of Henry's accounts, then all RFQs coming from Company ABC will appear on Henry's RFQ summary page. Linda will not have access to ABC Company's information or any of Henry's other accounts.

On the first page, a table of information summarizes the following for each RFQ listed:

ID #—The RFQ ID number is generated by the project management system and is unique to that request only.

Client—The name of the client requesting the quote.

RFQ—The name given to that RFQ by the client, for example, "Summer Promo Banner."

No Bids After—The client decides what the deadline is for bids to be accepted. Once this date has expired, the project management system will not allow further bids to be submitted.

Max Qty—The maximum quantity that the client has requested pricing for. Other pricing breaks can be found by checking the detail page of the individual RFQ.

Types of RFQs

In this example, there are three forms of RFQs to be found on this page. The first is Open RFQ. A check box next to its name designates each Open RFQ. As long as the check box appears, it is still possible to bid on these RFQs. The second is a Buyer-Closed RFQ, which means the buyer has manually closed the RFQ so it cannot receive additional bids. A double asterisk (**) designates these RFQs. The third is an Expired RFQ, this is an RFQ on which the "no bids after" date has expired. Suppliers can no longer bid on the job but you can still review the spec if necessary.

From this initial RFQ screen, users can take the following actions:

View the information about the potential client

Review RFQ details and/or respond to an RFQ

Decline to bid on an RFQ

Review RFQs on which the bid date has expired

View the Client's Information

Clicking on a client's company name will bring up a window displaying basic contact information for that company. This can be useful if the RFQ comes from a company the supplier has never done business with before. In this window, suppliers also see a list of jobs their company may have completed in the past for that client, along with comments made by the current users or others at the supplier's company. The user can add comments at any time, and they will be visible to the user's organization with the appropriate access, but not to the buyer. On this screen is also presented the client's Terms & Conditions. These are standard Terms & Conditions that are sent out by that client with every RFQ.

The Key User in the supplier's organization will have the ability to assign a client to a specific user in the organization. This can be accomplished by opening the pull-down menu and selecting the user name that that is to be assigned to that account. From that point on, all incoming RFQs from that client will be automatically assigned to that user. That is, they will be visible only to that user (and the Key User). That user, in turn, has the ability to assign the client to someone else, for example, if the employee is leaving the organization, or if workloads are being redirected.

Review RFQ Details

Typically, once suppliers has familiarized themselves with the client information and assigned the account to the appropriate user, the next step is to review the incoming RFQs.

Clicking on the name of the RFQ results in a display of additional information, as shown in FIG. 26. Typically, this brings up an RFQ detail page. Presented in FIG. 26 is summary information about the job and the completed Spec from the client displayed below.

Job specs are pulled directly from an on-line form completed by the client. The degree of detail provided depends on the client, and also on which type of form the client uses. In this example, the project management system provides two kinds of electronic spec forms—RapidSpec and SmartSpec. The RapidSpec is a simple form in which buyers type their specifications into text fields. The SmartSpec is considerably more detailed, asking the client many job-specific questions and often providing a selection of answers.

In addition, the buyer typically indicates on the forms, how they wish to be contacted. In some cases buyers request phone calls, but other buyers request faxes or e-mail communications.

At the bottom of the Spec form is a list of attachments that the client has attached for the supplier's review. The attachments can be uploaded or viewed by clicking on the icon for each attachment.

Respond to an RFQ

Once a supplier has reviewed the Spec and completed an estimate, the bidding process continues.

Entering Bids

When the estimate is ready, suppliers go to the main RFQ screen and bring up the detail page of the RFQ they are bidding on. From there suppliers go to the bottom of the page and click on the "Bid on RFQ" button. This will take them to the first bid page, where they will enter the quantities they choose to bid on. The quantities requested by the buyer will appear next to pre-checked boxes. If for some reason a supplier does not wish to bid on one of those quantities, they can deselect the box. This page also provides space for additional quantities, in case, for example, the supplier wishes to show the buyer an alternative price break. The next bidding screen is presented when the user clicks "Continue."

On the next screen, the supplier enters the bid into a worksheet format. Comments and remarks can be entered here as well. Once the supplier has completed this page and clicks "Continue," the supplier has the opportunity to perform a final review of the quote.

RFQ Final Review

This screen provides an opportunity to double-check quotes before submitting them to the client. Once the bid is submitted, it will immediately be available for the client to view.

The review screen also provides a place to enter additional comments to the buyer. When this page is completed and the supplier clicks on "Submit" the bid will be immediately conveyed and visible to the buyer.

Once a bid is submitted that RFQ will disappear from the "RFQs" screen and will appear under the "Bids" tab.

Decline to Bid

After viewing the RFQ, suppliers may decide not to bid on it. For example, the job may be too small, or perhaps they don't have the press time available. If a supplier chooses not to bid on an RFQ, there are two ways to decline. The first is by clicking in the checkbox next to that RFQ and then clicking the "Decline to Bid" button at the bottom of the page. The second is from the RFQ detail page by clicking the "Decline to Bid" at the bottom of that page.

Either way, suppliers are presented with a "Comments" screen, where they can enter a message that will be seen by the client explaining why the supplier declined to bid on the RFQ. When the supplier clicks "Continue" at the bottom of that page, the decline is transmitted to the buyer.

Review Expired RFQs

If suppliers don't bid on an RFQ before the "No Bids After" date, the checkbox beside it will disappear and the supplier is no longer be able to take action on it. It will still appear on the supplier's screen with an asterisk by it, so that the supper can review it to see the client information and the RFQ itself after it has expired.

Bids

Once a supplier has submitted a bid in response to an RFQ, it's listed under the "Bids" tab for review along with all other outstanding bids. To use this feature, the supplier simply clicks on the "Bids" tab to see the Bid Summary page. The following information can be accessed from this page:

Bid Detail

Job Spec

Client Information—(see View the Client's Information section)

Once a Job has been awarded to a supplier, it will disappear from the Bid Summary screen. To find out if the Job has been awarded, the supplier can check the Jobs screen (described below). This is where all awarded Jobs appear.

Bid Detail

FIG. 27 is an example of a bid detail page 2701. Clicking on the name of a bid will bring up a detail page documenting information the supplier submitted to the buyer. Here, the supplier can also view the RFQ summary, any bid history pertaining to that RFQ (for instance, previous bids made on the same RFQ), and any comments made regarding your bid(s). The supplier can click on "View Spec" to see a copy of the original Spec form. The supplier can also access client information, as mentioned above, by clicking on the client's name.

In one embodiment, some of the figures on bids appear in red. This indicates how competitive the bid is (or was) in comparison to the other quotes submitted on this job. To illustrate this, it is useful to describe the two different methods a buyer can choose for receiving bids.

Open Bid

In an open-bid scenario, suppliers can send multiple bids during the time period specified by the buyer. In this case, the system will automatically calculate where the supplier's bid is not the most competitive. Those figures will appear in red on the Bid Detail page. If the supplier wishes to re-submit a bid to ensure that the quote is competitive, the supplier can click on the quantity column that they wish to adjust. The supplier will then be brought to the Bid Update screen.

The Bid Update screen provides a brief bid history on that quantity only. There is a new worksheet column to enter new figures. Once this is done, suppliers click "Finish" and the next screen will allow the addition of comments for the client. When the supplier clicks "Finish" on this screen, the new bid is immediately submitted to the client.

Once the date set by the buyer for receiving bids has expired, then the open bidding ability will be automatically disabled for that RFQ and no further bid changes will be allowed.

Closed Bid

In a closed-bid scenario, suppliers can submit only one bid to the client. However, the project management system will still be able to show the areas of the job where the supplier was not the most competitive.

The choice of bidding structure is determined by the client. The system will automatically make the options available to you that correspond with the bidding scenario chosen by the client for that particular RFQ.

View Spec

At any time during the bidding process, or even after the job has been awarded, suppliers can view the buyer's original Spec. This is accomplished by clicking on "View Spec," whenever it appears next to the bid or job name.

Jobs

Under the Jobs tab, suppliers can find a list of their Job (i.e. bids that have been awarded by the client to their company). In a format similar to the "RFQs" and "Bids" tabs, the summary of jobs appearing on this page include the client's job number, the job's due date, and its status.

"Jobs" is where suppliers track jobs and their interaction with clients.

Searching for a Job

At the top of the first screen, titled "Open Jobs," as shown in FIG. 28, is a search function 2802. The search function 2802 is especially useful when large numbers of jobs are open at any given time. Below is an example to describe this function.

For example, suppose a supplier wants to access information about a job, and all the supplier knows about it is that the job number starts with "12." In the first box, the supplier selects an option from the pull-down menu based on what is known. In this example, "Jobs with Job Number" is selected. In the second text field, the supper types in what he wishes to search for, in this example. "12." The supplier then clicks "Go." Next, the supplier is given a list of all the jobs whose numbers start with "12." The supplier can also search based on the name of the job's "owner," the client name, or the job description. To return to a full list of open jobs, the supplier selects "all jobs" from the pull-down menu and clicks again on "Go."

Job Detail

To see the detail on a particular job, one clicks on the job's name from the Open Jobs screen to be presented with the job detail screen. The job detail screen offers five viewing options as follows:

Job Summary

Job Status

Attachments

Notes

Job History

Job Summary

Similar to the "RFQ" and "Bid" summary screens, this screen displays basic information about the job and links to view the original Spec as well as client contact information. In addition, suppliers can also update a job's status (i.e. where it is in the production or delivery cycle). The updates made regarding this status is reflected on the job summary, including status descriptions and the job's estimated completion date. Here, users can also confirm the quantity and amount for which the client awarded the job. Those figures are generated by data input by the client and cannot be altered the supplier.

Job Status

This is an important field for both the supplier and the client. This field gives both the supplier and client the ability to track the job's status through production and delivery. It's up to the supplier to update the job's "Status Code" as appropriate, because this is the field the client checks via his or her project management interface.

To create a new job status or update the status of a job, users select the "Update Job Status" link. From this screen suppliers can enter an estimated completion date for the job, a status code and a detailed description of that status (typically, this last item is the suppliers internal use only). Once the data entry is complete, the supplier clicks "Add" and the new status will be reflected in the job summary. The system will automatically record the date and time that the supplier made the status update.

Attachments

There are two kinds of attachments: those sent to the supplier by the client, and those created by the supplier. The client may send the supplier a Note (like an electronic sticky-note), or files that can be downloaded by the supplier, via the project management system.

To create a supplier's own attachment, a supplier can click on the "Add Attachment" link. This will bring up a series of options. Suppliers can create their own Note or Task, and view any files from the client that has been previously uploaded.

Notes

A note is an easy way to document comments a supplier or other users in the organization make regarding a job. Typically, the Notes-are internal only and are not visible to anyone outside the supplier's organization. Notes are date-stamped and show who authored them. To edit or delete an existing Note, users click on the date link of the Note they wish to edit. Notes can be updated by any user or deleted by the Note author.

Job History

This is a history of the stages the job has passed through. Every time a status update is entered on a job, the previous status is registered under Job History. The history is in chronological order, starting with the oldest status. In this way users can track the progress of each job.

Maintenance

Users Pending

This option is used when new users sign up at the company. The Key User can sign up new users, he can assist new users in signing up or the new users may sign up independently. New uses cannot use the system until they are enabled in this fashion. This feature is used to prevent unauthorized access to the company's account.

Typically, when a new user signs up under a company, the Key User associated with the company receives a notifying e-mail message. The e-mail message includes a hyper-link to the project manager's log-in page. From there, the Key User logs in and selects the "Users Pending" option.

From there, the Key User is presented with a list of all users who have requested access to the system. To enable them, the Key User -clicks on their name and provides personal information about the new user in a data entry screen. Typically, this includes the new user's name and telephone number. Then, the Key User changes the new user's status from pending to enabled by checking the box "enable" and clicking "OK." Once that is done, the Key User is returned to the main Key User Interface, where he assigns user roles to the new user.

User Administration

This feature displays a table showing a list of all enabled users in the company, their user names and other pertinent log-in information. The "Show Disabled" button is used to view disabled users.

To view and/or edit information for an individual user, suppliers click on that person's name. A screen will then be presented with security options, such as the ability to disable a user, give the user's account an expiration date, or require that the person update his or her password. To inform the user of changes made to his or her status, users can click on the name to open up an e-mail.

Organization Profile

This tool pertains to the entire organization, rather than to individual users. This is where the Key User can manage the company information. The information listed here will depend on the structure of the company and can be customized in any way seen fit, by the assigned Key User. For example, for a branch office, it may be appropriate to have the corporate address listed in the organizational object that represents the branch. Alternatively, each branch might be signed up as a separate organization altogether.

To change the company information, the Key User selects the "Organization Profile" option and edits any necessary fields in the detail screen. Typically, the phone number input here, becomes the Key User's designated, Company Key, which their co-workers use when they sign up as new users. Therefore, it's advisable to use the main company phone number rather than a personal extension or mailbox.

Terms and Conditions

Clicking on the "Terms and Conditions" link on the Organization Profile page results in the display of a large text entry field. Here the user typically enters any terms and conditions that their company would normally attach to hard-copy bid responses. Buyers can view the suppliers terms and conditions when they look up the suppliers company profile.

Domains

From this option, uses can complete supplier profiles and "activate" the company in the domains in which they do business. For example, suppose a business is a printing house. In this case, the user would activate the company in the Print domain. If the supplier sells both Point-of-Purchase display items and Promotional Items, they should be active in both of those domains so they can receive RFQs in those categories. In order to receive qualified RFQs from potential clients, suppliers should complete the Supplier Profile and Item List. This is accomplished by selecting the domain, and then selecting the option to complete/edit their profile.

Selecting the edit profile option brings up a profile form specifically designed for the domain indicated. This data is used to match the company with RFQs the company is qualified to bid on. Also, certain information, such as references, is provided to potential clients so they can learn more about the supplier's organization. The profile spec include data that reflects the business's capabilities, such as services suppliers are willing and capable to provide, and services they are willing to outsource.

Once the profile and item list are complete, the supplier should "enable" the company in that domain in order for the system to begin allowing potential clients to see their name as a supplier option. The supplier selects the domain from the "Domains" screen. to accomplish this.

Project Creation Example

The following is an example of a process that is useful for describing the creation of a Project, according to one embodiment of the present invention. This example is presented with in conjunction with the flowchart presented below, entitled "Life Cycle Flow Chart Brochure Purchase—New Product Release." In this example, it is assumed that a company has just released five new product models and a user has been charged with producing a brochure to promote them.

New Requisition

The first step is to generate a new Requisition for the intended purchase. This step may be achieved by performing the following actions:

Go to "Requisitioning."

Select "New Requisition."

Complete the steps on this task and fill out the details as required and click "OK."

Requisition Approved

In most organizations the person who approves the Requisition will be someone other than the person who requested it. The Requisition Administrator in the company typically either approves or denies the Requisition. Once it is approved, the system automatically creates a Project. At this time the person approving the Requisition will fill in the appropriate details. This step may be achieved by performing the following actions:

Go to "Requisitioning."

Select "Administration."

Select the Requisition in question; confirm the details including its dollar amount and where in the PM tree it should be located.

Approve the Requisition and click "OK."

The approved Requisition then automatically creates a Project. Name the Project and select whether the money is to be budgeted or allocated. Complete other details as needed and click "OK."

Requisition Denied

In certain instances the Requisition may be denied. If this is the case, the Project would end at this step. To check the status of a Requisition the following steps are performed:

Go to "Requisitioning."

Select "My Requisitions." The status of each Requisition will be listed here.

Project

The Project is where the user will keep all electronic documentation related to this brochure purchase. There are many things a user can do with a Project, and this represents just one example of how a user may organize it. Once a Project has been defined, the user typically creates items that belong to it. This can be achieved by performing the following actions Go to "Project Management."

Select the "Add" button to the right of the Project name. Whatever is created will be filed underneath that Project.

This button will bring up a list of items that you can be added to the Project. The user selects the item he or she wishes to add Task Next, a Task is added to the Project. A Task is generally assigned to someone else. For instance, if a user needs copy for the new brochure, the user may assign the task of writing the copy to Bill in the Editorial Department. This can be achieved by performing the following actions:

Select Add a Task.

Complete the details of the Task.

Assign it to Bill.

Click "OK."

Note

A user may wish to make a note to himself about this Task. For instance, "Bill on vacation after 7/18. Need copy before he leaves." This can be accomplished by performing the following steps:

Go to the above Task in PM.

Select the "Add" button.

Select "Add a Note."

Complete details of the Note and click "OK."

To Do Item

A To Do Item is similar to a Task except that it is something for the creator of the item to do. Users can also set alarm dates for Tasks. This can be accomplished by performing the following steps:

Go to your Project under PM.

Select the "Add" button.

Select "Add a To Do Item."

Complete details of To Do Item and click "OK."

Spec

In this step, a Spec is created for the brochure. This can be accomplished by performing the following steps:

Go to Project Management.

Select the "Add" button, then select "Add a Spec."

Choose the Print domain and select "Forms A–Z."

Select "Brochure SS."

This will bring up a SmartSpec form for a brochure. Complete the details on the Spec.

Once the user completes the Spec form, the user can choose either "Save and Return to Project Management" or "Save/Create an RFQ."

Save Spec

If the user wishes to save the Spec to work on at a later date, the user should select the first option, "Save and Return to Project Management." This will ensure that the work already done on the Spec will be saved. When the user is ready to go back and edit the Spec, the user can open and continue working on it. This can be accomplished by performing the following steps:

Select "Save and Return to Project Management."

Click "cancel" on the question box that appears on your screen. This will retain a status of "Open" for your Spec.

Edit Spec

If a user wishes to edit a spec created above, the user can perform the following steps:

Go to Project Management.

Select the Spec the user wishes to open. The user will be given two options: "Edit/Continue" or "Save As." Select "Edit/Continue."

Now the user can complete the details of the Spec. Once it is finished the user is ready to create an RFQ.

Create RFQ

This step causes the system to match a list of suppliers with the Spec created above. This can be accomplished by performing the following steps:

From the created Spec, select "Save/Create RFQ."

Name the RFQ and select start and end bidding dates.

Select any additional matching criteria to apply to the RFQ.

Check the boxes by the matched and unmatched suppliers that will receive the RFQ Click on "Submit RFQ."

Send RFQ

Typically, this step occurs automatically when the user selects the button "Submit RFQ" in the "Create RFQ" feature. Thus, users do not generally need to take any further action; the system sends out an RFQ based on the Spec to all the suppliers selected. At this point, users typically wait for the bids to start coming back in.

Bids Received

The system and method of the present invention allows users to receive bids electronically. Once the bids come in, the user can go to the supplier and award the bid right away, or the user can review all the bids in detail. To access the bids, the user goes to the Bid Summary screen. This can be accomplished by performing the following steps:

Go to PM and open your Project until you see the RFQ for this Spec.

Select the link on the RFQ; this will bring you to the Bid Summary screen. This screen displays summary information on all the bids that have been received. It also gives the status of vendors who have not bid yet, or who declined to bid on your job.

Review Bids

In most cases you will wish to see more than the bid summary. In addition to the summary, you can view all the details of a bid electronically.

Go to Bid Summary screen.

Choose a vendor from whom a bid has been received.

Select the small icon to the left of that vendor's name.

Review the details of the bid and any comments provided from the vendor. To find out more information on a particular vendor, Click on the vendor's name to review its profile.

Award Job

Once you've reviewed all the bids, it's time to award the job. When you award the job you can also attach various items from your Project that you want the vendor to see, such as an Uploaded File or Note relating to the Project (you can only do this if the vendor you select is "on-line").

Go to Bid Summary screen.

Select the vendor to award the job to and click on the icon to the left of its name.

Verify the bid. Award the job by clicking the link under the quantity associated with the Job awarded.

Complete the job details—the quantity and price are automatically brought forward. Click OK.

Users can view contact information for the vendor by clicking on its name.

Job is Created

When a job is awarded to a vendor, the system automatically creates a Job for the user. This Job is filed in PM directly underneath the RFQ that it belongs to. Any electronic correspondence relating to this Job can be filed underneath it.

Vendor Files

These are electronic files that users may wish the vendor to access. An example of such a file is a graphic that is to be printed in the brochure. This can be accomplished by performing the following steps:

Go to PM.

Select the "Add" button next to the Job.

Select "Upload a File."

Click on the "Browse" button and locate the file path on your hard drive or network. Complete the file details and then click "OK."

Vendor Notes

Users can add Notes to the Job the same way users would add a Note to a Project. If the vendor is on-line, users can also receive communications from that company. This can be accomplished by performing the following steps:

Go to PM.

Select the "Create a New" icon next to your Job.

Select "Add a Note" and type in the details of the Note.

Create PO

The next step is to create a PO for the Job. In some instances, someone else in the company may perform this task. This can be accomplished by performing the following steps:

Go to PO Management.

Select the "Open Jobs" list.

Select the Job you just created to review the job details.

Go back to the Job list and click on the "Create a PO" button for that job.

Complete the PO details and click "OK."

Close PO

Once your job is complete and the goods have been received, the user can close PO. This can be accomplished by performing the following steps:

Go to PO Management.

Select the "Open PO" report.

Select the PO for which you have verified receipt of goods.

Change the PO's status by checking the box "Goods Received."

Click OK—this PO will now appear on the PO History report.

Figure 29:
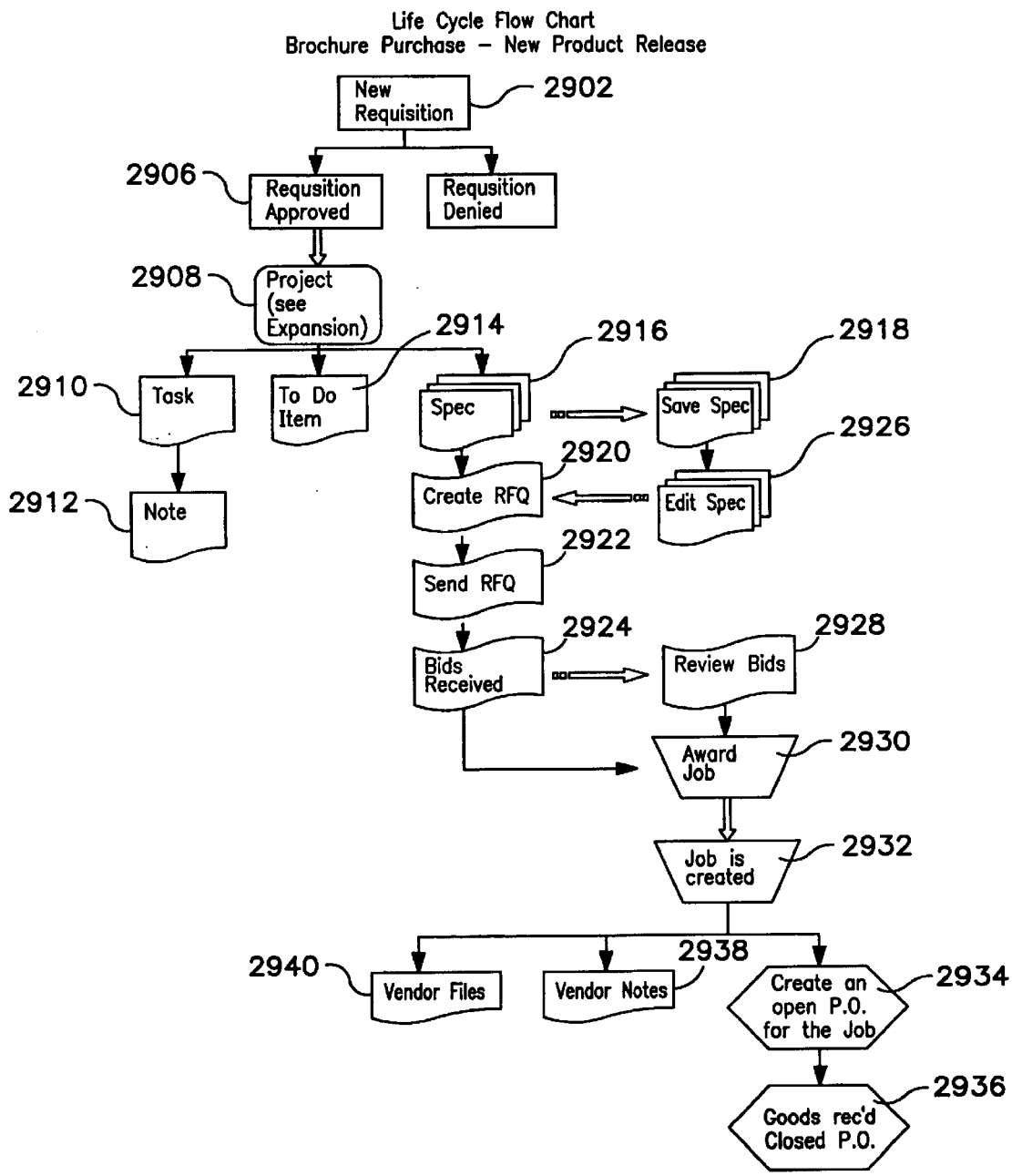
FIG. 29 is a flow chart that depicts a typical process for purchasing a brochure using the present invention in accordance with an example embodiment.

FIG. 29 is a flow chart that depicts a typical process for purchasing a brochure using the present invention in accordance with an example embodiment. The process begins with step 2902, where a new requisition for the brochure is created. This is sent to a group or individual in charge of approving or denying requisitions. If the requisition is denied, the process ends, as indicated by step 2907.

If the requisition is approved, a project is created for the brochure. Several items can be associated with this project. These items are represented by items 2910, 2914 and 2916. Item 2910 represents a task item with an attached note 2912. One or more such tasks can be created as part of this project. These tasks depend on each specific implementation of the present invention. As shown, a note 2912 is attached to the task 2910. Similarly, one or more to-do items 2914 may be created.

Item 2916 represents a spec. The spec 2916 is presented to the user for defining the brochure. As shown, the spec can be saved 2918 and edited 2926, before an RFQ is created in step 2920. After the RFQ is created, it is sent to suppliers in step 2922. Next, as indicated by step 2924, one or more bids are received. The bids are reviewed in step 2928 and the job is awarded to at least one of the suppliers in step 2932.

Next, as indicated by items 2940 and 2938, vendor files and notes may be created. In addition, a purchase order is crated in step 2934. Finally, as indicated by step 2936, the purchase order is closed when the goods are received.

Figure 30:
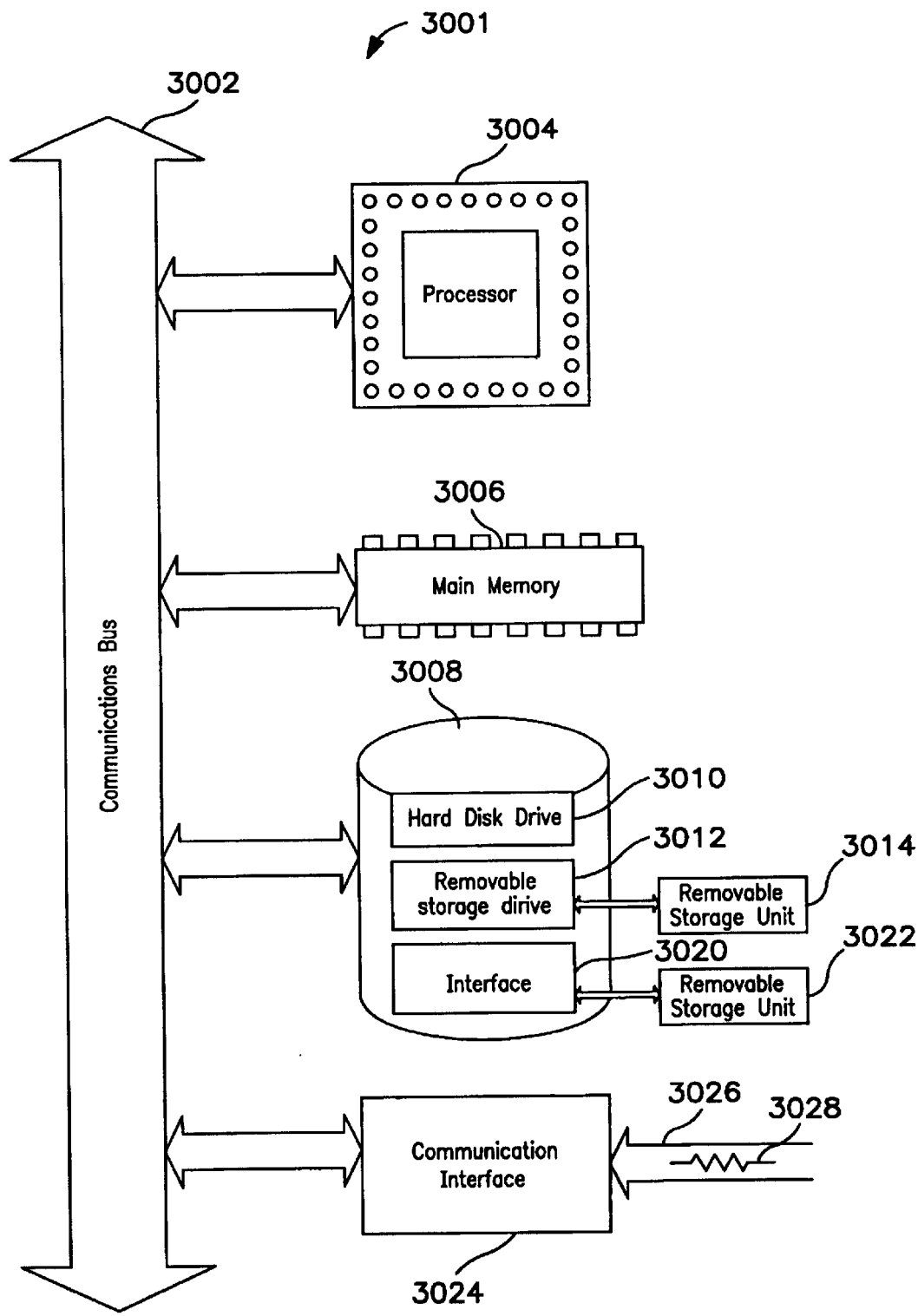
FIG. 30 is a block diagram of a computer useful for implementing components of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 3001 is shown in FIG. 30. The computer system 3001 includes one or more processors, such as processor 3004. The processor 3004 is connected to a communication bus 3002. Various software embodiments are described in terms of this example computer system. After reading this description, it will become apparent to a person skilled in the relevant art how to implement the invention using other computer systems and/or computer architectures.

Computer system 3002 also includes a main memory 3006, preferably random access memory (RAM), and can also include a secondary memory 3008. The secondary memory 3008 can include, for example, a hard disk drive 3010 and/or a removable storage drive 3012, representing a floppy disk drive, a magnetic tape drive, an optical disk drive, etc. The removable storage drive 3012 reads from and/or writes to a removable storage unit 3014 in a well-known manner. Removable storage unit 3014, represents a floppy disk, magnetic tape, optical disk, etc. which is read by and written to by removable storage drive 3012. As will be appreciated, the removable storage unit 3014 includes a computer usable storage medium having stored therein computer software and/or data.

In alternative embodiments, secondary memory 3008 may include other similar means for allowing computer programs or other instructions to be loaded into computer system 3001. Such means can include, for example, a removable storage unit 3022 and an interface 3020. Examples of such can include a program cartridge and cartridge interface (such as that found in video game devices), a removable memory chip (such as an EPROM, or PROM) and associated socket, and other removable storage units 3022 and interfaces 3020 which allow software and data to be transferred from the removable storage unit 3022 to computer system 3001.

Computer system 3001 can also include a communications interface 3024. Communications interface 3024 allows software and data to be transferred between computer system 3001 and external devices. Examples of communications interface 3024 can include a modem, a network interface (such as an Ethernet card), a communications port, a PCMCIA slot and card, etc. Software and data transferred via communications interface 3024 are in the form of signals which can be electronic, electromagnetic, optical or other signals capable of being received by communications interface 3024. These signals 3026 are provided to communications interface via a channel 3028. This channel 3028 carries signals 3026 and can be implemented using wire or cable, fiber optics, a phone line, a cellular phone link, an RF link and other communications channels.

In this document, the terms "computer program medium" and "computer usable medium" are used to generally refer to media such as removable storage device 3012, a hard disk installed in hard disk drive 3010, and signals 3026. These computer program products are means for providing software to computer system 3001

Computer programs (also called computer control logic) are stored in main memory and/or secondary memory 3008. Computer programs can also be received via communications interface 3024. Such computer programs, when executed, enable the computer system 3001 to perform the features of the present invention as discussed herein. In particular, the computer programs, when executed, enable the processor 3004 to perform the features of the present invention. Accordingly, such computer programs represent controllers of the computer system 3001.

In an embodiment where the invention is implemented using software, the software may be stored in a computer program product and loaded into computer system 3001 using removable storage drive 3012, hard drive 3010 or communications interface 3024. The control logic (software), when executed by the processor 3004, causes the processor 3004 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for managing enterprise operations comprising:

logging on to a project manager server from a computer network, said project manager server executing a project manager for creating projects based upon project management trees containing one or more data objects disposed to cooperatively effect project management functions, said logging on including providing a user identifier to the project management server from a remote location and receiving a customized home page in accordance with the user identifier;

defining one or more organizational entities within the enterprise;

defining one or more user groups associated with each of the organizational entities;

defining one or more users associated with each of the user groups;

defining user roles associated with at least one of the users, said customized home page including one or more projects associated with the at least one of the users in accordance with the user roles;

displaying a view of a first of said project management trees associated with a first project included within said projects to a first user of said users wherein a scope of said view is determined based at least in part upon membership of said first user within a first of said user groups, said view including representations of a plurality of data objects of said first of said project management trees;

describing, within ones of said plurality of data objects, functions defining relationships between said ones of said plurality of data objects and other of said plurality of data objects and;

interfacing with the first project by viewing ones of said plurality of data objects in accordance with the user roles.

2. The method of claim 1, further comprising defining one or more external agencies for interfacing with the project management server.

3. The method of claim 1, further comprising defining one or more suppliers for interfacing with the project management server.

4. The method of claim 1, wherein the user roles include permission and security access rights for viewing and altering data stored by the project management server.

5. The method of claim 1, further comprising:
remotely logging on to the project manager server from a terminal coupled with a computer network; and
creating a project associated with one of the organizational entities.

6. The method of claim 5, wherein the project is created using a project tree data structure comprising one or more objects organized in a hierarchical fashion.

7. The method of claim 6, wherein the objects include at least one of: budgets, tasks, costs, timesheets, specs, requisitions, purchase orders, and to-do lists.

8. The method of claim 6, further comprises:
interfacing with said project by editing one or more objects within the project tree in accordance with the user roles.

9. The method of claim 6, further comprising:
interfacing with the project by deleing one or more objects within the project tree in accordance with the user roles.

10. The method of claim 6, wherein said method further comprises:
interfacing with the project by adding one or more objects within said project tree in accordance with the user roles.

11. The method of claim 3, further comprising completing a user defined spec for specifying a product of service.

12. The method of claim 11, further comprising generating an RFQ from the completed user-defined spec.

13. The method of claim 12, further comprising sending one or more RFQ's to suppliers that match the completed spec.

14. The method of claim 13, further comprising receiving one or more bids from suppliers in response to the RFQs.

15. The method of claim 14, further comprising awarding the job to one or more of said suppliers that sent in a bid.

16. The method of claim 15, further comprising automatically generating purchase orders associated with awarded jobs.

17. The method of claim 7, wherein said method further comprises:
interfacing with said project by adding one or more objects to said customized home page.

18. The method of claim 1 wherein said view is selected based at in part access rights accorded said first user.

19. The method of claim 1 wherein each of said plurality of data objects contains information identifying types of other of said plurality of data objects which may be proximately located to ones of said plurality of data objects within said first of said project management trees.

20. The method of claim 19 wherein said plurality of data objects further include information defining the manner in which modifications to one or more of said plurality of data objects affect other of said data objects.

21. A centralized system for managing enterprise operations comprising:
a project manager for creating projects for the enterprise, each of said projects being defined by a project management tree containing a plurality of data objects disposed to cooperatively effect a project management function wherein ones of said plurality of data objects corresponding to a first said project management tree each include descriptions of one or more functions defining relationships among said ones of said data objects, said project manager including:
a functions component configured to perform a plurality of functions upon said plurality of data objects,
a security module disposed to restrict access to said plurality of functions in accordance with predefined access rights,
a server component configured to generate a customized home page capable of being displayed to a user in a remote location in accordance with a user identifier provided by the user, wherein the customized home page includes one or more projects associated with the user in accordance with user roles associated with the user; and
an interface component for enabling viewing of said ones of said plurality of data objects in accordance with the user roles;
one or more internal departments of the enterprise coupled to said project manager; and
one or more suppliers coupled to said project manager.

22. The system of claim 21, further comprising one or more external agencies coupled to said project manager.

23. The system of claim 21, further comprising a centralized spec server coupled to said project manager for generating user-defined specs.

24. The system of claim 21, wherein said projects include at least one of: organizational entities, work-groups, people, budgets, tasks, costs, timesheets, specs, requisitions, purchase orders and to-do lists.

25. The system of claim 24, wherein said completed specs are automatically matched with suitable suppliers.

26. The system of claim 25, wherein RFQs are automatically generated and sent to said suitable suppliers.

27. The system of claim 25, wherein the suitable suppliers can interface with the project management system by sending bids in response to said RFQs.

28. The system of claim 27, wherein purchase orders are automatically generated for said bids that are approved.

29. The system of claim 21 wherein a first set of said plurality of data objects are related to organizational entities of said enterprise and a second set of said plurality of data objects are representative of particular projects associated with ones of said organizational entities.

30. The system of claim 21 wherein at least one or more of said data objects self-describe responses of said one or more data objects to performance of ones of said plurality of functions upon said one or more data objects.

31. The system of claim 21 wherein said project manager further includes a new object filter operative to present a list of potential new data objects which may be added to said project management tree at a selected location.

32. A project management system for managing operations of an enterprise, said system comprising:
a centralized server computer, said server computer being configured to execute a project manager disposed to (a) create projects for said enterprise wherein ones of said projects are based upon project management trees containing one or more data objects disposed to cooperatively effect project management functions, (b) define one or more organizational entities within the enterprise, (c) define one or more user groups associated with each of the organizational entities, (d) define one or more users associated with each of the user groups, (e) display a view of a first of said project management trees associated with a first project included within said projects to a first user of said users wherein a scope of said view is determined based at least in part upon membership of said first user within a first of said user groups, said view including representations of a plurality of data objects of said first of said project management trees wherein each of said plurality of data objects includes descriptions of one or more functions defining relationships among ones of said plurality of data objects, (f) facilitate interfacing with said first project by controlling the viewing of said plurality of data objects in accordance with user roles associated with said first user; and at least one user computer configured to log on to said centralized server computer and access said project manager after providing a user identification corresponding to said first user to said centralized server computer, said at least one user computer receiving a customized home page in accordance with the user identifier, wherein the customized home page includes one or more projects associated with said first user.

33. The project management system of claim 32 further including one or more supplier computers coupled to said centralized server computer.

34. The project management system of claim 32 wherein said project manager further operates to define user roles associated with at least one of the users.

35. The project management system of claim 32 wherein said at least one user computer and said centralized server computer are operatively connected via a distributed communications network, said at least one computer executing a web browser capable of interfacing with said project manager.

36. The system of claim 32 wherein said view is selected based at least in part upon access rights accorded said first user.

37. The system of claim 32 wherein each of said plurality of data objects contains information identifying types of other of said plurality of data objects which may be proximately located to ones of said plurality of data objects within said first of said project management trees.

38. The system of claim 37 wherein each of said plurality of data objects further includes information defining the manner in which modifications to one or more of said plurality of data objects affect other of said plurality of data objects.

39. The system of claim 32 wherein said project manager includes:
 a functions component configured to perform a plurality of functions upon said plurality of data objects, and
 a security module disposed to restrict access to said plurality of functions in accordance with predefined access rights.

40. The system of claim 32 wherein a first set of said plurality of data objects are related to organizational entities of said enterprise and a second set of said plurality of data objects are representative of particular projects associated with ones of said organizational entities.

* * * * *